United States Patent
Sasaki et al.

(10) Patent No.: US 12,528,975 B2
(45) Date of Patent: Jan. 20, 2026

(54) PHOTOPOLYMERIZABLE COMPOSITION, CURED SUBSTANCE, AND OPTICAL MEMBER

(71) Applicant: FUJIFILM Corporation, Tokyo (JP)

(72) Inventors: Daisuke Sasaki, Shizuoka (JP); Yusuke Sakai, Shizuoka (JP); Ryoji Orita, Shizuoka (JP); Atsushi Azuma, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 139 days.

(21) Appl. No.: 18/492,795

(22) Filed: Oct. 24, 2023

(65) Prior Publication Data

US 2024/0067846 A1 Feb. 29, 2024

Related U.S. Application Data

(63) Continuation of application No. PCT/JP2022/019781, filed on May 10, 2022.

(30) Foreign Application Priority Data

May 14, 2021 (JP) ................................. 2021-082163

(51) Int. Cl.
| | |
|---|---|
| *C09J 4/06* | (2006.01) |
| *C09J 7/38* | (2018.01) |
| *C09J 11/06* | (2006.01) |
| *C09J 11/08* | (2006.01) |

(52) U.S. Cl.
CPC . *C09J 4/06* (2013.01); *C09J 7/38* (2018.01); *C09J 11/06* (2013.01); *C09J 11/08* (2013.01); *C09J 2301/302* (2020.08); *C09J 2301/408* (2020.08); *C09J 2301/416* (2020.08)

(58) Field of Classification Search
CPC ....... C09J 4/06; C09J 7/38; C09J 11/06; C09J 11/08; C09J 2301/302; C09J 2301/408; C09J 2301/416; C08K 5/005; C09D 4/00; C09D 4/06; C08F 2/44; C08F 2/50; C08F 220/10; C08F 265/06; C08G 59/66; C09K 3/00; G02B 5/22
See application file for complete search history.

(56) References Cited

U.S. PATENT DOCUMENTS

| | | | |
|---|---|---|---|
| 10,029,982 B2 | 7/2018 | Miyazaki et al. | |
| 2018/0371255 A1 | 12/2018 | Kato | |

FOREIGN PATENT DOCUMENTS

| | | | | |
|---|---|---|---|---|
| JP | 2009209126 A | * | 9/2009 | ........... C07D 495/04 |
| JP | 2017119700 | | 7/2017 | |
| JP | 2020170147 | | 10/2020 | |
| JP | 2021031614 | | 3/2021 | |
| WO | WO-2009123153 A1 | * | 10/2009 | ........... C07D 409/04 |
| WO | 2017169370 | | 10/2017 | |
| WO | WO-2020095774 A1 | * | 5/2020 | ................ C08F 2/50 |

OTHER PUBLICATIONS

"International Search Report (Form PCT/ISA/210) of PCT/JP2022/019781," mailed on Aug. 2, 2022, with English translation thereof, pp. 1-5.
"Written Opinion of the International Searching Authority (Form PCT/ISA/237) of PCT/JP2022/019781," mailed on Aug. 2, 2022, with English translation thereof, pp. 1-8.

* cited by examiner

*Primary Examiner* — Christopher W Raimund
(74) *Attorney, Agent, or Firm* — JCIPRNET

(57) ABSTRACT

Provided are a photopolymerizable composition including at least one compound selected from a compound represented by Formula (1) or a compound represented by Formula (2), a polymerizable compound, and a photopolymerization initiator, and a cured substance and an optical member which are formed of the photopolymerizable composition.

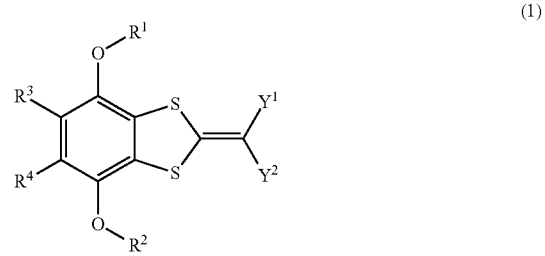

(1)

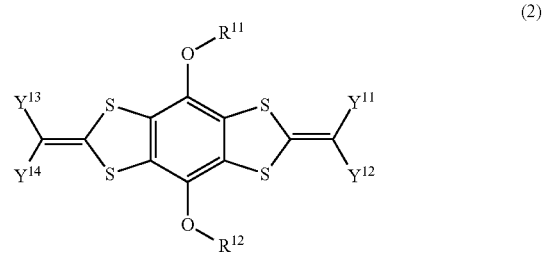

(2)

11 Claims, No Drawings

PHOTOPOLYMERIZABLE COMPOSITION, CURED SUBSTANCE, AND OPTICAL MEMBER

CROSS-REFERENCE TO RELATED APPLICATIONS

This application is a Continuation of PCT International Application No. PCT/JP2022/019781 filed on May 10, 2022, which claims priority under 35 U.S.C. § 119(a) to Japanese Patent Application No. 2021-082163 filed on May 14, 2021. Each of the above application(s) is hereby expressly incorporated by reference, in its entirety, into the present application.

BACKGROUND OF THE INVENTION

1. Field of the Invention

The present invention relates to a photopolymerizable composition containing an ultraviolet absorbing agent. Further, the present invention relates to a cured substance and an optical member which are formed of a photopolymerizable composition.

2. Description of the Related Art

Further, attention has been paid to the influence on the retina caused by direct incidence of light having various wavelengths on human eyes, and there is a concern that particularly ultraviolet rays and blue light damage the retina and cause eye diseases. In a case of using a liquid crystal display device, an image display device such as an electroluminescent display, or a device including a display, for example, a small terminal such as a smartphone or a tablet terminal, a screen of a display including a light source is visually observed. In recent years, attention has been paid to the influence of ultraviolet rays on the retina in a case where an image display device, a small terminal, or the like is used for a long period of time. Therefore, attempts have been made to reduce the influence of ultraviolet rays on the eyes of a user by providing ultraviolet cut filters in the above-described devices and the like. An ultraviolet absorbing agent is used for such ultraviolet cut filters.

Further, in recent years, there has been an increasing need for an ultraviolet cut filter that cuts ultraviolet rays in a long wavelength range of approximately 400 nm.

JP2017-119700A describes an invention related to a photopolymerizable composition containing an ultraviolet absorbing agent having a specific structure that selectively absorbs light having a wavelength approximately 400 nm, a polymerizable monomer, a photopolymerization initiator, and a solvent.

SUMMARY OF THE INVENTION

Further, the ultraviolet absorbing performance of an ultraviolet absorbing agent may be degraded with time due to irradiation with light. In particular, an ultraviolet absorbing agent having a maximal absorption wavelength on a longer wavelength side in an ultraviolet region has a tendency that the light resistance is poor and the ultraviolet absorption performance thereof is likely to be degraded with time. Therefore, in recent years, there has been a demand for further improvement of light resistance performance of the ultraviolet absorbing agent.

Further, in a case where the photopolymerizable composition contains an ultraviolet absorbing agent and the photopolymerizable composition is cured by being irradiated with light, since the exposure light is absorbed by the ultraviolet absorbing agent, active species such as radicals are unlikely to be generated from a photopolymerization initiator due to the exposure light, and the curing degree of a cured substance to be obtained is insufficient in some cases. Therefore, a cured substance obtained by curing the photopolymerizable composition containing an ultraviolet absorbing agent may have insufficient solvent resistance.

Further, in a case where the photopolymerizable composition contains an ultraviolet absorbing agent, since a large amount of decomposition product of the photopolymerization initiator and a large amount of residues of the unreacted photopolymerization initiator are present in a cured substance to be obtained, the decomposition product of the photopolymerization initiator present in the cured substance and the residues of the unreacted photopolymerization initiator are decomposed with time so that active species such as radicals are generated in a case where the cured substance is irradiated with light for a long time, the ultraviolet absorbing agent is attacked by the active species, and thus the ultraviolet absorption performance tends to be temporarily degraded.

Therefore, an object of the present invention is to provide a photopolymerizable composition capable of forming a cured substance having excellent light resistance and solvent resistance. Further, another object of the present invention is to provide a cured substance and an optical member.

The present invention provides the following aspects.

<1> A photopolymerizable composition comprising: at least one compound selected from a compound represented by Formula (1) or a compound represented by Formula (2); a polymerizable compound; and a photopolymerization initiator,

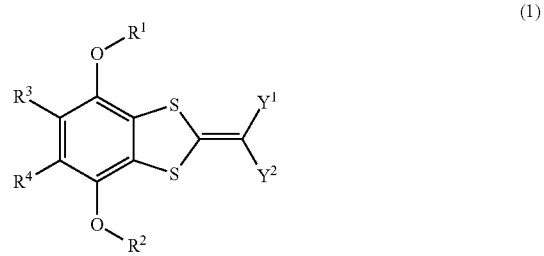

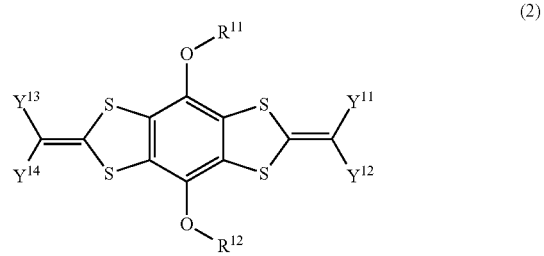

in Formulae (1) and (2), $R^1$, $R^2$, $R^{11}$, and $R^{12}$ each independently represent a hydrogen atom, an alkyl group, an aryl group, an acyl group, a carbamoyl group, an alkoxycarbonyl group, an aryloxycarbonyl group, or an ethylenically unsaturated bond-containing group, $R^3$ and $R^4$ each independently represent a hydrogen atom, a halogen atom, an alkyl group, an aryl group, an alkoxy group, an aryloxy group, an acyloxy group, an alkylamino group, an anilino group, an acylamino group, an alkylsulfonylamino group, an arylsulfonylamino group, an alkylthio group, an arylthio group, or an ethylenically unsaturated bond-containing group, $Y^1$, $Y^2$, $Y^{11}$, $Y^{12}$, $Y^{13}$, and $Y^{14}$ each independently represent an electron withdrawing group, $Y^1$ and $Y^2$ may be bonded to each other to form a ring,
$Y^{11}$ and $Y^{12}$ may be bonded to each other to form a ring,
$Y^{13}$ and $Y^{14}$ may be bonded to each other to form a ring,
$R^1$ and $R^3$ may be bonded to each other to form a ring,
$R^3$ and $R^4$ may be bonded to each other to form a ring, and
$R^2$ and $R^4$ may be bonded to each other to form a ring.

<2> The photopolymerizable composition according to <1>, in which the compound represented by Formula (1) is a compound represented by Formula (3), and the compound represented by Formula (2) is a compound represented by Formula (4),

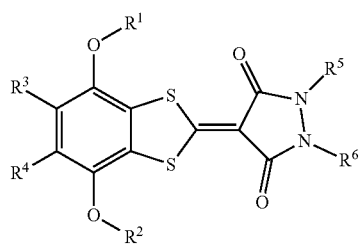

(3)

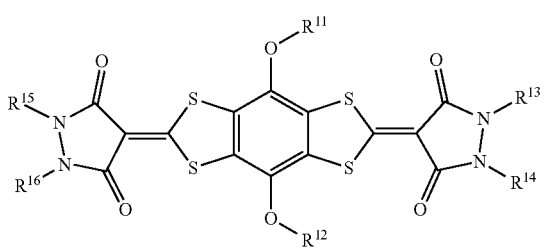

(4)

in Formulae (3) and (4), $R^1$, $R^2$, $R^{11}$, and $R^{12}$ each independently represent a hydrogen atom, an alkyl group, an aryl group, an acyl group, a carbamoyl group, an alkoxycarbonyl group, an aryloxycarbonyl group, or an ethylenically unsaturated bond-containing group, $R^3$ and $R^4$ each independently represent a hydrogen atom, a halogen atom, an alkyl group, an aryl group, an alkoxy group, an aryloxy group, an acyloxy group, an alkylamino group, an anilino group, an acylamino group, an alkylsulfonylamino group, an arylsulfonylamino group, an alkylthio group, an arylthio group, or an ethylenically unsaturated bond-containing group, $R^5$, $R^6$, $R^{13}$, $R^{14}$, $R^{15}$, and $R^{16}$ each independently represent a hydrogen atom or a substituent, $R^1$ and $R^3$ may be bonded to each other to form a ring,
$R^3$ and $R^4$ may be bonded to each other to form a ring,
$R^2$ and $R^4$ may be bonded to each other to form a ring,
$R^5$ and $R^6$ may be bonded to each other to form a ring,
$R^{13}$ and $R^{14}$ may be bonded to each other to form a ring, and
$R^{15}$ and $R^{16}$ may be bonded to each other to form a ring.

<3> The photopolymerizable composition according to <2>, in which one of $R^3$ and $R^4$ in Formula (3) represents a hydrogen atom, and the other represents a halogen atom, an alkyl group, an aryl group, an alkoxy group, an aryloxy group, an acyloxy group, an alkylamino group, an anilino group, an acylamino group, an alkylsulfonylamino group, an arylsulfonylamino group, an alkylthio group, an arylthio group, or an ethylenically unsaturated bond-containing group.

<4> The photopolymerizable composition according to any one of <1> to <3>, in which the polymerizable compound is a compound containing two or more ethylenically unsaturated bond-containing groups.

<5> The photopolymerizable composition according to any one of <1> to <4>, in which the photopolymerization initiator is at least one selected from an acetophenone compound, an acylphosphine compound, or a benzophenone compound.

<6> The photopolymerizable composition according to any one of <1> to <5>, further comprising: a resin.

<7> The photopolymerizable composition according to <6>, in which the resin contains an alkali-soluble resin.

<8> The photopolymerizable composition according to <6> or <7>, in which the resin is at least one selected from a (meth)acrylic resin, a polystyrene resin, a polyester resin, a polyurethane resin, a polythiourethane resin, a polyimide resin, an epoxy resin, a polycarbonate resin, a cyclic olefin resin, or a cellulose acylate resin.

<9> The photopolymerizable composition according to any one of <1> to <8>, in which the photopolymerizable composition is a pressure sensitive adhesive or an adhesive.

<10> A cured substance which is obtained by curing the photopolymerizable composition according to any one of <1> to <9>.

<11> An optical member comprising: the cured substance according to <10>.

According to the present invention, it is possible to provide a photopolymerizable composition capable of forming a cured substance having excellent light resistance and solvent resistance. Further, according to the present invention, it is possible to provide a cured substance and an optical member.

DESCRIPTION OF THE PREFERRED EMBODIMENTS

Hereinafter, the contents of the present invention will be described in detail.

In a case where substitution or unsubstitution is not specified in the notation of a group (atomic group) in the present specification, the group includes both a group which has no substituent and a group which has a substituent. For example, "alkyl group" includes not only an alkyl group having no substituent (unsubstituted alkyl group), but also an alkyl group having a substituent (substituted alkyl group).

In the present specification, a numerical range shown using "to" indicates a range including the numerical values described before and after "to" as the lower limit value and the upper limit value.

In the present specification, the total solid content denotes the total amount of all the components of the composition excluding a solvent.

In the present specification, "(meth)acrylate" denotes both or any one of acrylate and methacrylate, "(meth)acryl" denotes both or any one of acryl and methacryl, "(meth)allyl" denotes both or any one of allyl and methallyl, and "(meth)acryloyl" denotes both or any one of acryloyl and methacryloyl.

In the present specification, the meaning of the term "step" includes not only an independent step but also a step whose intended purpose is achieved even in a case where the step is not clearly distinguished from other steps.

In the present specification, the weight-average molecular weight (Mw) and the number average molecular weight (Mn) are defined as values in terms of polystyrene, measured by gel permeation chromatography (GPC).

Photopolymerizable Composition

A photopolymerizable composition according to the embodiment of the present invention contains at least one compound selected from a compound represented by Formula (1) or a compound represented by Formula (2), a polymerizable compound, and a photopolymerization initiator.

Hereinafter, the compound represented by Formula (1) and the compound represented by Formula (2) will be collectively referred to as a specific compound.

According to the photopolymerizable composition according to the embodiment of the present invention, a cured substance having excellent light resistance and solvent resistance can be formed. The specific compound contained in the photopolymerizable composition according to the embodiment of the present invention has excellent light resistance, and thus a cured substance that is unlikely to cause decomposition or modification of the specific compound due to irradiation with light and has excellent light resistance can be formed. Further, since the transmittance of ultraviolet rays having a short wavelength (for example, light having a wavelength of 350 nm or less) in this specific compound is relatively high, in a case where the photopolymerizable composition is cured by being irradiated with light, generation of active species such as radicals from the photopolymerization initiator due to exposure light is unlikely to be hindered, and the photopolymerizable composition can be sufficiently cured by irradiation with light. Further, it is assumed that since the specific compound has excellent absorption performance with respect to light having a wavelength of near 400 nm, the specific compound acts as a sensitizer of the photopolymerization initiator, and thus generation of active species such as radicals from the photopolymerization initiator due to the exposure light can be further promoted. Therefore, according to the photopolymerizable composition according to the embodiment of the present invention, a cured substance having excellent solvent resistance can be formed. Further, the specific compound has excellent absorption performance with respect to light having a wavelength of near 400 nm, and thus a cured substance having excellent shielding properties against light having a wavelength of near 400 nm can be formed by using the photopolymerizable composition according to the embodiment of the present invention.

In the photopolymerizable composition according to the embodiment of the present invention, in a case where at least one selected from an acetophenone compound, an acylphosphine compound, or a benzophenone compound is used as the photopolymerization initiator, a cured substance with particularly excellent light resistance and solvent resistance can be formed.

Hereinafter, each component contained in the photopolymerizable composition will be described.

Specific Compound

The photopolymerizable composition according to the embodiment of the present invention contains at least one compound (specific compound) selected from a compound represented by Formula (1) or a compound represented by Formula (2).

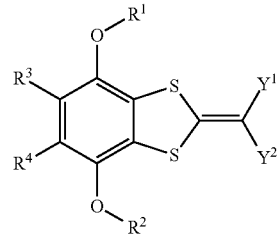

(1)

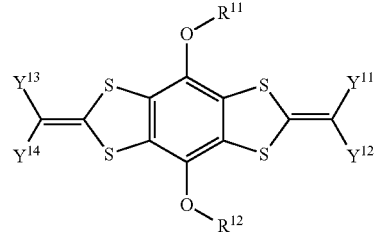

(2)

In Formulae (1) and (2), $R^1$, $R^2$, $R^{11}$, and $R^{12}$ each independently represent a hydrogen atom, an alkyl group, an aryl group, an acyl group, a carbamoyl group, an alkoxycarbonyl group, an aryloxycarbonyl group, or an ethylenically unsaturated bond-containing group, $R^3$ and $R^4$ each independently represent a hydrogen atom, a halogen atom, an alkyl group, an aryl group, an alkoxy group, an aryloxy group, an acyloxy group, an alkylamino group, an anilino group, an acylamino group, an alkylsulfonylamino group, an arylsulfonylamino group, an alkylthio group, an arylthio group, or an ethylenically unsaturated bond-containing group, $Y^1$, $Y^2$, $Y^{11}$, $Y^{12}$, $Y^{13}$, and $Y^{14}$ each independently represent an electron withdrawing group, $Y^1$ and $Y^2$ may be bonded to each other to form a ring, $Y^{11}$ and $Y^{12}$ may be bonded to each other to form a ring, $Y^{13}$ and $Y^{14}$ may be bonded to each other to form a ring, $R^1$ and $R^3$ may be bonded to each other to form a ring, $R^3$ and $R^4$ may be bonded to each other to form a ring, and $R^2$ and $R^4$ may be bonded to each other to form a ring.

As the alkyl group represented by $R^1$ and $R^2$ in Formula (1) and an alkyl group represented by $R^{11}$ and $R^{12}$ in Formula (2), an alkyl group having 1 to 30 carbon atoms is preferable, an alkyl group having 1 to 20 carbon atoms is more preferable, an alkyl group having 1 to 15 carbon atoms is still more preferable, and an alkyl group having 1 to 10 carbon atoms is particularly preferable. The alkyl group may be linear, branched, or cyclic, but it is preferable that the alkyl group is a linear or branched alkyl group. The alkyl group may have a substituent. Examples of the substituent include the groups described in the section of the substituent T below. Among these, an alkoxy group, an aryloxy group, an acyl group, an acyloxy group, an alkoxycarbonyl group, and an aryloxycarbonyl group are preferable, and an alkoxycarbonyl group is more preferable. Specific examples of the alkyl group include a methyl group, an ethyl group, an n-propyl group, an isopropyl group, a sec-butyl group, a tert-butyl group, an n-hexyl group, an n-octyl group, an n-decyl group, an eicosyl group, a 2-chloroethyl group, a 2-cyanoethyl group, a benzyl group, a 2-ethylbutyl group, a 2-ethylhexyl group, a 3,5,5-trimethylhexyl group, a 2-hexyldecyl group, a 2-octyldecyl group, a 2-(4,4-dimethylpentane-2-yl)-5,7,7-trimethyloctyl group, an isostearyl group, an isopalmityl group, a vinyl group, an allyl group, a prenyl group, a geranyl group, an oleyl group, a propargyl group, a cyclohexyl group, a cyclopentyl group, an ethoxycarbonylpropyl group, an ethoxycarbonylpentyl group, a butoxycarbonylpropyl group, and a 2-ethylhexyloxycarbonylpropyl group.

The aryl group represented by $R^1$ and $R^2$ in Formula (1) and the aryl group represented by $R^{11}$ and $R^{12}$ in Formula (2) are preferably an aryl group having 6 to 30 carbon atoms and more preferably an aryl group having 6 to 10 carbon atoms. The aryl group may have a substituent. Examples of the substituent include the groups described in the section of the substituent T below. Specific examples of the aryl group include a phenyl group, a p-tolyl group, a naphthyl group, a meta-chlorophenyl group, and an orthohexadecanoylaminophenyl group. A phenyl group is preferable as the aryl group.

As the acyl group represented by $R^1$ and $R^2$ in Formula (1) and the acyl group represented by $R^{11}$ and $R^{12}$ in Formula (2), an acyl group having 2 to 30 carbon atoms is preferable. The acyl group may have a substituent. Examples of the substituent include the groups described in the section of the substituent T below. Specific examples of the acyl group include an acetyl group, a pivaloyl group, a 2-ethylhexanoyl group, a stearoyl group, a benzoyl group, and a p-methoxyphenylcarbonyl group.

As the carbamoyl group represented by $R^1$ and $R^2$ in Formula (1) and the carbamoyl group represented by $R^{11}$ and $R^{12}$ of Formula (2), a carbamoyl group having 1 to 30 carbon atoms is preferable. The carbamoyl group may have a substituent. Examples of the substituent include the groups described in the section of the substituent T below. Specific examples of the carbamoyl group include a N,N-dimethylcarbamoyl group, a N,N-diethylcarbamoyl group, a morpholinocarbonyl group, a N,N-di-n-octylaminocarbonyl group, and a N-n-octylcarbamoyl group.

Examples of the alkoxycarbonyl group represented by $R^1$ and $R^2$ in Formula (1) and the alkoxycarbonyl group represented by $R^{11}$ and $R^{12}$ in Formula (2) include an alkoxycarbonyl group having 2 to 30 carbon atoms. The alkoxycarbonyl group may have a substituent. Examples of the substituent include the groups described in the section of the substituent T below.

Examples of the aryloxycarbonyl group represented by $R^1$ and $R^2$ in Formula (1) and the aryloxycarbonyl group represented by $R^{11}$ and $R^{12}$ in Formula (2) include an aryloxycarbonyl group having 7 to 30 carbon atoms. The aryloxycarbonyl group may have a substituent. Examples of the substituent include the groups described in the section of the substituent T below.

Examples of the ethylenically unsaturated bond-containing group represented by $R^1$ and $R^2$ in Formula (1) and the ethylenically unsaturated bond-containing group represented by $R^{11}$ and $R^{12}$ in Formula (2) include a vinyl group, a (meth)allyl group, a (meth)acryloyl group, a (meth)acryloyloxy group, a (meth)acryloylamino group, a vinylphenyl group, and a group represented by Formula (R100).

$$*X^{R1}\text{-}Y^{R1}\text{-}Z^{R1} \quad (R100)$$

In Formula (R100), $X^{R1}$ represents a single bond, —C(=O)—*1, —C(=O)O—*1, or —C(=O)NRx1-*1, where Rx1 represents a hydrogen atom, an alkyl group, or an aryl group and *1 represents a bonding site with respect to $Y^{R1}$, $Y^{R1}$ represents a single bond or a divalent linking group, and $Z^{R1}$ represents a vinyl group, a (meth)allyl group, a (meth)acryloyl group, a (meth)acryloyloxy group, a (meth)acryloylamino group, or a vinylphenyl group.

As the alkyl group represented by Rx1, an alkyl group having 1 to 30 carbon atoms is preferable. Specific examples thereof include a methyl group, an ethyl group, an n-propyl group, an isopropyl group, and an n-butyl. As the aryl group represented by Rx1, a substituted or unsubstituted aryl group having 6 to 30 carbon atoms is preferable. Specific examples thereof include a phenyl group, a p-tolyl group, and a naphthyl group. It is preferable that Rx1 represents a hydrogen atom.

It is preferable that $X^{R1}$ represents —C(=O)NH—*1.

Examples of the divalent linking group represented by $Y^{R1}$ include a hydrocarbon group, —NH—, —S(=O)$_2$—, —O—, —C(=O)—, —OC(=O)—, —C(=O)O—, —NHC(=O)—, —C(=O)NH—, and a group formed by combining two or more of these groups. Examples of the hydrocarbon group include an aliphatic hydrocarbon group and an aromatic hydrocarbon group, and an aliphatic hydrocarbon group is preferable. The number of carbon atoms of the aliphatic hydrocarbon group is preferably in a range of 1 to 30, more preferably in a range of 1 to 20, and still more preferably in a range of 1 to 15. The aliphatic hydrocarbon group may be linear, branched, or cyclic. Further, the cyclic aliphatic hydrocarbon group may be a monocycle or a fused ring. Further, the cyclic aliphatic hydrocarbon group may have a crosslinking structure. The number of carbon atoms of the aromatic hydrocarbon group is preferably in a range of 6 to 30, more preferably in a range of 6 to 20, and still more preferably in a range of 6 to 10. The hydrocarbon group may have a substituent. Examples of the substituent include the substituent T described below. Examples of the substituent include a hydroxy group.

It is preferable that the divalent linking group represented by $Y^{R1}$ is a hydrocarbon group or a group formed by linking two or more hydrocarbon groups via a single bond or a divalent linking group. Examples of the linking group that links two or more of the hydrocarbon groups include —NH—, —S(=O)$_2$—, —O—, —C(=O)—, —OC(=O)—, —C(=O)O—, —NHC(=O)—, and —C(=O)NH—. Among these, —O—, —C(=O)—, —OC(=O)—, —C(=O)O—, —NHC(=O)—, or —C(=O)NH— is preferable.

$Z^{R1}$ represents preferably a (meth)acryloyloxy group or a vinylphenyl group and more preferably a (meth)acryloyloxy group.

It is preferable that $R^1$ and $R^2$ in Formula (1) and $R^{11}$ and $R^{12}$ in Formula (2) each independently represent an alkyl group, an acyl group, a carbamoyl group, or an ethylenically unsaturated bond-containing group.

Examples of the halogen atom represented by $R^3$ and $R^4$ of Formula (1) include a fluorine atom, a chlorine atom, and a bromine atom.

As the alkyl group represented by $R^3$ and $R^4$ in Formula (1), an alkyl group having 1 to 30 carbon atoms is preferable, an alkyl group having 1 to 10 carbon atoms is more preferable, an alkyl group having 1 to 5 carbon atoms is still more preferable, and an alkyl group having 1 or 2 carbon atoms is particularly preferable. The alkyl group is preferably a linear or branched alkyl group and more preferably a linear alkyl group. The alkyl group may have a substituent. Examples of the substituent include the groups described in the section of the substituent T below. Specific examples of the alkyl group include a methyl group, an ethyl group, an n-propyl group, an isopropyl group, a tert-butyl group, an n-octyl group, a 2-cyanoethyl group, a benzyl group, a 2-ethylhexyl group, a vinyl group, an allyl group, a prenyl group, a geranyl group, an oleyl group, a propargyl group, a cyclohexyl group, a cyclopentyl group, a 2-hydroxyethyl group, and a 2-hydroxypropyl group. Among these, a methyl group and a tert-butyl group are preferable, and a methyl group is more preferable from the viewpoint of ease of synthesis.

As the aryl group represented by $R^3$ and $R^4$ in Formula (1), an aryl group having 6 to 30 carbon atoms is preferable, and an aryl group having 6 to 10 carbon atoms is more preferable. The aryl group may have a substituent. Examples of the substituent include the groups described in the section of the substituent T below. Specific examples of the aryl group include a phenyl group, a p-tolyl group, and a naphthyl group.

As the alkoxy group represented by $R^3$ and $R^4$ in Formula (1), an alkoxy group having 1 to 30 carbon atoms is preferable. The alkoxy group may have a substituent. Examples of the substituent include the groups described in the section of the substituent T below. Specific examples of the alkoxy group include a methoxy group and an ethoxy group.

As the aryloxy group represented by $R^3$ and $R^4$ in Formula (1), an aryloxy group having 6 to 30 carbon atoms is preferable. The aryloxy group may have a substituent. Examples of the substituent include the groups described in the section of the substituent T below. Specific examples of the aryloxy group include a phenoxy group, a 2-methylphenoxy group, a 4-tert-butylphenoxy group, a 3-nitrophenoxy group, and a 2-tetradecanoylaminophenoxy group.

As the acyloxy group represented by $R^3$ and $R^4$ in Formula (1), an acyloxy group having 2 to 30 carbon atoms is preferable. The acyloxy group may have a substituent. Examples of the substituent include the groups described in the section of the substituent T below.

As the alkylamino group represented by $R^3$ and $R^4$ in Formula (1), an alkylamino group having 1 to 30 carbon atoms is preferable. The alkylamino group may have a substituent. Examples of the substituent include the groups described in the section of the substituent T below.

As the anilino group represented by $R^3$ and $R^4$ in Formula (1), an anilino group having 6 to 40 carbon atoms is preferable, an anilino group having 6 to 30 carbon atoms is more preferable, an anilino group having 6 to 20 carbon atoms is still more preferable, an anilino group having 6 to 15 carbon atoms is particularly preferable, and an anilino group having 6 to 12 carbon atoms is most preferable. The anilino group may have a substituent. Examples of the substituent include groups described in the section of the substituent T described below.

As the acylamino group represented by $R^3$ and $R^4$ in Formula (1), an acylamino group having 2 to 30 carbon atoms is preferable, an acylamino group having 2 to 20 carbon atoms is more preferable, an acylamino group having 2 to 15 carbon atoms is still more preferable, and an acylamino group having 2 to 10 carbon atoms is particularly preferable. The acylamino group may have a substituent. Examples of the substituent include groups described in the section of the substituent T described below.

As the alkylsulfonylamino group represented by $R^3$ and $R^4$ in Formula (1), an alkylsulfonylamino group having 2 to 30 carbon atoms is preferable, an alkylsulfonylamino group having 2 to 20 carbon atoms is more preferable, an alkylsulfonylamino group having 2 to 15 carbon atoms is still more preferable, and an alkylsulfonylamino group having 2 to 10 carbon atoms is particularly preferable. The alkylsulfonylamino group may have a substituent. Examples of the substituent include groups described in the section of the substituent T described below.

As the arylsulfonylamino group represented by $R^3$ and $R^4$ in Formula (1), an arylsulfonylamino group having 6 to 40 carbon atoms is preferable, an arylsulfonylamino group having 6 to 30 carbon atoms is more preferable, an arylsulfonylamino group having 6 to 20 carbon atoms is still more preferable, an arylsulfonylamino group having 6 to 15 carbon atoms is particularly preferable, and an arylsulfonylamino group having 6 to 12 carbon atoms is most preferable. The arylsulfonylamino group may have a substituent. Examples of the substituent include groups described in the section of the substituent T described below.

As the alkylthio group represented by $R^3$ and $R^4$ in Formula (1), an alkylthio group having 1 to 30 carbon atoms is preferable, an alkylthio group having 1 to 20 carbon atoms is more preferable, an alkylthio group having 1 to 15 carbon atoms is still more preferable, an alkylthio group having 1 to 10 carbon atoms is particularly preferable, and an alkylthio group having 1 to 8 carbon atoms is most preferable. The alkylthio group may be linear or branched. The alkylthio group may have a substituent. Examples of the substituent include groups described in the section of the substituent T described below.

As the arylthio group represented by $R^3$ and $R^4$ in Formula (1), an arylthio group having 6 to 40 carbon atoms is preferable, an arylthio group having 6 to 30 carbon atoms is more preferable, an arylthio group having 6 to 20 carbon atoms is still more preferable, an arylthio group having 6 to 15 carbon atoms is particularly preferable, and an arylthio group having 6 to 12 carbon atoms is most preferable. The arylthio group may have a substituent. Examples of the substituent include groups described in the section of the substituent T described below.

Examples of the ethylenically unsaturated bond-containing group represented by $R^3$ and $R^4$ in Formula (1) include the groups described as the ethylenically unsaturated bond-containing group represented by $R^1$ and $R^2$ in Formula (1) and the ethylenically unsaturated bond-containing group represented by $R^{11}$ and $R^{12}$ in Formula (2).

It is preferable that $R^3$ and $R^4$ in Formula (1) each independently represent a hydrogen atom, an alkyl group, an alkoxy group, or an aryloxy group.

Further, from the viewpoint of lengthening the maximal absorption wavelength, it is preferable that one of $R^3$ and $R^4$ in Formula (1) represents a hydrogen atom and the other represents a halogen atom, an alkyl group, an aryl group, an alkoxy group, an aryloxy group, an acyloxy group, an alkylamino group, an anilino group, an acylamino group, an alkylsulfonylamino group, an arylsulfonylamino group, an alkylthio group, an arylthio group, or an ethylenically unsaturated bond-containing group, more preferable that one of $R^3$ and $R^4$ represents a hydrogen atom and the other represents an alkyl group, an alkoxy group, or an aryloxy group, and still more preferable that one of $R^3$ and $R^4$ represents a hydrogen atom and the other represents an alkyl group.

In Formula (1), $R^1$ and $R^3$ may be bonded to each other to form a ring, $R^3$ and $R^4$ may be bonded to each other to form a ring, and $R^2$ and $R^4$ may be bonded to each other to form a ring. It is preferable that the ring formed by these groups being bonded to each other is a 5- or 6-membered ring. The ring to be formed may have a substituent. Examples of the substituent include groups described in the section of the substituent T described below.

$Y^1$ and $Y^2$ in Formula (1) and $Y^{11}$, $Y^{12}$, $Y^{13}$, and $Y^{14}$ in Formula (2) each independently represent an electron withdrawing group. It is preferable that the electron withdrawing group represented by these groups is a substituent having a positive Hammett's substituent constant σp value. Examples of the electron withdrawing group include a cyano group, an acyl group, an alkoxycarbonyl group, an aryloxycarbonyl group, a carbamoyl group, a sulfonyl group, a sulfinyl group, and a sulfamoyl group. Preferred examples of the acyl group include an acetyl group, a propionyl group, a pivaloyl group, a benzoyl group, and a 4-methoxybenzoyl group. Preferred examples of the alkoxycarbonyl group include a methoxycarbonyl group, an ethoxycarbonyl group, a 2-hydroxyethoxycarbonyl group, a 2-(3-trimethoxysilylpropylaminocarbonyloxy)ethoxycarbonyl group, a 2-(3-triethoxysilylpropylaminocarbonyloxy)ethoxycarbonyl group, and a 2-ethylhexylcarbonyloxy group. Preferred examples of the aryloxycarbonyl group include a phenoxycarbonyl group and a 4-methoxyphenoxycarbonyl group. Preferred examples of the carbamoyl group include an unsubstituted carbamoyl group, a N,N-dimethylcarbamoyl group, a N,N-diethylcarbamoyl group, a morpholinocarbamoyl group, a N,N-di-n-octylcarbamoyl group, and a N-n-octylcarbamoyl group. Preferred examples of the sulfonyl group include a methanesulfonyl group, an ethanesulfonyl group, an octanesulfonyl group, and a benzenesulfonyl group. Preferred examples of the sulfinyl group include a methanesulfinyl group, an ethanesulfinyl group, an octanesulfinyl group, and a benzenesulfinyl group. Preferred examples of the sulfamoyl group include an unsubstituted sulfamoyl group and a N,N-dimethylsulfamoyl group. As the electron withdrawing group, a cyano group or a carbamoyl group is preferable, and a carbamoyl group is more preferable.

In Formula (1), $Y^1$ and $Y^2$ may be bonded to each other to form a ring, and from the viewpoint of further improving the light resistance of a cured substance to be obtained, it is preferable that $Y^1$ and $Y^2$ are bonded to each other to form a ring.

In Formula (2), $Y^{11}$ and $Y^{12}$ may be bonded to each other to form a ring, and from the viewpoint of further improving the light resistance of a cured substance to be obtained, it is preferable that $Y^{11}$ and $Y^{12}$ are bonded to each other to form a ring. In addition, $Y^{13}$ and $Y^{14}$ may be bonded to each other to form a ring, and from the viewpoint of further improving the light resistance of a cured substance to be obtained, it is preferable that $Y^{13}$ and $Y^{14}$ are bonded to each other to form a ring.

It is preferable that the ring formed by $Y^1$ and $Y^2$ being bonded to each other, the ring formed by $Y^{11}$ and $Y^{12}$ being bonded to each other, and the ring formed by $Y^{13}$ and $Y^{14}$ being bonded to each other are 5- or 6-membered rings. Specific examples thereof include a 5-pyrazolone ring, an isoxazoline-5-one ring, a pyrazolidine-3,5-dione ring, a barbituric acid ring, a thiobarbituric acid ring, and a dihydropyridine-2,6-dione ring. Among these, a 5-pyrazolone ring, an isoxaline-5-one ring, a pyrazolidine-3,5-dione ring, or a barbituric acid ring is preferable, a pyrazolidine-3,5-dione ring or a barbituric acid ring is more preferable, and a pyrazolidine-3,5-dione ring is particularly preferable. The ring formed by these groups being bonded to each other may have a substituent. Examples of the substituent include groups described in the section of the substituent T described below.

Substituent T

Examples of the substituent T include the following groups.

Examples thereof include a halogen atom (such as a chlorine atom, a bromine atom, or an iodine atom), an alkyl group [a linear, branched, or cyclic alkyl group, specific examples thereof include a linear or branched alkyl group (preferably a linear or branched alkyl group having 1 to 30 carbon atoms, and examples thereof include a methyl group, an ethyl group, an n-propyl group, an isopropyl group, a t-butyl group, an n-octyl group, an eicosyl group, a 2-chloroethyl group, a 2-cyanoethyl group, and a 2-ethylhexyl group), a cycloalkyl group (preferably a cycloalkyl group having 3 to 30 carbon atoms, and examples thereof include a cyclohexyl group, a cyclopentyl group, and a 4-n-dodecylcyclohexyl group), a bicycloalkyl group (preferably a bicycloalkyl group having 5 to 30 carbon atoms, that is, a monovalent group obtained by removing one hydrogen atom from a bicycloalkane having 5 to 30 carbon atoms, and examples thereof include a bicyclo[1,2,2]heptane-2-yl group and a bicyclo[2,2,2]octane-3-yl group), and those having a tricyclo structure with a plurality of ring structures, and alkyl groups in the substituents described below (for example, an alkyl group in an alkylthio group) are alkyl groups of such a concept], an alkenyl group [linear, branched, or cyclic alkenyl group, specific examples thereof include a linear or branched alkenyl group (preferably a linear or branched alkenyl group having 2 to 30 carbon atoms, and examples thereof include a vinyl group, an allyl group, a prenyl group, a geranyl group, and an oleyl group), a cycloalkenyl group (preferably a cycloalkenyl group having 3 to 30 carbon atoms, that is, a monovalent group obtained by removing one hydrogen atom from a cycloalkene having 3 to 30 carbon atoms, and examples thereof include a 2-cyclopentene-1-yl group and a 2-cyclohexene-1-yl group), and a bicycloalkenyl group (preferably a bicycloalkenyl group having 5 to 30 carbon atoms, that is, a monovalent group obtained by removing one hydrogen atom from a bicycloalkene having one double bond, and examples thereof include a bicyclo[2,2,1]hepto-2-en-1-yl group and a bicyclo[2,2,2]octo-2-en-4-yl group)], an alkynyl group (preferably a linear or branched alkynyl group having 2 to 30 carbon atoms, examples thereof include an ethynyl group and a propargyl group), an aryl group (preferably an aryl group having 6 to 30 carbon atoms, and examples thereof include a phenyl group, a p-tolyl group, a naphthyl group, an m-chlorophenyl group, an o-hexadecanoylaminophenyl group), a heterocyclic group (preferably a monovalent group obtained by removing one hydrogen atom from a 5- or 6-membered aromatic or non-aromatic heterocyclic compound and more preferably a 5- or 6-membered aromatic heterocyclic group having 1 to 20 carbon atoms, and examples thereof include a 2-furyl group, a 2-thienyl group, a 2-pyrimidinyl group, and a 2-benzothiazolyl group), a cyano group, a hydroxy group, a nitro group, a carboxyl group, an alkoxy group (preferably a linear or branched alkoxy group having 1 to 30 carbon atoms, and examples thereof include a methoxy group, an ethoxy group, an isopropoxy group, a t-butoxy group, an n-octyloxy group, and a 2-methoxyethoxy group), an aryloxy group (preferably an aryloxy group having 6 to 30 carbon atoms, and examples thereof include a phenoxy group, a 2-methylphenoxy group, a 4-t-butylphenoxy group, a 3-nitrophenoxy group, and a 2-tetradecanoylaminophenoxy group), a heterocyclic oxy group (preferably a heterocyclic oxy group having 2 to 30 carbon atoms, and examples thereof include a 1-phenyltetrazole-5-oxy group and a 2-tetrahydropyranyloxy group), an acyloxy group (preferably a formyloxy group, an alkylcarbonyloxy group having 2 to 30 carbon atoms, or an arylcarbonyloxy group having 6 to 30 carbon atoms, and examples thereof include a formyloxy group, an acetyloxy group, a pivaloyloxy group, a stearoyloxy group, a benzoyloxy group, and a p-methoxyphenylcarbonyl oxy group), a carbamoyloxy group (preferably a carbamoyloxy group having 1 to 30 carbon atoms, and examples thereof include a N,N-dimethylcarbmoyloxy group, a N,N-diethylcarbamoyloxy group, a morpholinocarbonyloxy group, a N,N-di-n-octylaminocarbonyloxy group, and a N-n-octylcarbamoyloxy group), an alkoxycarbonyloxy group (preferably an alkoxycarbonyloxy group having 2 to 30 carbon atoms, and examples thereof include a methoxycarbonyloxy group, an ethoxycarbonyloxy group, a t-butoxycarbonyloxy group, and an n-octylcarbonyloxy group), an aryloxycarbonyloxy group (preferably an aryloxycarbonyloxy group having 7 to 30 carbon atoms, and examples thereof include a phenoxycarbonyloxy group, a p-methoxyphenoxycarbonyloxy group, and a p-n-hexadecyloxyphenoxycarbonyloxy group), an amino group (preferably an amino group, an alkylamino group having 1 to 30 carbon atoms, or an anilino group having 6 to 30 carbon atoms, and examples thereof include an amino group, a methylamino group, a dimethylamino group, an anilino group, a N-methyl-anilino group, and a diphenylamino group), an acylamino group (preferably a formylamino group, an alkylcarbonylamino group having 2 to 30 carbon atoms, or an arylcarbonylamino group having 6 to 30 carbon atoms, and examples thereof include a formylamino group, an acetylamino group, a pivaloylamino group, a lauroylamino group, a benzoylamino group, and a 3,4,5-tri-n-octyloxyphenylcarbonylamino group), an aminocarbonylamino group (preferably an aminocarbonylamino group having 1 to 30 carbon atoms, and examples thereof include a carbamoylamino group, a N,N-dimethylaminocarbonylamino group, a N,N-diethylaminocarbonylamino group, and a morpholinocarbonylamino group), an alkoxycarbonylamino group (preferably an alkoxycarbonylamino group having 2 to 30 carbon atoms, and examples thereof include a methoxycarbonylamino group, an ethoxycarbonylamino group, a t-butoxycarbonylamino group, an n-octadecyloxycarbonylamino group, and a N-methyl-methoxycarbonylamino group), an aryloxycarbonylamino group (preferably an aryloxycarbonylamino group having 7 to 30 carbon atoms, and examples thereof include a phenoxycarbonylamino group, a p-chlorophenoxycarbonylamino group, and an m-n-octyloxyphenoxycarbonylamino group), a sulfamoylamino group (preferably a sulfamoylamino group having 0 to 30 carbon atoms, and examples thereof include a sulfamoylamino group, a N,N-dimethylaminosulfonylamino group, and a N-n-octylaminosulfonylamino group), an alkyl or arylsulfonylamino group (preferably an alkyl sulfonylamino group having 1 to 30 carbon atoms or an arylsulfonylamino group having 6 to 30 carbon atoms, and examples thereof include a methylsulfonylamino group, a butyl sulfonylamino group, a phenyl sulfonylamino group, a 2,3,5-trichlorophenylsulfonylamino group, and a p-methylphenylsulfonylamino group), a mercapto group, an alkylthio group (preferably an alkylthio group having 1 to 30 carbon atoms, and examples thereof include a methylthio group, an ethylthio group, and an n-hexadecylthio group), an arylthio group (preferably an arylthio group having 6 to 30 carbon atoms, and examples thereof include a phenylthio group, a p-chlorophenylthio group, and an m-methoxyphenylthio group), a heterocyclic thio group (preferably a heterocyclic thio group having 2 to 30 carbon atoms, and examples thereof include a 2-benzothiazolylthio group and a 1-phenyltetrazole-5-ylthio group), a sulfamoyl group (preferably a sulfamoyl group having 0 to 30 carbon atoms, and examples thereof include a N-ethylsulfamoyl group, a N-(3-dodecyloxypropyl)sulfamoyl group, a N,N-dimethylsulfamoyl group, a N-acetylsulfamoyl group, a N-benzoylsulfamoyl group, a N-(N'-phenylcarbamoyl)sulfamoyl group), a sulfo group, an alkyl or arylsulfinyl group (preferably an alkyl sulfinyl group having 1 to 30 carbon atoms or an arylsulfinyl group having 6 to 30 carbon atoms, and examples thereof include a methylsulfinyl group, an ethylsulfinyl group, a phenylsulfinyl group, and a p-methylphenylsulfinyl group), an alkyl or arylsulfonyl group (preferably an alkylsulfonyl group having 1 to 30 carbon atoms or an arylsulfonyl group having 6 to 30 carbon atoms, and examples thereof include a methylsulfonyl group, an ethylsulfonyl group, a phenylsulfonyl group, and a p-methylphenylsulfonyl group), an acyl group (preferably a formyl group, an alkylcarbonyl group having 2 to 30 carbon atoms, an arylcarbonyl group having 7 to 30 carbon atoms, or a heterocyclic carbonyl group having 4 to 30 carbon atoms and bonded to a carbonyl group, and examples include an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group), an aryloxycarbonyl group (preferably an aryloxycarbonyl group having 7 to 30 carbon atoms, and examples thereof include a phenoxycarbonyl group, an o-chlorophenoxycarbonyl group, an m-nitrophenoxycarbonyl group, and a p-t-butylphenoxycarbonyl group), an alkoxycarbonyl group (preferably an alkoxycarbonyl group having 2 to 30 carbon atoms, and examples thereof include a methoxycarbonyl group, an ethoxycarbonyl group, a t-butoxycarbonyl group, an n-octadecyloxycarbonyl group, an n-butoxycarbonyl group, and a 2-ethylhexyloxycarbonyl group), a carbamoyl group (preferably a carbamoyl group having 1 to 30 carbon atoms, and examples thereof include a carbamoyl group, a N-methylcarbamoyl group, a N,N-dimethylcarbamoyl group, a N,N-di-n-octylcarbamoyl group, and a N-(methylsulfonyl)carbamoyl group), an aryl or heterocyclic azo group (preferably an arylazo group having 6 to 30 carbon atoms or a heterocyclic azo group having 3 to 30 carbon atoms, and examples thereof include a phenylazo group, a p-chlorophenylazo group, and a 5-ethylthio-1,3,4-thiadiazole-2-ylazo group), an imide group (preferably a N-succinimide group or a N-phthalimide group), a phosphino group (preferably a phosphino group having 2 to 30 carbon atoms, and examples thereof include a dimethylphosphino group, a diphenylphosphino group, and a methylphenoxyphosphino group), a phosphinyl group (preferably a phosphinyl group having 2 to 30 carbon atoms, and examples thereof include a phosphinyl group, a dioctyloxyphosphinyl group, and a diethoxyphosphinyl group), a phosphinyloxy group (preferably a phosphinyloxy group having 2 to 30 carbon atoms, and examples thereof include a diphenoxyphosphinyloxy group and a dioctyloxyphosphinyloxy group), and a phosphinylamino group (preferably a phosphinylamino group having 2 to 30 carbon atoms, and examples thereof include a dimethoxyphosphinylamino group and a dimethylaminophosphinylamino group), and an ethylenically unsaturated bond-containing group (examples thereof include a vinyl group, a (meth)allyl group, a (meth)acryloyl group, a (meth)acryloyloxy group, a (meth)acryloylamino group, and a vinylphenyl group).

Among the groups described above, one or more hydrogen atoms of groups having hydrogen atoms may be substituted with the above-described substituents T. Examples of such substituents include an alkylcarbonylaminosulfonyl group, an aryl carbonylaminosulfonyl group, an alkylsulfonylaminocarbonyl group, and an arylsulfonylaminocarbonyl group. Specific examples include a methylsulfonylaminocarbonyl group, a p-methylphenylsulfonylaminocarbonyl group, an acetylaminosulfonyl group, and a benzoylaminosulfonyl group.

From the viewpoint of high solubility in a solvent and easily forming a cured substance with suppressed surface unevenness, a compound represented by Formula (1) is preferable as the specific compound.

Further, from the viewpoint of easily forming a cured substance with excellent light resistance, a compound represented by Formula (3) is preferable as the compound represented by Formula (1). Further, from the viewpoint of easily forming a cured substance with excellent light resistance, a compound represented by Formula (4) is preferable as the compound represented by Formula (2).

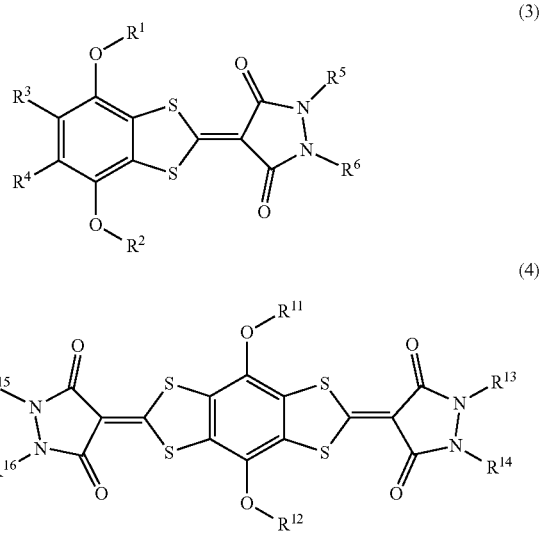

In Formulae (3) and (4), $R^1$, $R^2$, $R^{11}$, and $R^{12}$ each independently represent a hydrogen atom, an alkyl group, an aryl group, an acyl group, a carbamoyl group, an alkoxycarbonyl group, an aryloxycarbonyl group, or an ethylenically unsaturated bond-containing group, $R^3$ and $R^4$ each independently represent a hydrogen atom, a halogen atom, an alkyl group, an aryl group, an alkoxy group, an aryloxy group, an acyloxy group, an alkylamino group, an anilino group, an acylamino group, an alkylsulfonylamino group, an arylsulfonylamino group, an alkylthio group, an arylthio group, or an ethylenically unsaturated bond-containing group, $R^5$, $R^6$, $R^{13}$, $R^{14}$, $R^{15}$, and $R^{16}$ each independently represent a hydrogen atom or a substituent, $R^1$ and $R^3$ may be bonded to each other to form a ring,
$R^3$ and $R^4$ may be bonded to each other to form a ring,
$R^2$ and $R^4$ may be bonded to each other to form a ring,
$R^5$ and $R^6$ may be bonded to each other to form a ring,
$R^{13}$ and $R^{14}$ may be bonded to each other to form a ring, and
$R^{15}$ and $R^{16}$ may be bonded to each other to form a ring.

$R^1$ and $R^2$ in Formula (3) each have the same definition as that for $R^1$ and $R^2$ in Formula (1).

$R^3$ and $R^4$ in Formula (3) each have the same definition as that for $R^3$ and $R^4$ in Formula (1). From the viewpoint of lengthening the maximal absorption wavelength, it is preferable that one of $R^3$ and $R^4$ represents a hydrogen atom and the other represents a halogen atom, an alkyl group, an aryl group, an alkoxy group, an aryloxy group, an acyloxy group, an alkylamino group, an anilino group, an acylamino group, an alkylsulfonylamino group, an arylsulfonylamino group, an alkylthio group, an arylthio group, or an ethylenically unsaturated bond-containing group, more preferable that one of $R^3$ and $R^4$ represents a hydrogen atom and the other represents an alkyl group, an alkoxy group, or an aryloxy group, and still more preferable that one of $R^3$ and $R^4$ represents a hydrogen atom and the other represents an alkyl group.

$R^1$ and $R^3$ in Formula (3) may be bonded to each other to form a ring, $R^3$ and $R^4$ may be bonded to each other to form a ring, and $R^2$ and $R^4$ may be bonded to each other to form a ring. It is preferable that the ring formed by these groups being bonded to each other is a 5- or 6-membered ring. The ring to be formed may have a substituent. Examples of the substituent include groups described in the section of the substituent T described below.

$R^{11}$ and $R^{12}$ in Formula (4) each have the same definition as that for $R^{11}$ and $R^{12}$ in Formula (2).

Examples of the substituent represented by $R^5$ and $R^6$ in Formula (3) and $R^{13}$, $R^{14}$, $R^{15}$, and $R^{16}$ in Formula (4) include the groups described in the section of the substituent T above. Among these, an alkyl group, an aryl group, or a heterocyclic group is preferable, an alkyl group or an aryl group is more preferable, and an alkyl group is still more preferable.

The alkyl group is preferably an alkyl group having 1 to 30 carbon atoms, more preferably an alkyl group having 1 to 20 carbon atoms, still more preferably an alkyl group having 1 to 15 carbon atoms, particularly preferably an alkyl group having 1 to 10 carbon atoms, and most preferably an alkyl group having 1 to 8 carbon atoms. The alkyl group may be linear, branched, or cyclic and preferably linear or branched. The alkyl group may have a substituent. Examples of the substituent include the groups described in the section of the substituent T above.

The aryl group is preferably an aryl group having 6 to 40 carbon atoms, more preferably an aryl group having 6 to 30 carbon atoms, still more preferably an aryl group having 6 to 20 carbon atoms, particularly preferably an aryl group having 6 to 15 carbon atoms, and most preferably an aryl group having 6 to 12 carbon atoms. As the aryl group, a phenyl group or a naphthyl group is preferable, and a phenyl group is more preferable. Further, the aryl group may have a substituent. Examples of the substituent include the groups described in the section of the substituent T above.

It is preferable that the heterocyclic ring in the heterocyclic group includes a 5- or 6-membered saturated or unsaturated heterocyclic ring. The heterocyclic ring may be fused with an aliphatic ring, an aromatic ring, or another heterocyclic ring. Examples of the heteroatom constituting the ring of the heterocyclic ring include B, N, O, S, Se, and Te. Among these, N, O and S are preferable. It is preferable that the carbon atom of the heterocyclic ring has a free valence (monovalent) (the heterocyclic group is bonded at the carbon atom). The number of carbon atoms of the heterocyclic group is preferably in a range of 1 to 40, more preferably in a range of 1 to 30, and still more preferably in a range of 1 to 20. Examples of the saturated heterocyclic ring in the heterocyclic group include a pyrrolidine ring, a morpholine ring, a 2-bora-1,3-dioxolane ring, and a 1,3-thiazolidine ring. Examples of the unsaturated heterocyclic ring in the heterocyclic group include an imidazole ring, a thiazole ring, a benzothiazole ring, a benzoxazole ring, a benzotriazole ring, a benzoselenazole ring, a pyridine ring, a pyrimidine ring, and a quinoline ring. The heterocyclic group may have a substituent. Examples of the substituent include the groups described in the section of the substituent T above.

$R^5$ and $R^6$ in Formula (3) may be bonded to each other to form a ring, $R^{13}$ and $R^{14}$ in Formula (4) may be bonded to each other to form a ring, and $R^{15}$ and $R^{16}$ in Formula (4) may be bonded to each other to form a ring. It is preferable that the ring formed by these groups being bonded to each other is a 5- or 6-membered ring. Specific examples of the ring include a hexahydropyridazine ring, a tetrahydropyridazine ring, and a tetrahydrophthalazine ring. The ring to be formed may have a substituent. Examples of the substituent include groups described in the section of the substituent T described below.

$R^5$ and $R^6$ in Formula (3) and $R^{13}$, $R^{14}$, $R^{15}$, and $R^{16}$ in Formula (4) each independently represent preferably a hydrogen atom, an alkyl group, an aryl group, or a heterocyclic group, more preferably an alkyl group or an aryl group, and still more preferably an alkyl group.

The specific compound has a maximal absorption wavelength preferably in a wavelength range of 360 to 430 nm, more preferably in a wavelength range of 370 to 420 nm, still more preferably in a wavelength range of 380 to 420 nm, and particularly preferably in a wavelength range of 380 to 405 nm.

The molar absorption coefficient of the specific compound at the maximal absorption wavelength is preferably 10,000 L/mol·cm or greater, more preferably 20,000 L/mol·cm or greater, and still more preferably 30,000 L/mol·cm or greater.

Further, the molar absorption coefficient of the specific compound at a wavelength of 400 nm is preferably 1,000 L/mol·cm or greater, more preferably 3,000 L/mol·cm or greater, and still more preferably 5,000 L/mol·cm or greater.

The maximal absorption wavelength and the molar absorption coefficient of the specific compound can be determined by measuring the spectral spectrum of a solution, prepared by dissolving the specific compound in ethyl acetate, at room temperature (25° C.) using a 1 cm quartz cell. Examples of the measuring device include UV-1800PC (manufactured by Shimadzu Corporation).

The specific compound can be produced in conformity with the methods described in JP2009-067984A, JP2009-263616A, JP2009-263617A, and WO2017/122503A.

Specific examples of the specific compound include compounds having the following structures. Further, in the structural formulae shown below, Me represents a methyl group, Et represents an ethyl group, Pr represents a propyl group, tBu represents a tert-butyl group, ″Bu represents an n-butyl group, Bn represents a benzyl group, and Ph represents a phenyl group.

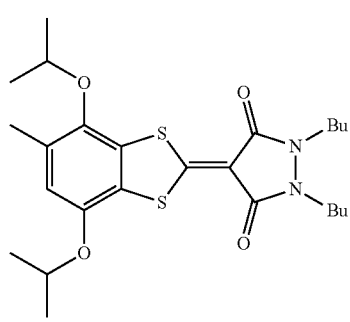

(1)-1

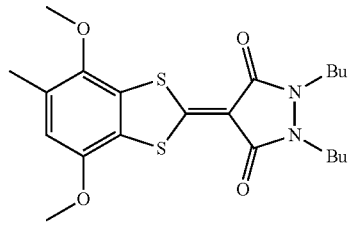

(1)-2

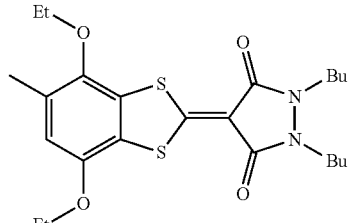

(1)-3

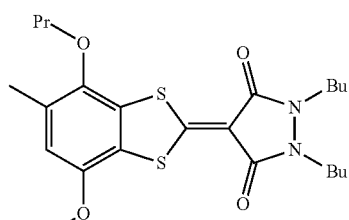

(1)-4

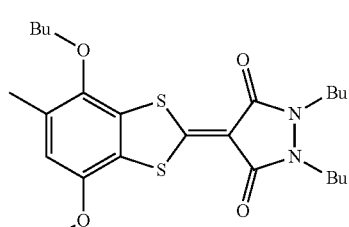

(1)-5

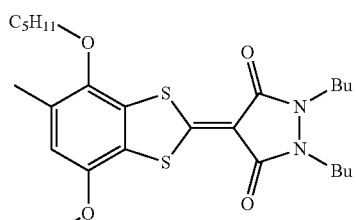

(1)-6

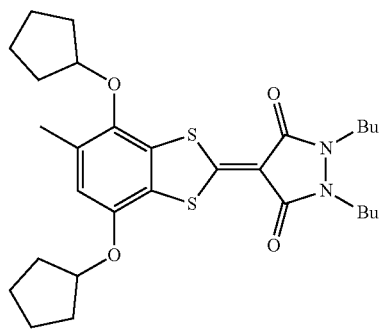

(1)-7

-continued
(1)-8
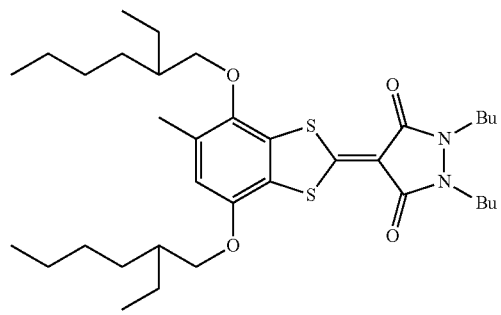
(1)-9
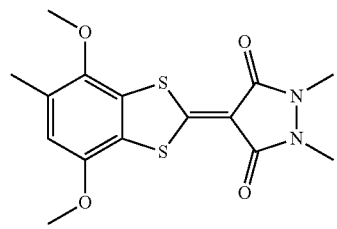
(1)-10
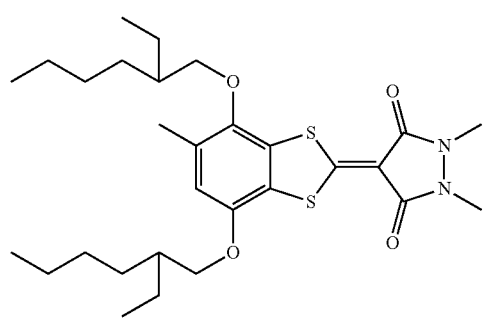
(1)-11
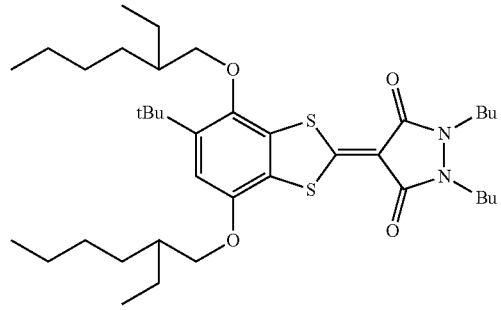
(1)-12
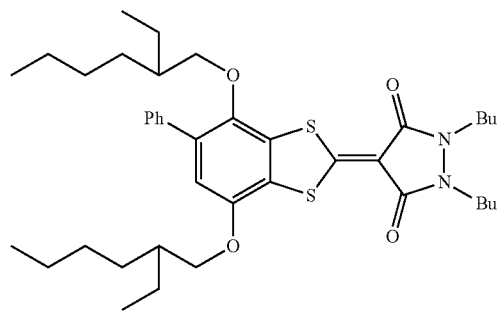
(1)-13
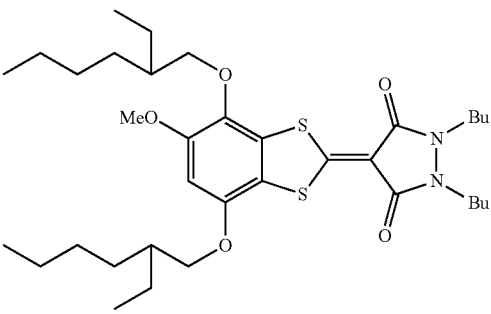
(1)-14
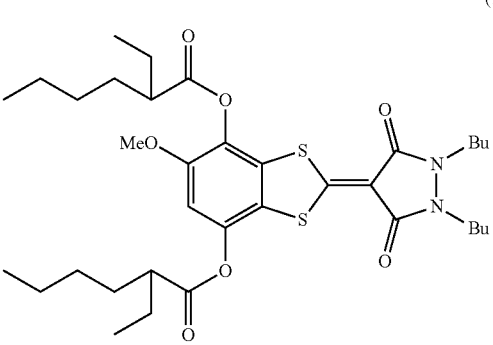
(1)-15
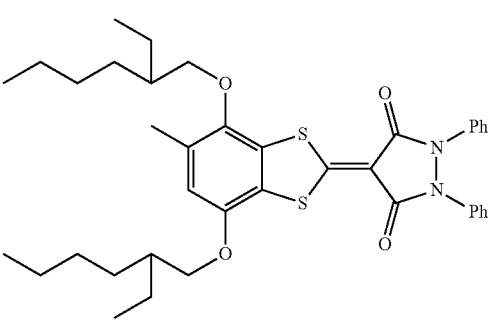
(1)-16
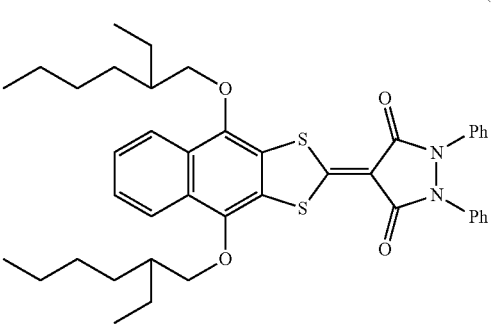
(1)-17
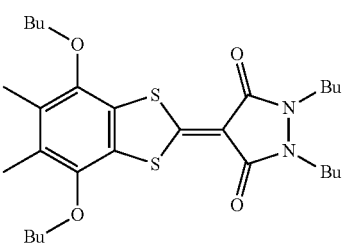

(1)-18
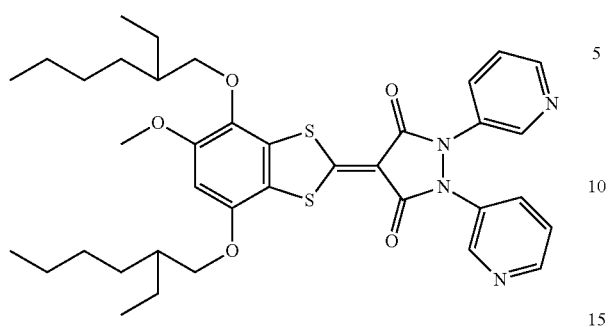
(1)-19
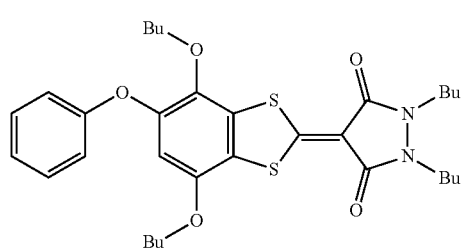
(1)-20
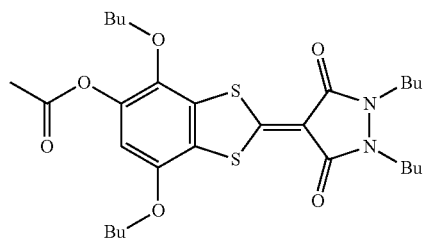
(1)-21
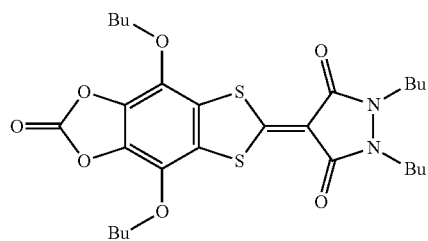
(1)-22
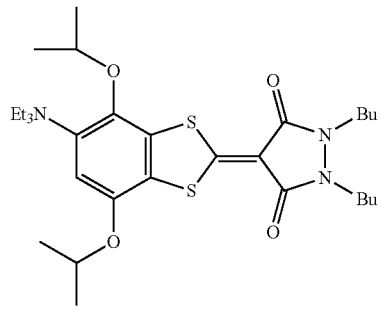
(1)-23
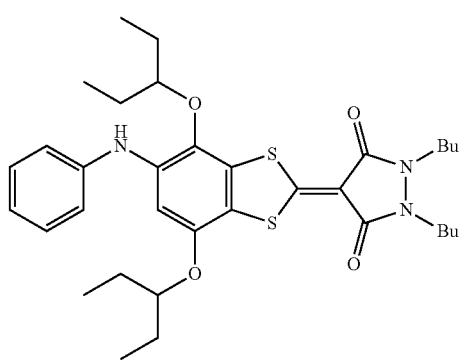
(1)-24
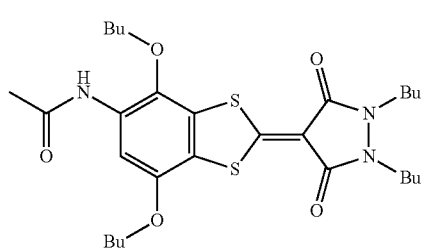
(1)-25
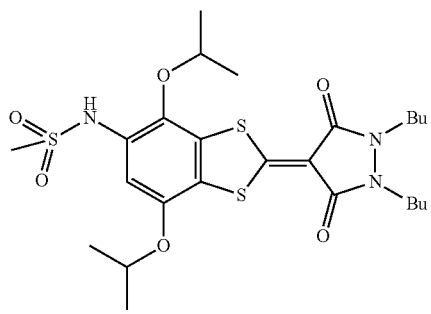
(1)-26
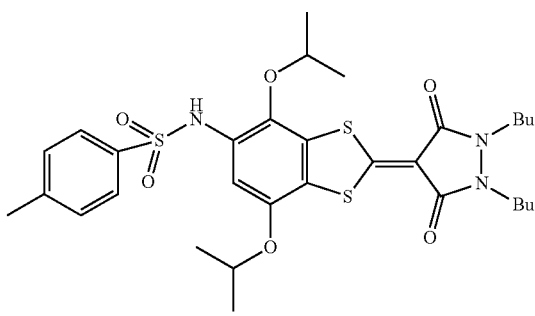
(1)-27
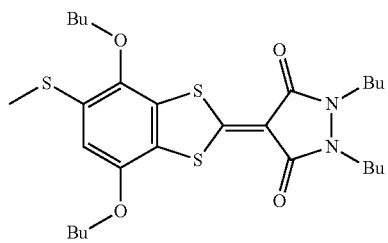

-continued
(1)-28
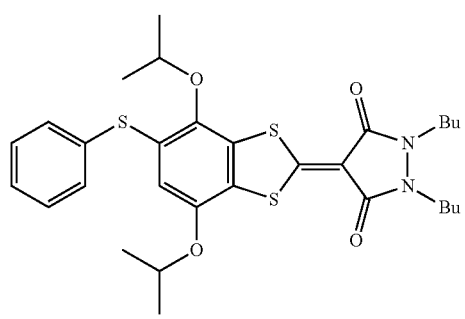
(1)-29
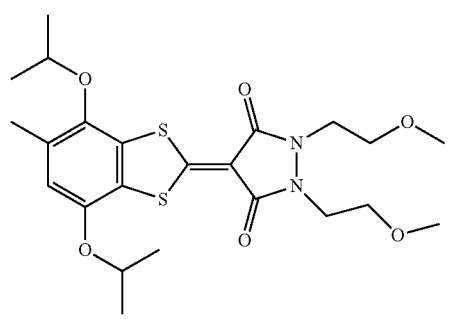
(1)-30
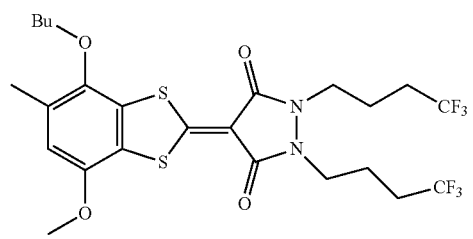
(1)-31
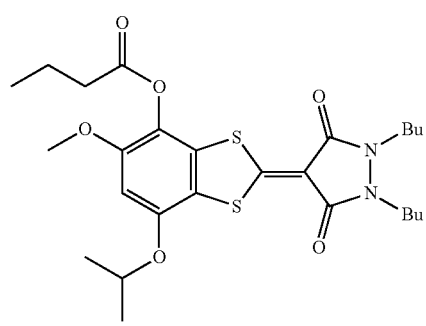
(1)-32
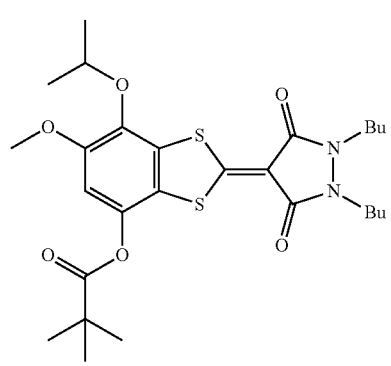
-continued
(1)-33
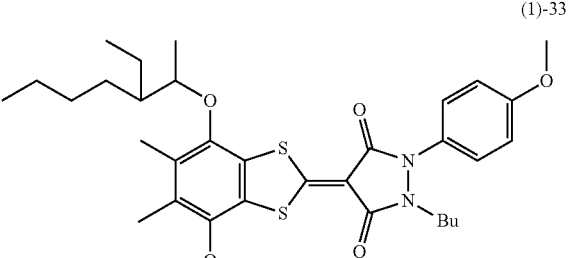
(1)-34
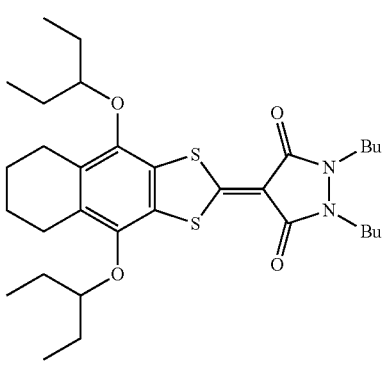
(1)-35
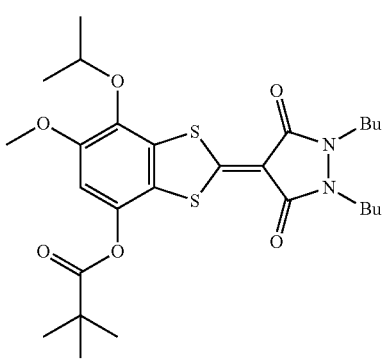
(1)-36
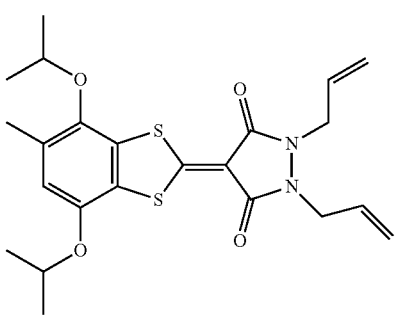

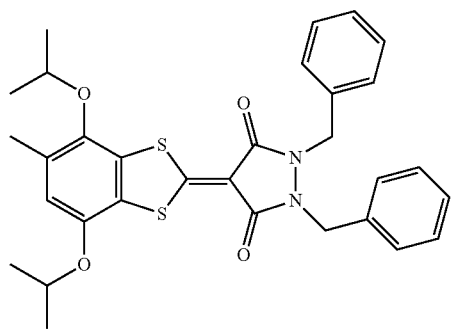
(1)-37
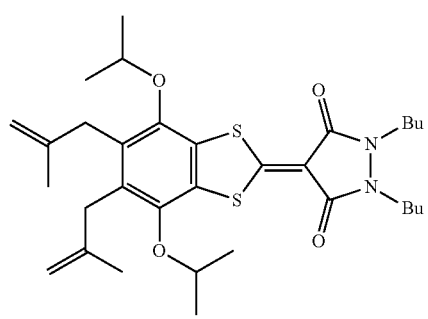
(1)-38
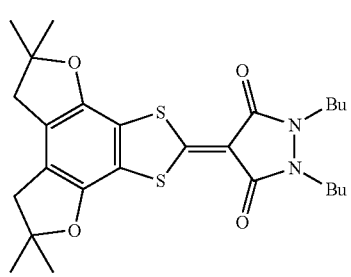
(1)-39
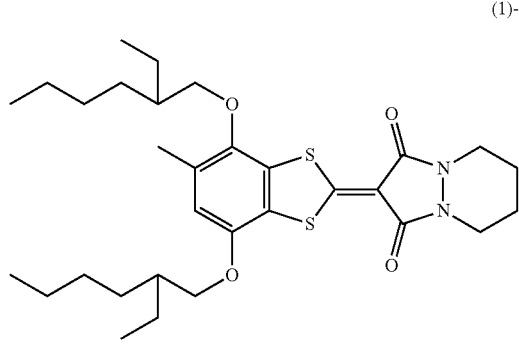
(1)-40
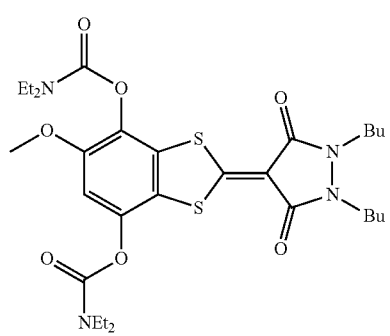
(1)-41
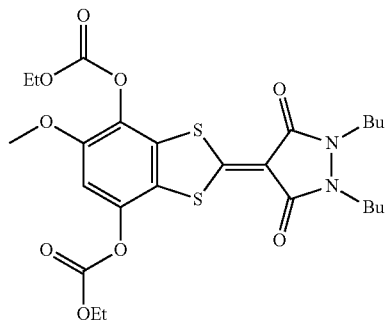
(1)-42
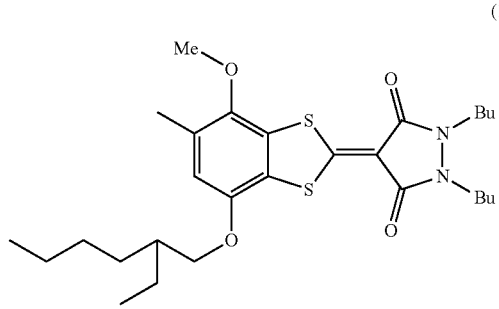
(1)-43
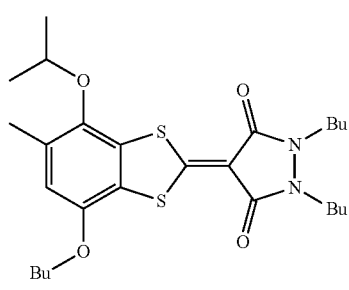
(1)-44
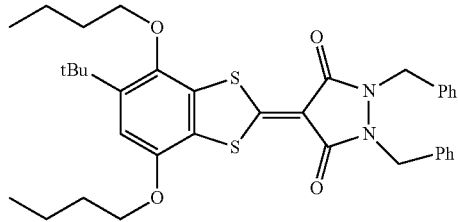
(1)-45
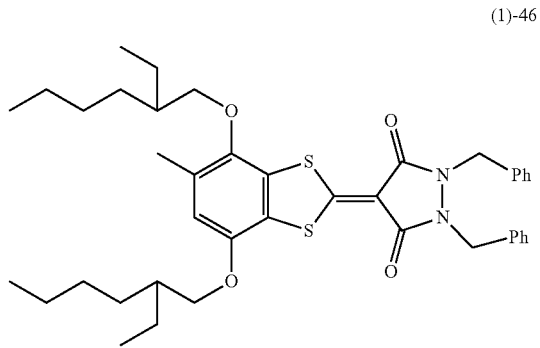
(1)-46

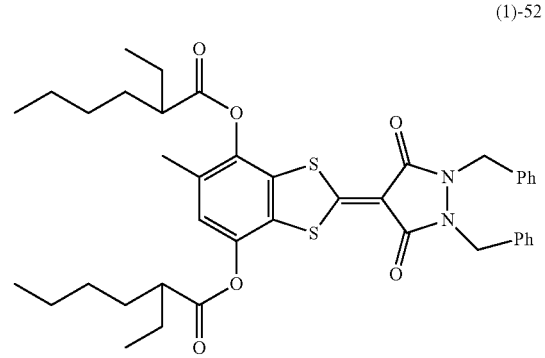
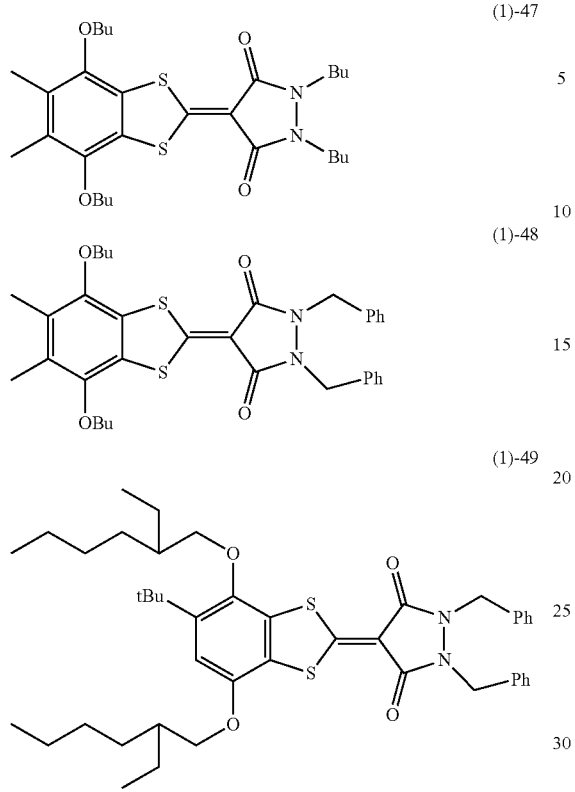

-continued
(1)-56
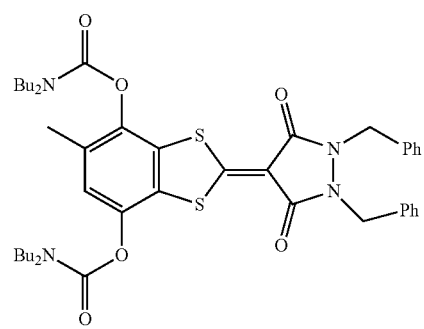
(1)-57
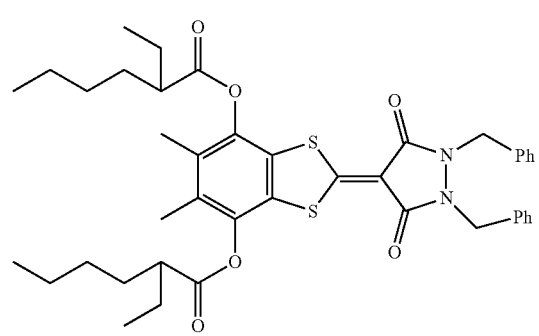
(1)-58
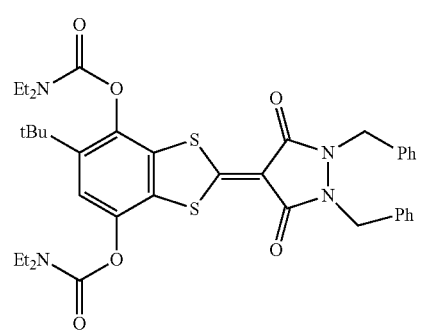
(1)-59
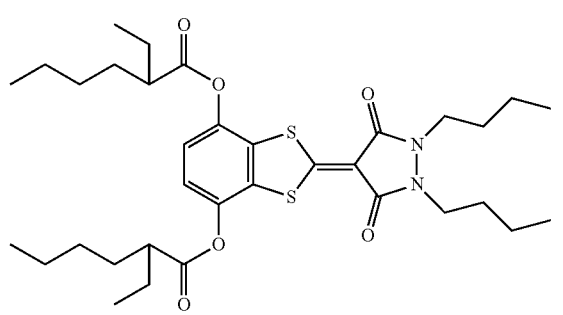
-continued
(1)-60
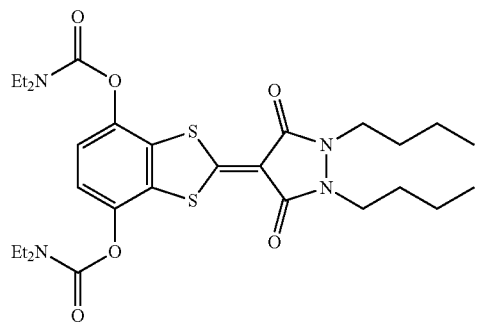
(1)-61
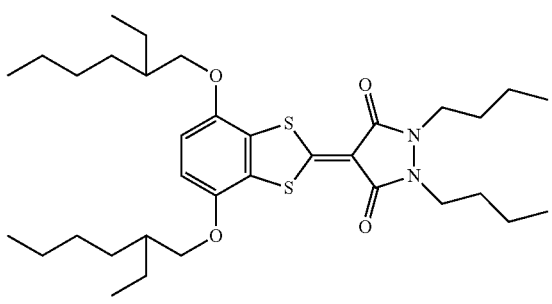
(1)-62
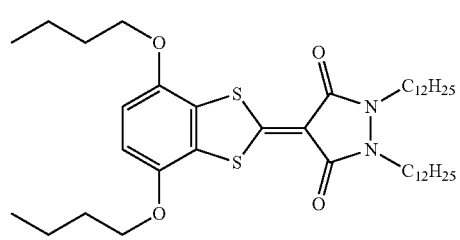
(1)-63
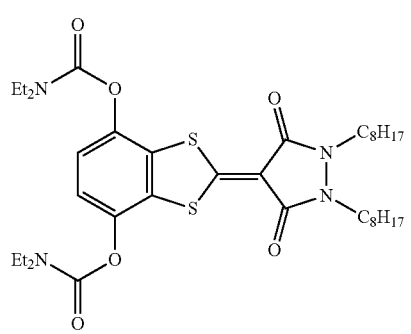
(1)-64
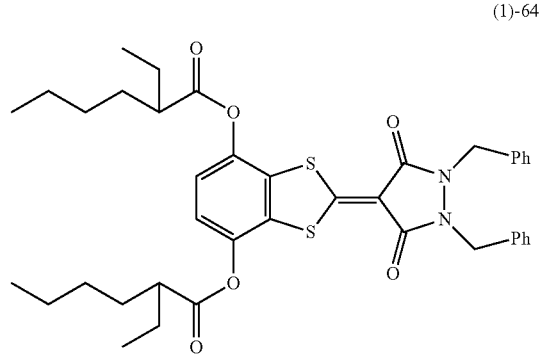

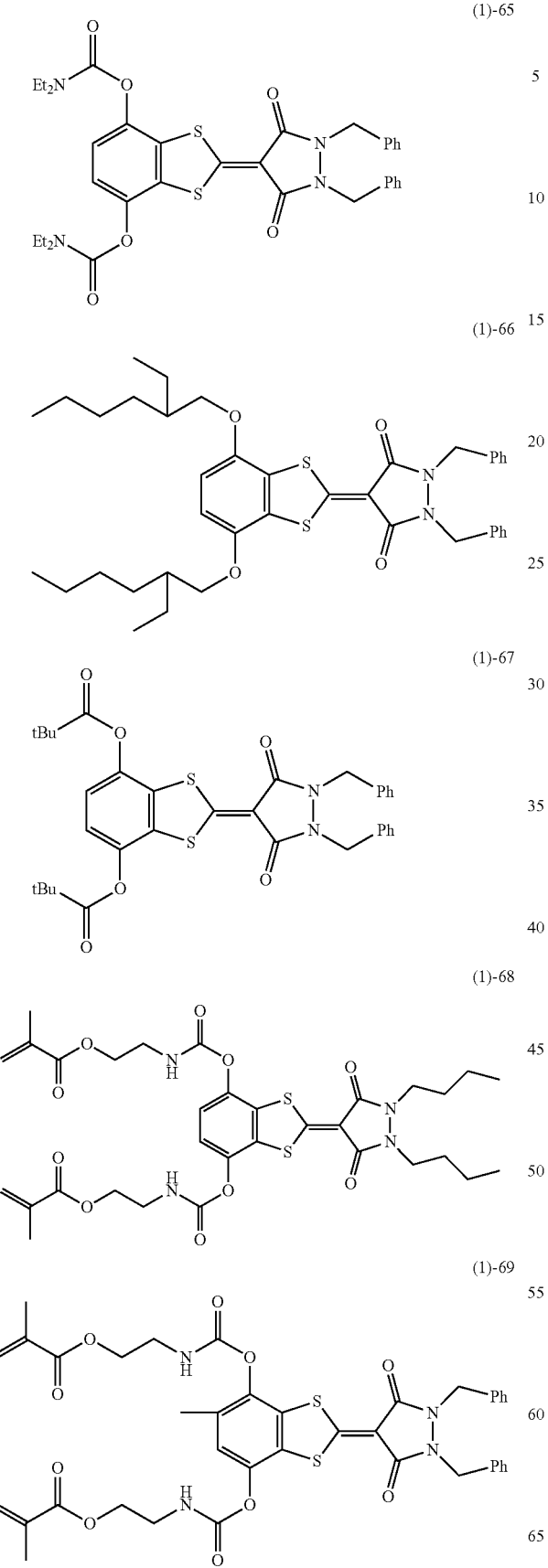
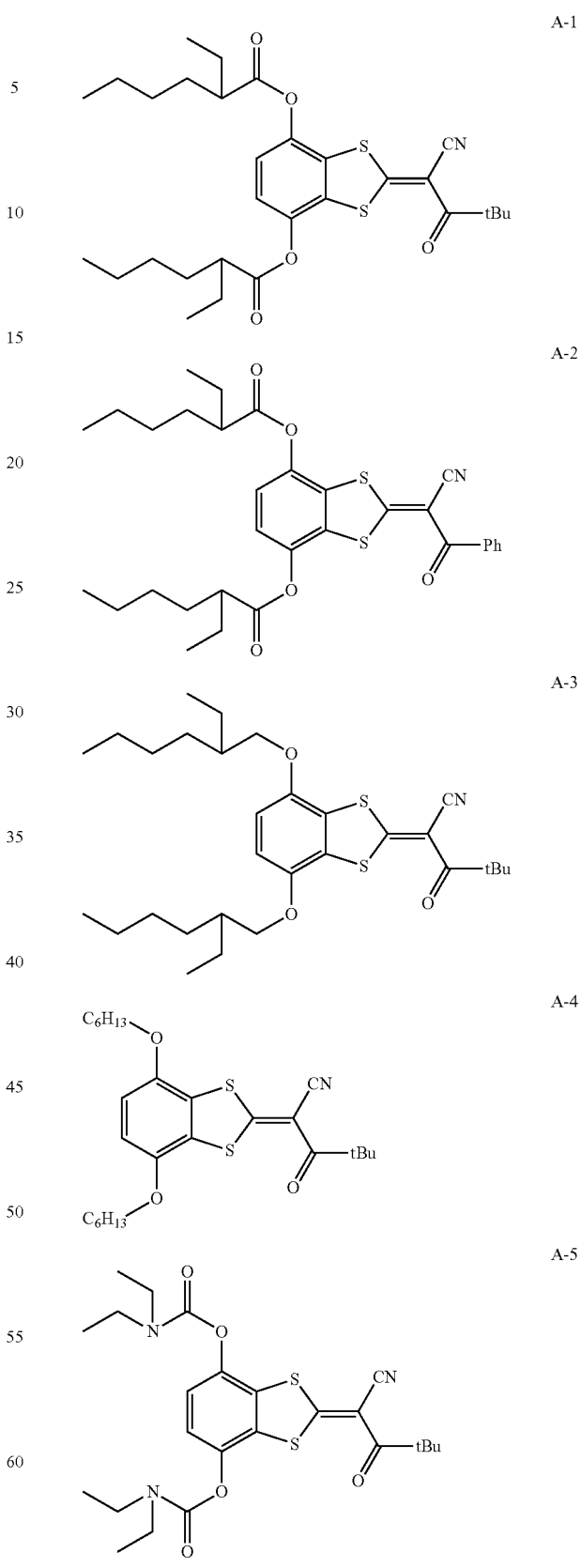

-continued
A-6
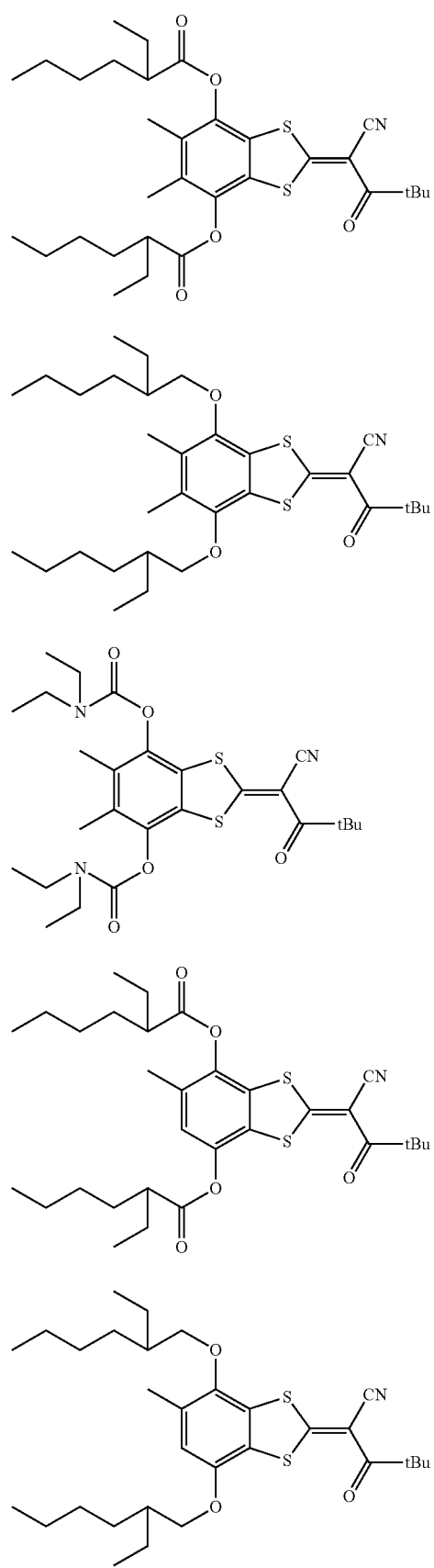
A-7
A-8
A-9
A-10
-continued
A-11
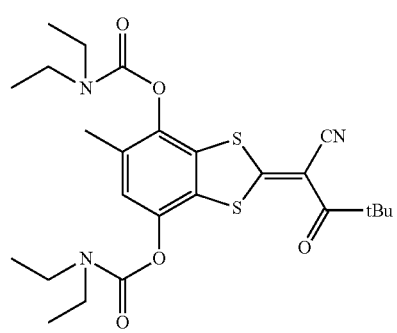
A-12
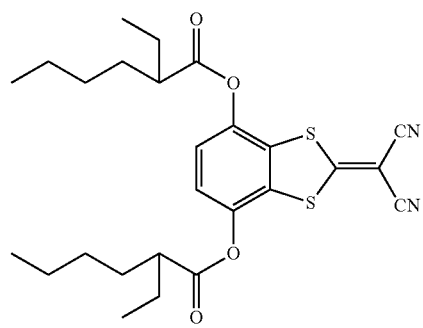
A-13
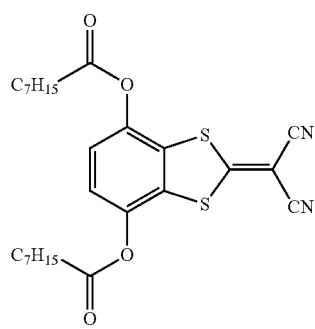
A-14
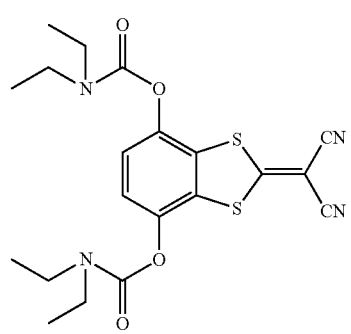
A-15
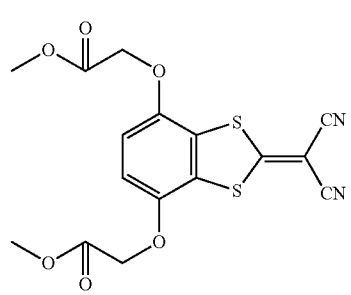

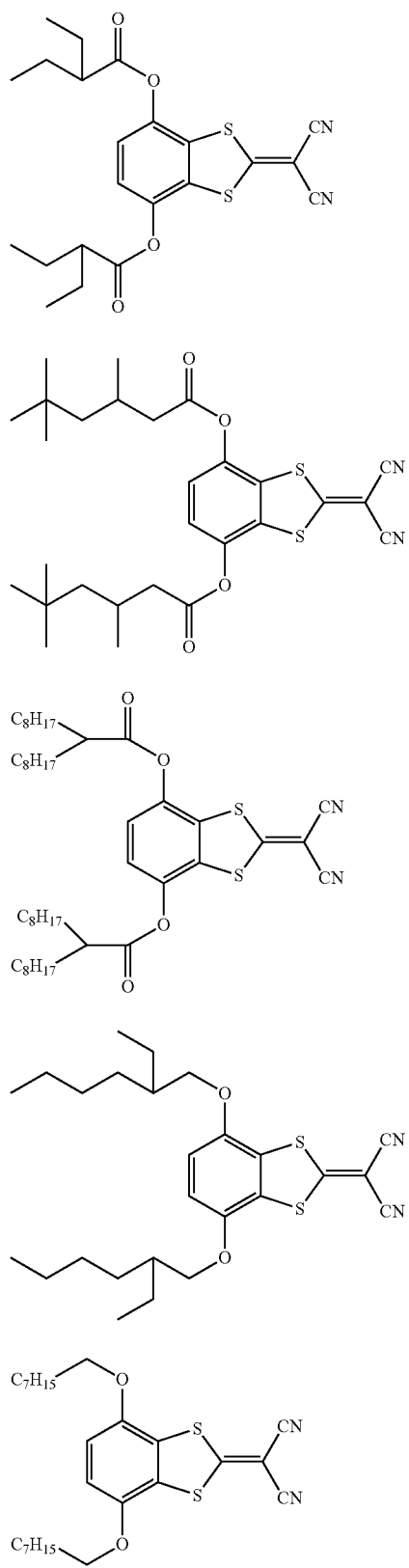
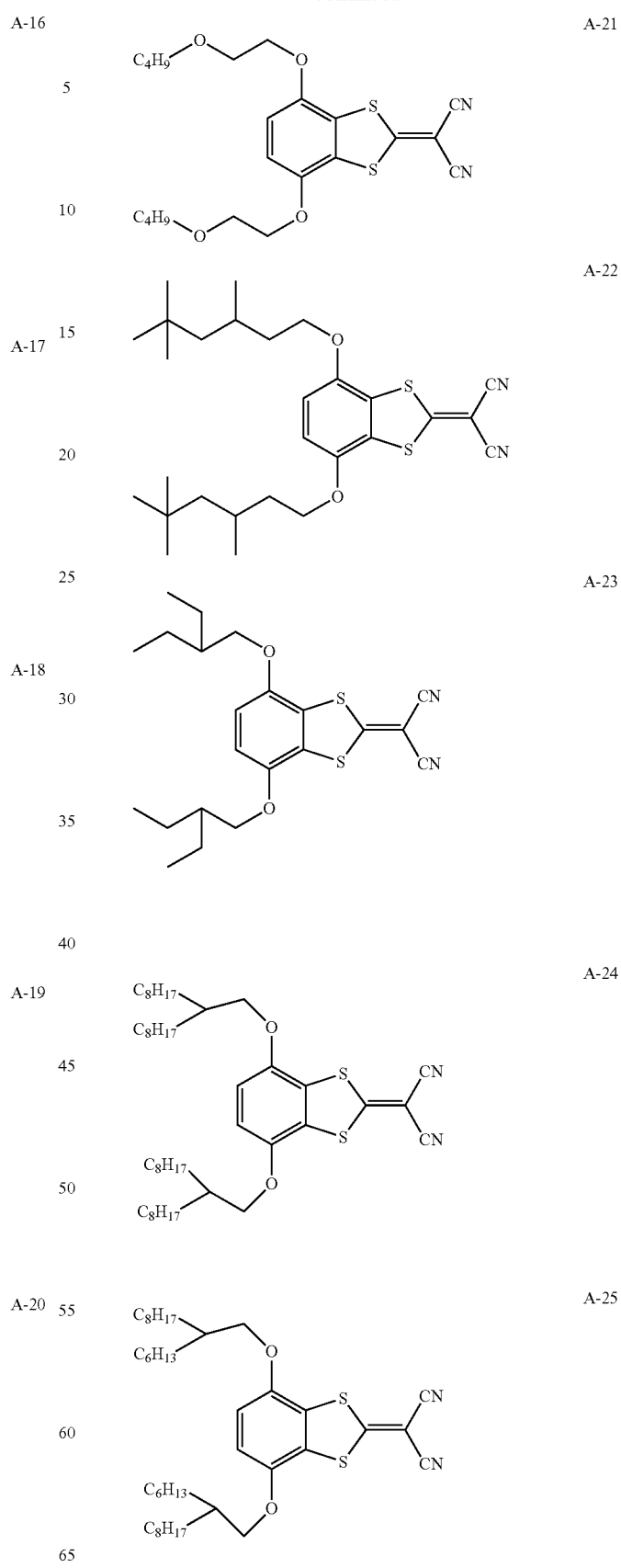

A-26 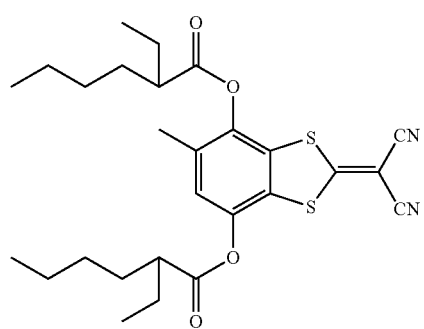
A-27 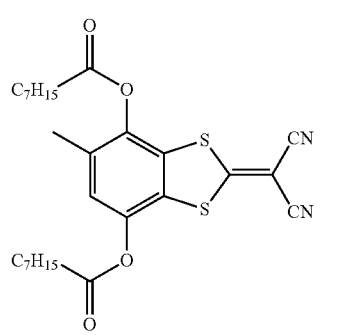
A-28 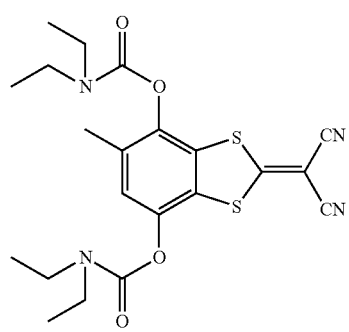
A-29 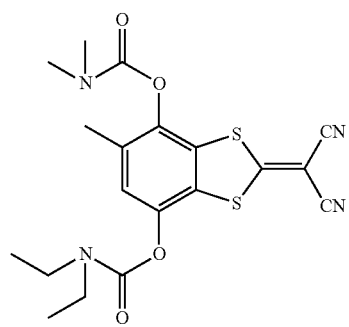
A-30 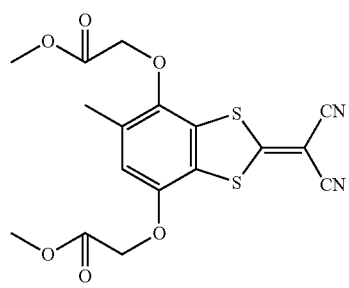
A-31 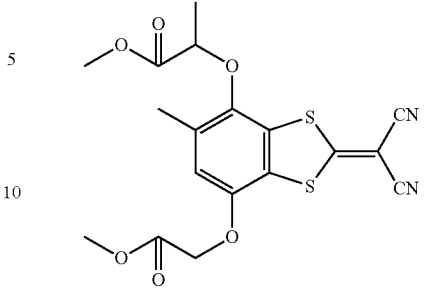
A-32 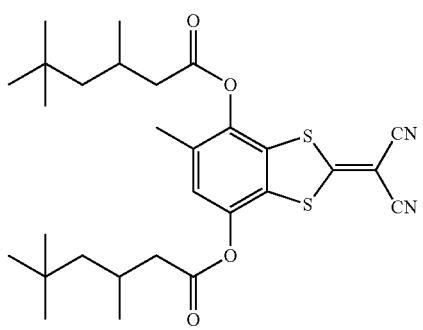
A-33 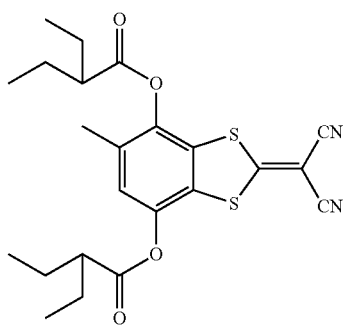
A-34 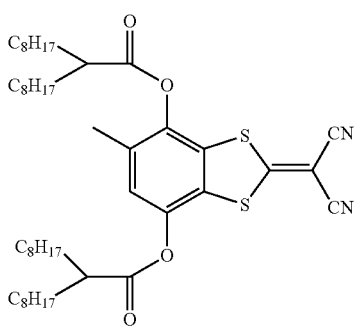
A-35 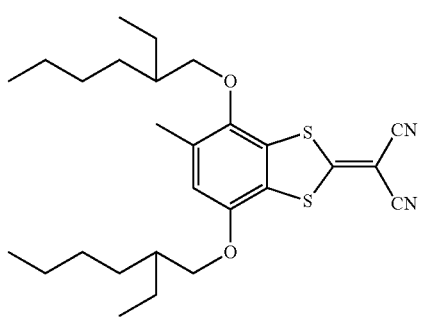

A-36
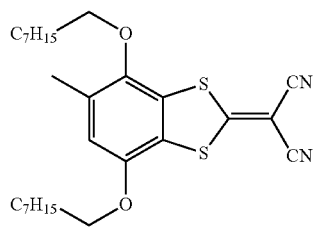
A-37
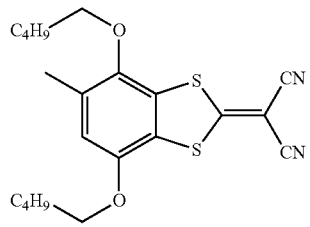
A-38
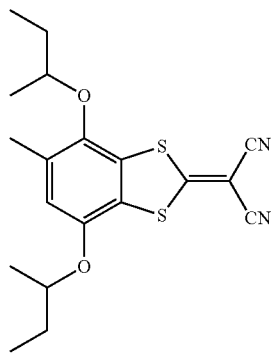
A-39
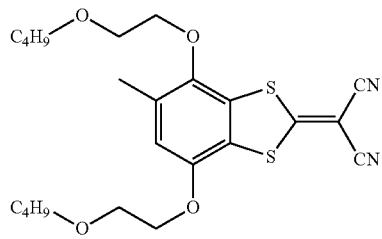
A-40
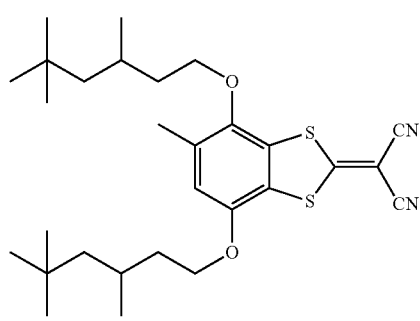
A-41
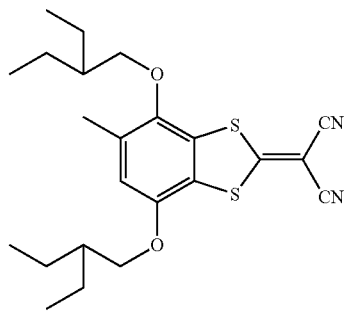
A-42
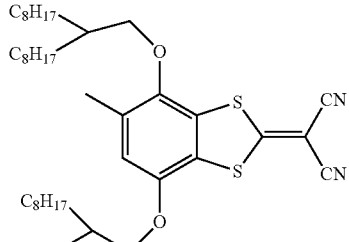
A-43
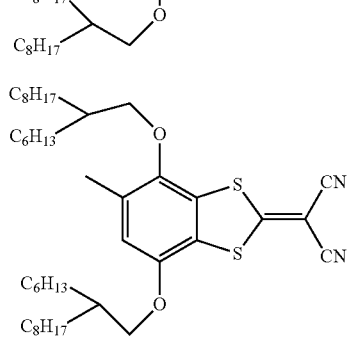
A-44
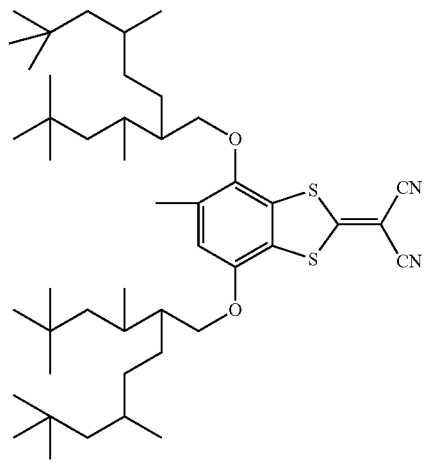
A-45
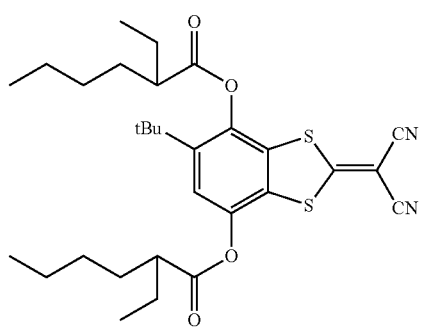

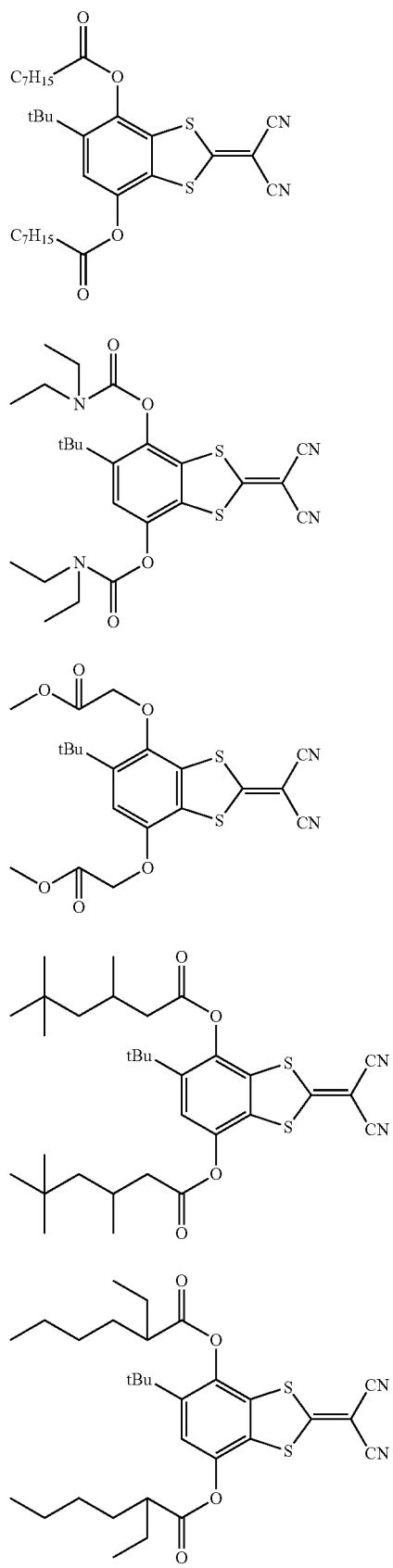
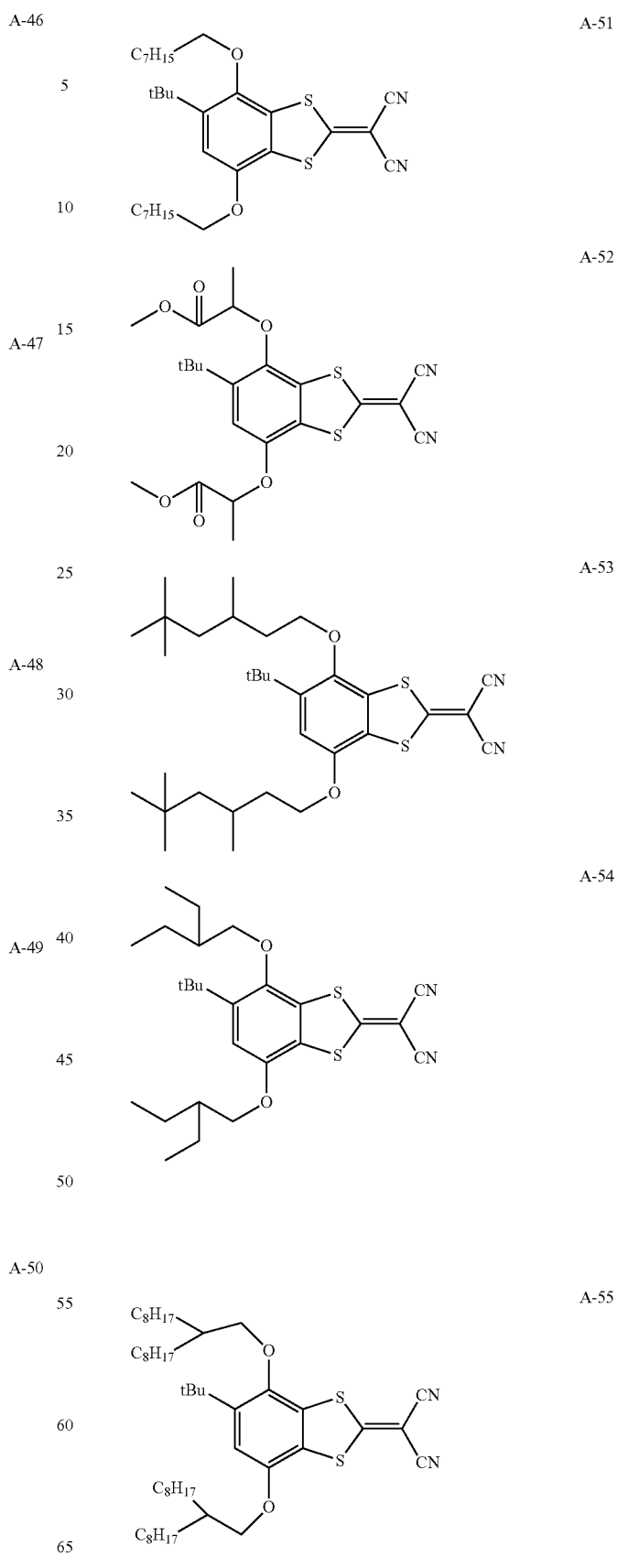

A-56
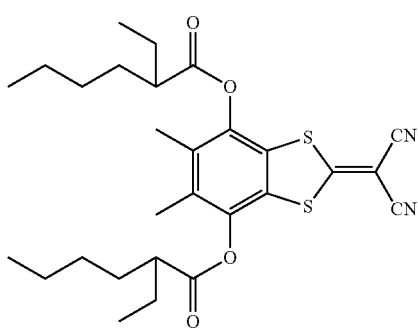
A-57
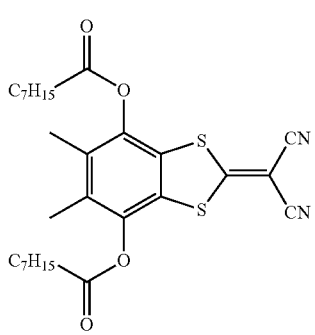
A-58
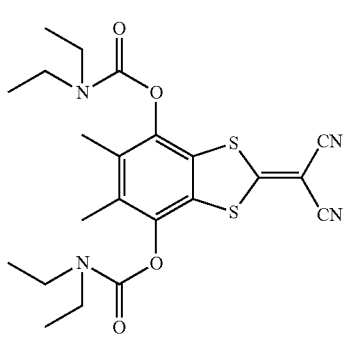
A-59
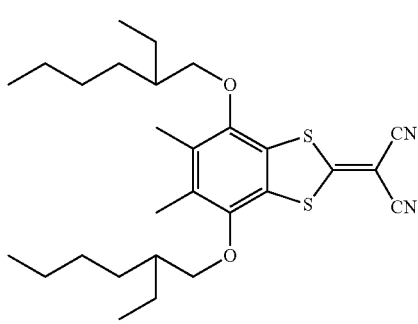
A-60
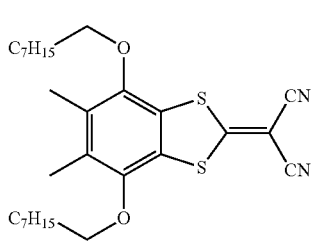
A-61
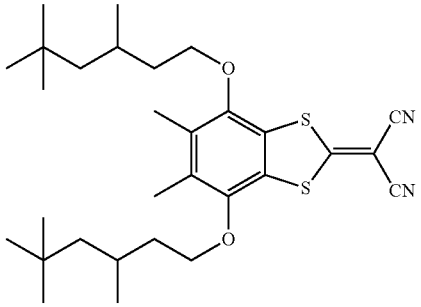
A-62
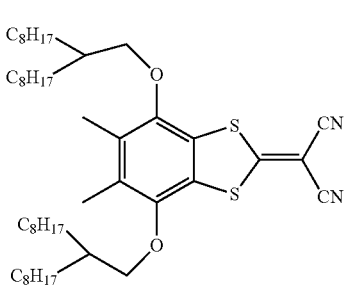
A-63
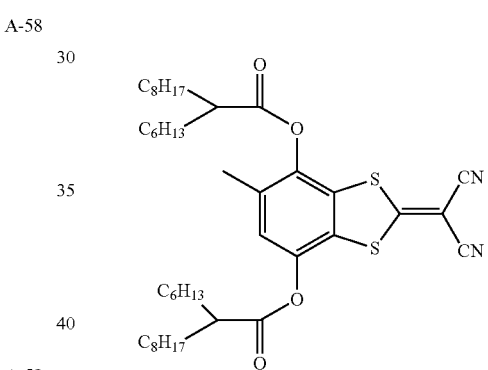
A-64
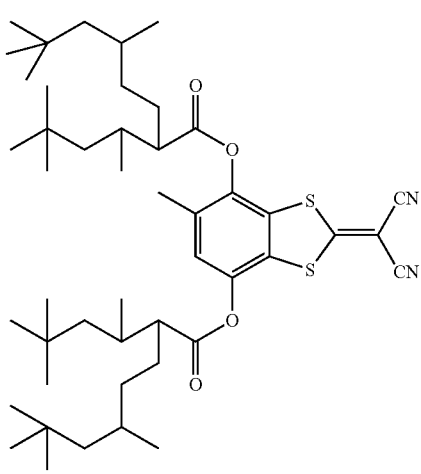

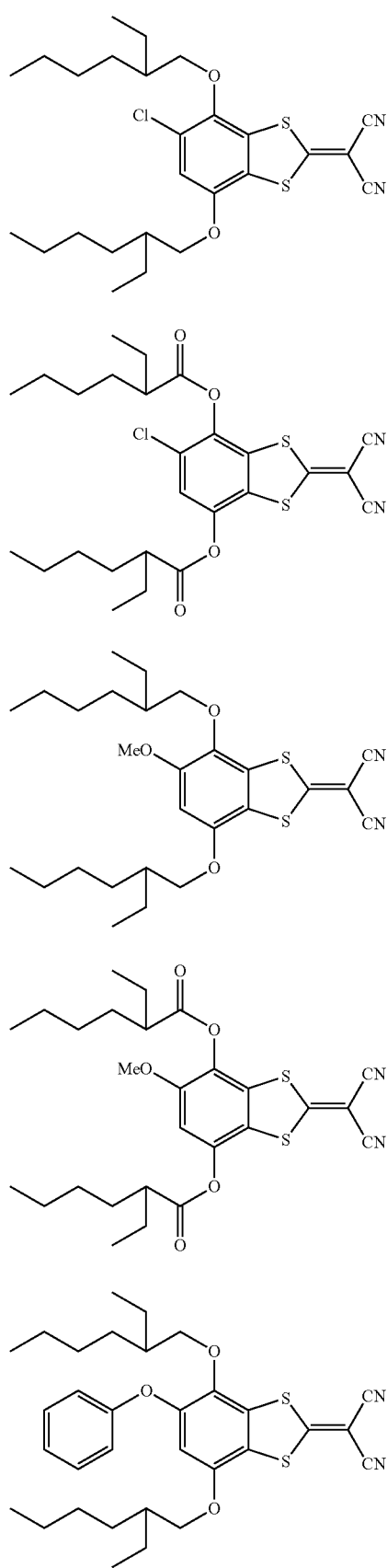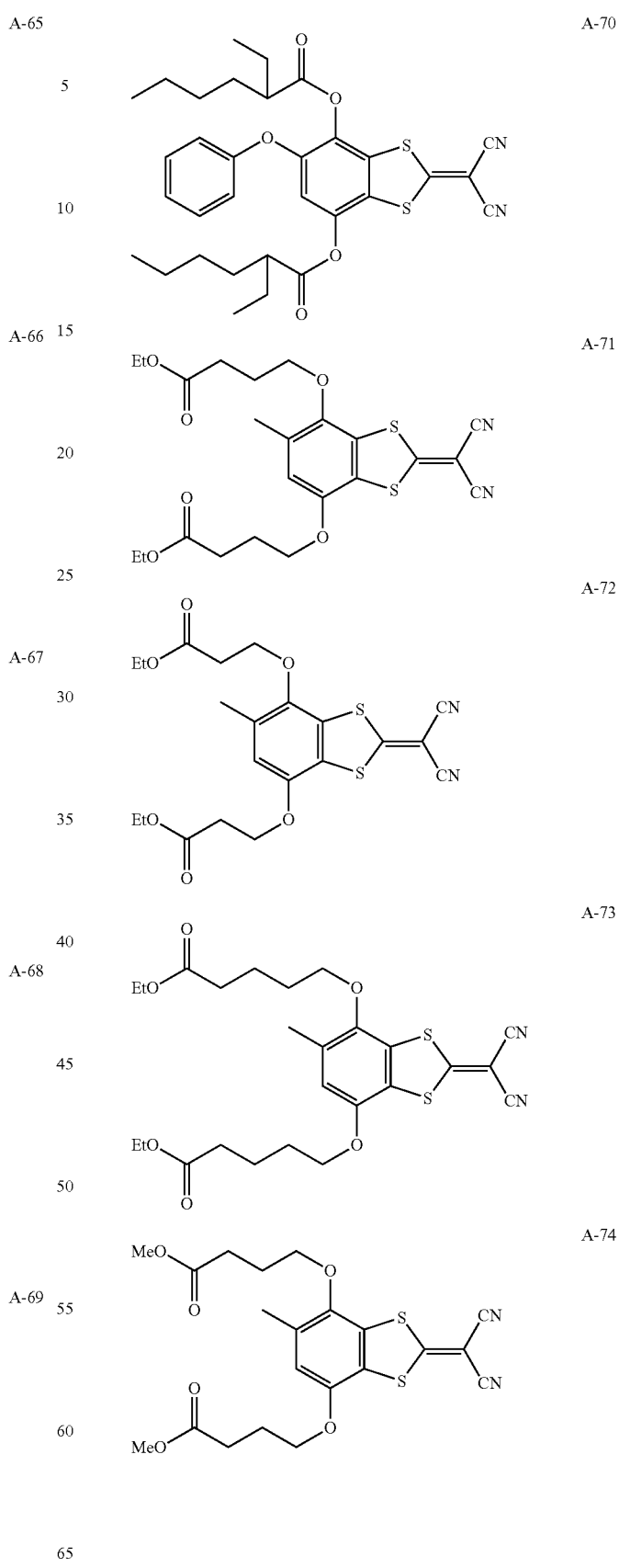

A-75
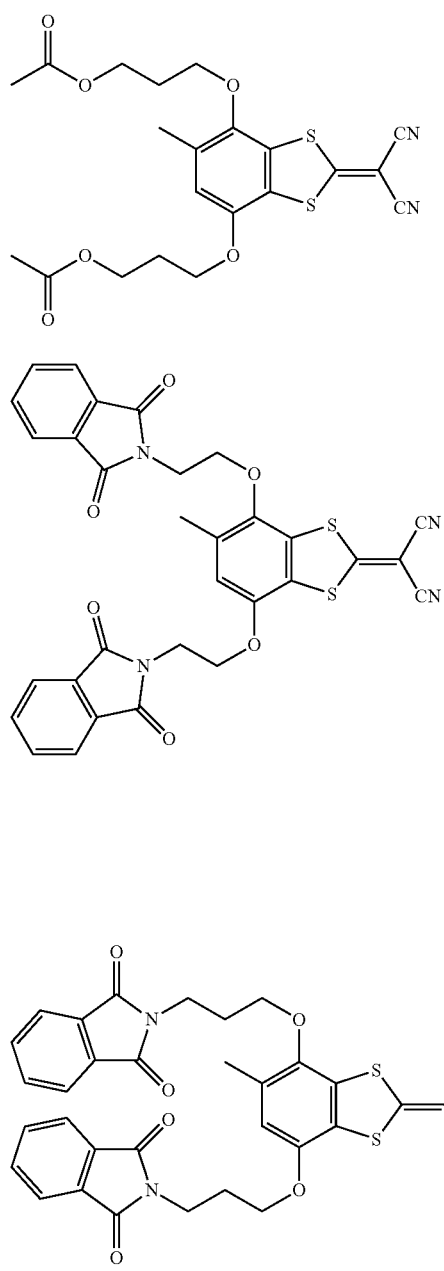
A-76
A-77
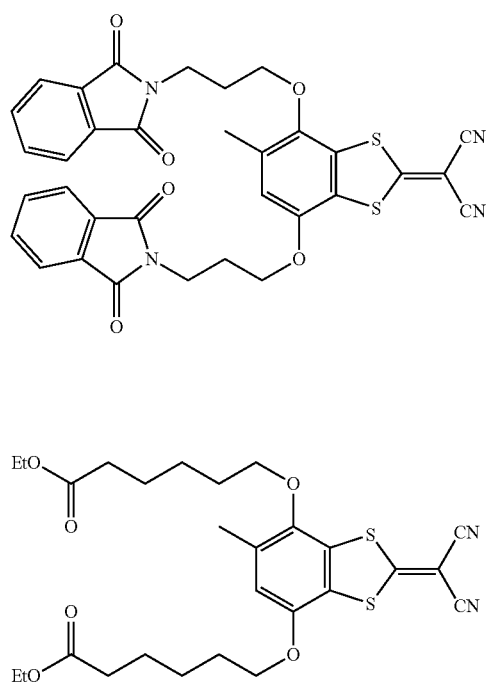
A-78
A-79
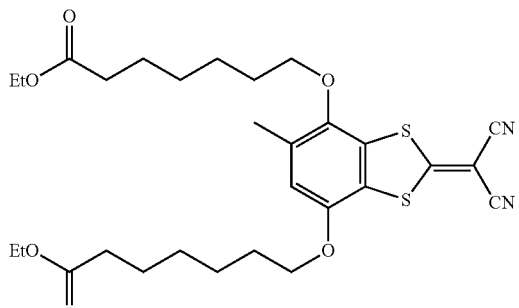
A-80
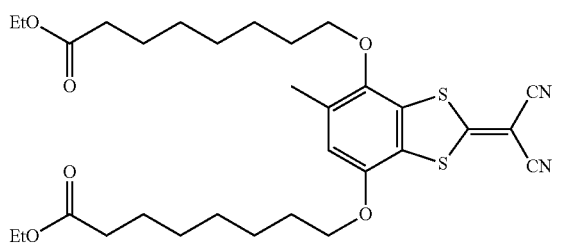
A-81
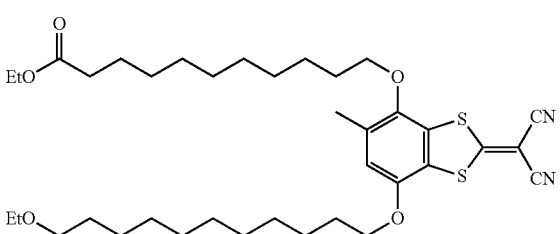
A-82
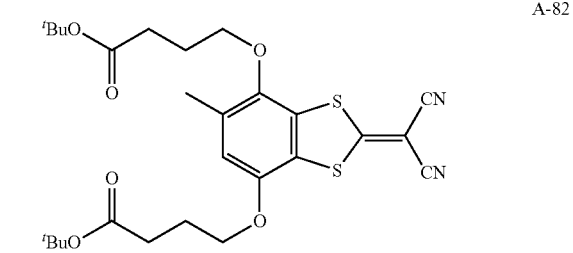
A-83
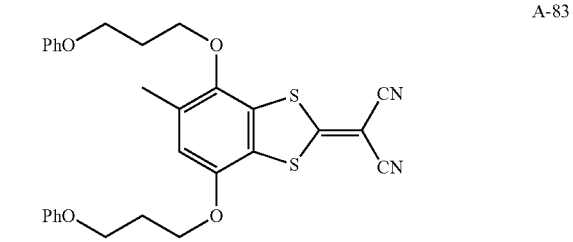

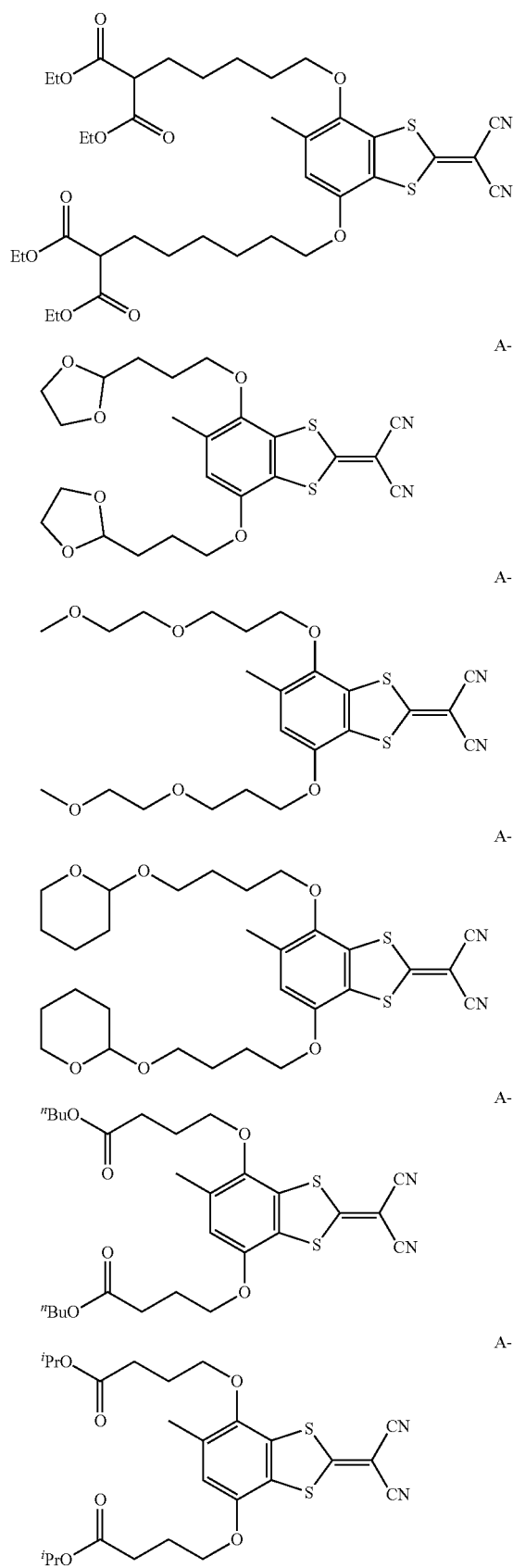
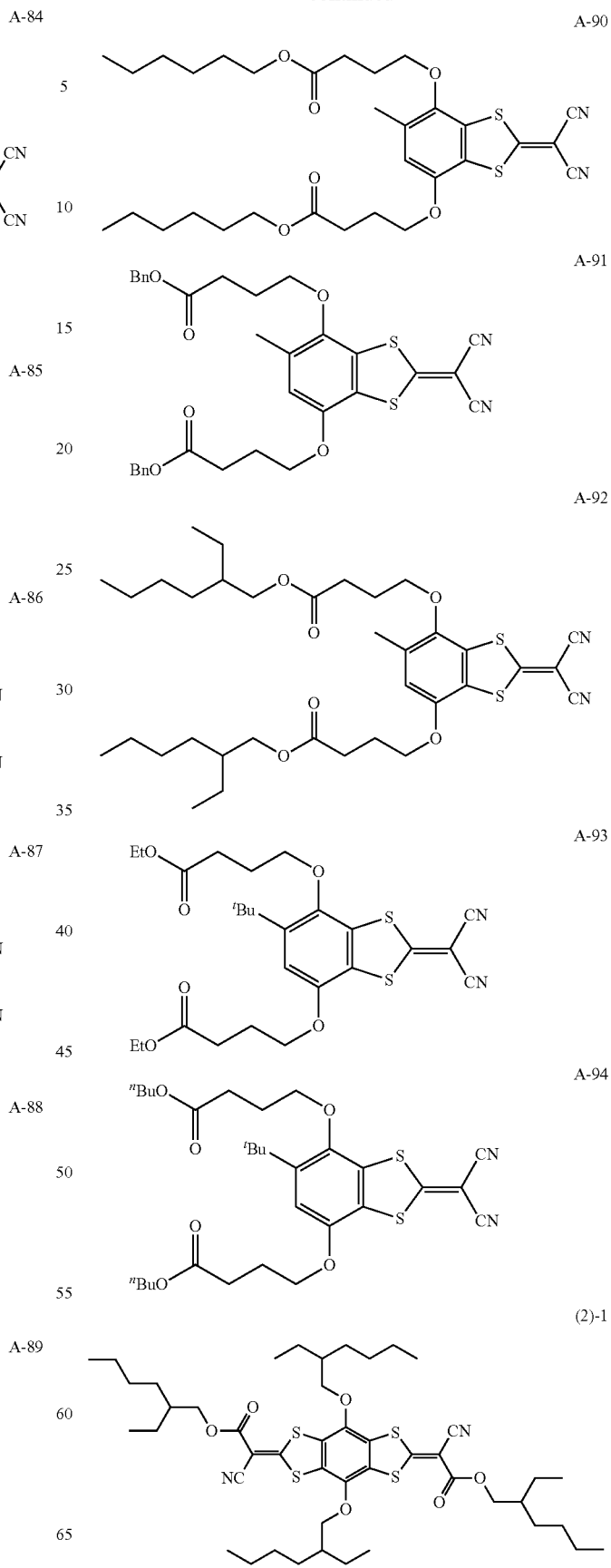

(2)-2
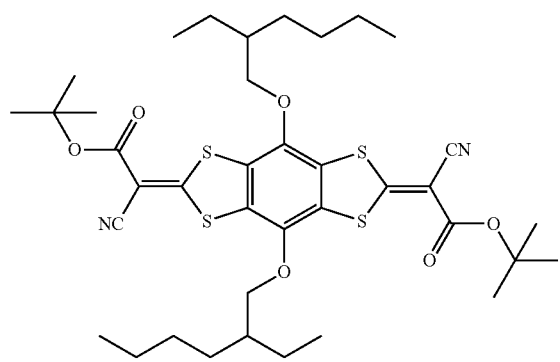
(2)-3
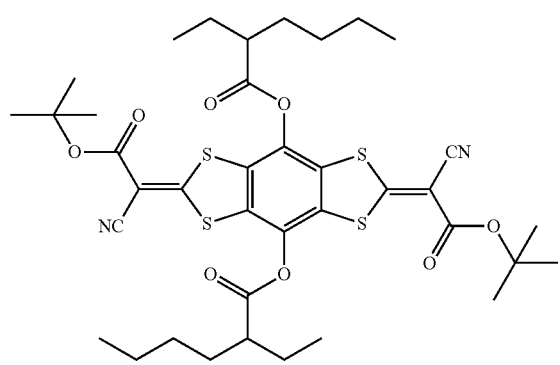
(2)-4
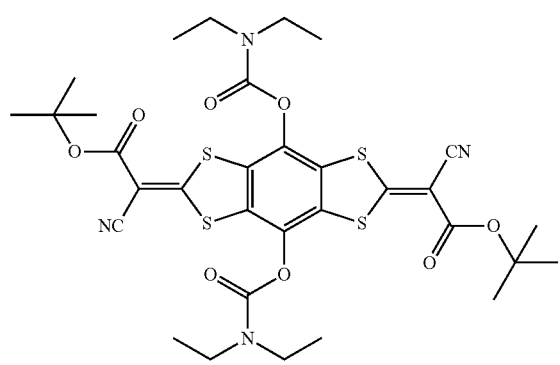
(2)-5
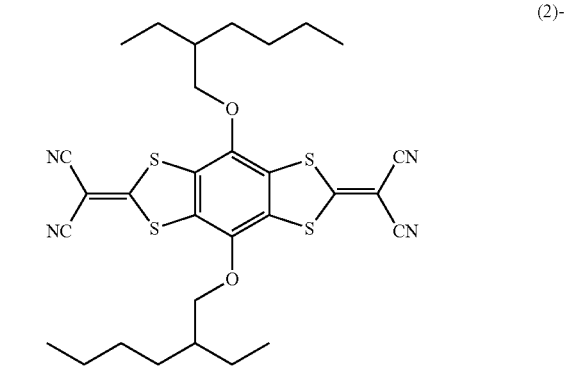
(2)-6
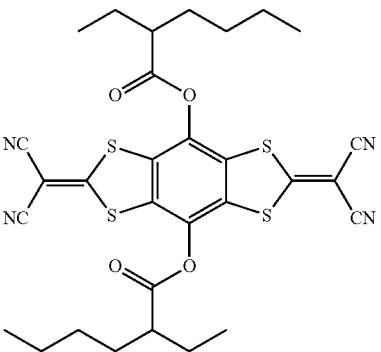
(2)-7
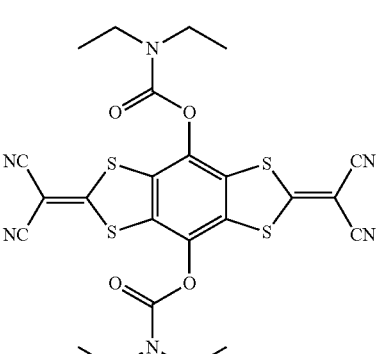
(2)-8
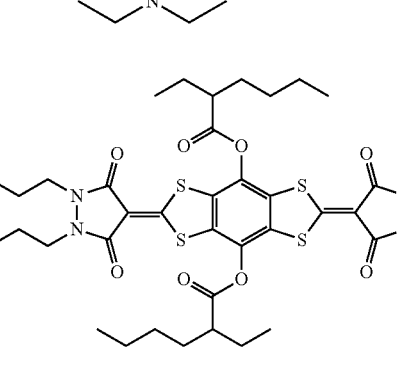
(2)-9
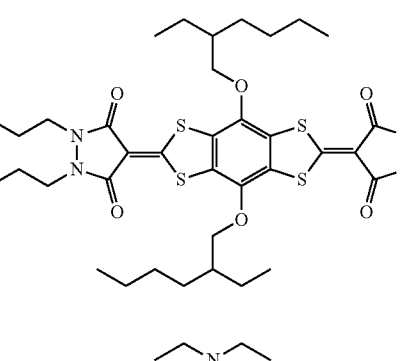
(2)-10
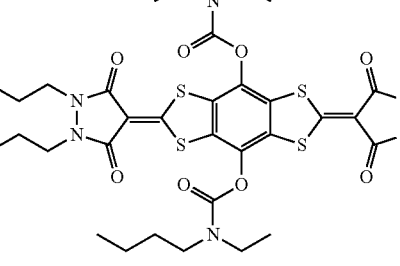

-continued

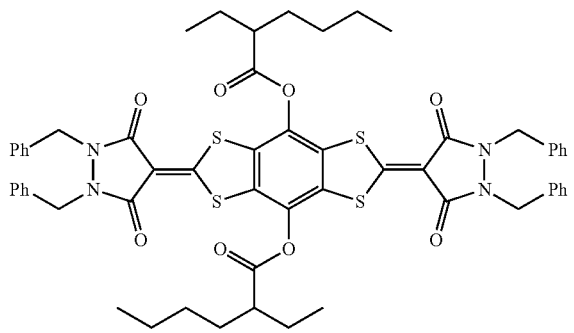

(2)-11

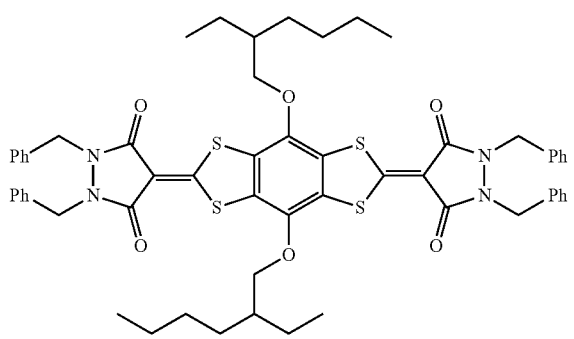

(2)-12

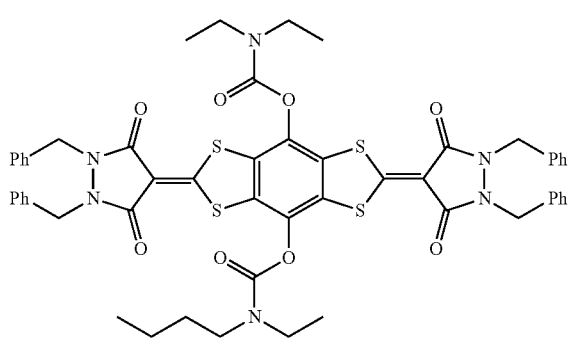

(2)-13

The content of the specific compound in the total solid content of the photopolymerizable composition is preferably in a range of 0.01% to 50% by mass. The lower limit thereof is preferably 0.05% by mass or greater and more preferably 0.1% by mass or greater. The upper limit thereof is preferably 40% by mass or less, more preferably 30% by mass or less, and still more preferably 20% by mass or less. The photopolymerizable composition may contain only one or two or more kinds of specific compounds. In a case where the photopolymerizable composition contains two or more kinds of specific compounds, it is preferable that the total amount thereof is in the above-described ranges.

Polymerizable Compound

The photopolymerizable composition according to the embodiment of the present invention contains a polymerizable compound. As the polymerizable compound, a compound that can be polymerized and cured by applying energy can be used without limitation. The polymerizable compound may be a radically polymerizable compound or a cationically polymerizable compound. Examples of the radically polymerizable compound include a compound containing an ethylenically unsaturated bond-containing group.

The polymerizable compound is preferably a compound containing an ethylenically unsaturated bond-containing group and more preferably a compound containing two or more ethylenically unsaturated bond-containing groups. The upper limit of the number of ethylenically unsaturated bond-containing groups contained in the polymerizable compound is preferably 15 or less, more preferably 10 or less, and still more preferably 6 or less. Examples of the ethylenically unsaturated bond-containing group contained in the polymerizable compound include a vinyl group, an allyl group, and a (meth)acryloyl group.

It is preferable that the polymerizable compound may be any one of a monomer, a prepolymer (that is, a dimer, a trimer, or an oligomer), a mixture thereof, and a (co)polymer of a compound selected from the monomer and the prepolymer.

The molecular weight of the polymerizable compound is preferably 100 to 3,000. The upper limit is more preferably 2,000 or less and still more preferably 1,500 or less. The lower limit is more preferably 150 or greater and still more preferably 250 or greater.

Radically Polymerizable Compound

Examples of the radically polymerizable compound include a compound containing an ethylenically unsaturated bond-containing group.

Examples of the radically polymerizable compound include an unsaturated carboxylic acid (such as acrylic acid, methacrylic acid, itaconic acid, crotonic acid, isocrotonic acid, or maleic acid), an ester of an unsaturated carboxylic acid, an amide of an unsaturated carboxylic acid, and a (co)polymer of the unsaturated carboxylic acid, the ester thereof, or the amide thereof. Among these, esters of an unsaturated carboxylic acid and an aliphatic polyhydric alcohol, amides of an unsaturated carboxylic acid and an aliphatic polyvalent amine, and homopolymers or copolymers thereof are preferable.

Further, examples of the radically polymerizable compound include an addition reactant of an unsaturated carboxylic acid ester or an unsaturated carboxylic acid amide containing a nucleophilic substituent (such as a hydroxy group, an amino group, or a mercapto group) and a monofunctional or polyfunctional isocyanate compound or an epoxy compound; a dehydration condensation reactant of an unsaturated carboxylic acid ester or an unsaturated carboxylic acid amide containing a nucleophilic substituent and a monofunctional or polyfunctional carboxylic acid; an addition reactant of an unsaturated carboxylic acid ester or an unsaturated carboxylic acid amide containing an electrophilic substituent (such as an isocyanate group or an epoxy group), a monofunctional or polyfunctional alcohol, and an amine or a thiol; and a substitution reactant of an unsaturated carboxylic acid ester or an unsaturated carboxylic acid amide containing a releasable substituent (such as a halogen group or a tosyloxy group), a monofunctional or polyfunctional alcohol, and an amine or a thiol. Further, a compound obtained by substituting the above-described unsaturated carboxylic acid with an unsaturated phosphonic acid, styrene, vinyl ether, or the like can also be used.

Further, a plurality of compounds with different numbers of functional groups or a plurality of compounds with different kinds of polymerizable groups (for example, acrylic acid ester, methacrylic acid ester, a styrene compound, or a vinyl ether compound) may be used in combination as the radically polymerizable compound.

As the radically polymerizable compound, a (meth)acrylate compound is preferable, a bifunctional or higher functional (meth)acrylate compound is more preferable, a bifunctional to pentadecafunctional (meth)acrylate compound is still more preferable, a bifunctional to decafunctional (meth)acrylate compound is even still more preferable, and a bifunctional to hexafunctional (meth)acrylate compound is particularly preferable. As the polymerizable compound, a monofunctional (meth)acrylate compound can also be used. A monofunctional (meth)acrylate compound and a bifunctional or higher functional (meth)acrylate compound can be used in combination.

Specific examples of the radically polymerizable compound include pentaerythritol tri(meth)acrylate, pentaerythritol tetra(meth)acrylate, dipentaerythritol penta(meth)acrylate, dipentaerythritol hexa(meth)acrylate, tri((meth)acryloyloxyethyl) isocyanurate, a pentaerythritol tetra(meth)acrylate ethylene oxide (EO)-modified product, a dipentaerythritol hexa(meth)acrylate ethylene oxide (EO)-modified product, benzyl (meth)acrylate, 1,3-butylene glycol di(meth)acrylate, diethylene glycol di(meth)acrylate, neopentyl glycol di(meth)acrylate, triethylene glycol di(meth)acrylate, bisphenol A polyethoxy di(meth)acrylate, hexadiol di(meth)acrylate, polyethylene glycol di(meth)acrylate, polypropylene glycol di(meth)acrylate, 1,4-butanediol di(meth)acrylate, trimethylolpropane tri(meth)acrylate, tripropylene glycol tri(meth)acrylate, butyl (meth)acrylate, isobornyl (meth)acrylate, dicyclopentenyl acrylate, dicyclopentanyl acrylate, dicyclopentenyloxyethyl (meth)acrylate, 4-tert-butyl cyclohexyl (meth)acrylate, 2-hydroxyethyl (meth)acrylate, 4-hydroxybutyl (meth)acrylate, isobutyl (meth)acrylate, t-butyl (meth)acrylate, isooctyl (meth)acrylate, 2-methoxyethyl (meth)acrylate, 2-ethoxyethyl (meth)acrylate, 3-methoxybutyl (meth)acrylate, cyclohexyl (meth)acrylate, 2-(2-ethoxyethoxy)ethyl (meth)acrylate, stearyl (meth)acrylate, cyclohexyl (meth)acrylate, tetrahydrofurfuryl (meth)acrylate, and benzyl (meth)acrylate.

Examples of commercially available products of the radically polymerizable compound include KAYARAD series (for example, D-330, D-320, D-310, PET-30, TPA-330, DPHA, and DPHA-40H, manufactured by Nippon Kayaku Co., Ltd.), NK Ester series (for example, A-DPH-12E, A-TMMT, and A-TMM-3, manufactured by Shin-Nakamura Chemical Co., Ltd.), Light Acrylate series (for example, DCP-A, manufactured by Kyoeisha Chemical Co., Ltd.), ARONIX series (for example, M-305, M-306, M-309, M-450, M-402, and TO-1382, manufactured by Toagosei Company, Limited), VISCOAT series (for example, V#802, manufactured by Osaka Organic Chemical Industry Ltd.), BEAMSET series (for example, 504H, 550B, 575, and 577, manufactured by Arakawa Chemical Industries, Ltd.), and polyfunctional (meth)acrylate compounds such as EBECRYL series (manufactured by Daicel Corporation).

As the radically polymerizable compound, the (meth)acrylate compounds described in JP1973-064183A (JP-S48-064183A), JP1974-043191B (JP-S49-043191B), and JP1977-030490B (JP-S52-030490B), and the compounds introduced as photocurable monomers and oligomers in The Adhesion Society of Japan, vol. 20, No. 7, pp. 300 to 308 (1984) can be used.

Cationically Polymerizable Compound

Examples of the cationically polymerizable compound include a compound having a cationically polymerizable group. Examples of the cationically polymerizable group include a cyclic ether group such as an epoxy group or an oxetanyl group, and a vinyl ether group. Among these, a cyclic ether group is preferable. Further, it is preferable that the cationically polymerizable compound is a polyfunctional cationically polymerizable compound containing two or more cationically polymerizable groups.

Examples of the cationically polymerizable compound include a polyfunctional alicyclic epoxy compound, a polyfunctional heterocyclic epoxy compound, a polyfunctional oxetane compound, alkylene glycol diglycidyl ether, and an alkylene glycol monovinyl monoglycidyl ether.

Specific examples of the cationically polymerizable compound include 3',4'-epoxycyclohexylmethyl 3,4-epoxycyclohexane carboxylate, bisphenol A diglycidyl ether, hydrogenated bisphenol A diglycidyl ether, 3,4-epoxycyclohexylmethyl-3',4'-epoxycyclohexane carboxylate, a 1,2-epoxy-4-(2-oxiranyl)cyclohexane adduct of 2,2-bis(hydroxymethyl)-1-butanol, xylylene bisoxetane, 3-ethyl-3-hydroxymethyl oxetane, 3-ethyl-3-{[(3-ethyl oxetane-3-yl)methoxy]methyl}oxetane, cyclohexanedimethanol divinyl ether, 2-ethylhexyl vinyl ether, cyclohexanedimethanol monovinyl ether, and 4-hydroxybutyl vinyl ether, and the compounds described in paragraphs 0029 to 0058 of JP2012-046577A.

As the cationically polymerizable compound, a (meth)acrylate compound containing a cationically polymerizable group can also be used. Specific examples of the (meth)acrylate compound containing a cationically polymerizable group include 3,4-epoxycyclohexylmethyl methacrylate. Examples of a commercially available product thereof include CYCLOMER M100 (manufactured by Daicel Corporation).

As the cationically polymerizable compound, ARON OXETANE series (such as OXT-101, OXT-121, or OXT-221, manufactured by Toagosei Company, Limited), CELLOXIDE series (2021P, manufactured by Daicel Corporation), and alkyl divinyl ether CHDVE, alkyl monovinyl ether EHVE, hydroxyalkyl vinyl ether CHMVE, and hydroxyalkyl vinyl ether HBVE (all manufactured by Nippon Carbide Industries Co., Inc.). Further, those exemplified as specific examples of the epoxy resin described below can also be used.

The content of the polymerizable compound in the total solid content of the photopolymerizable composition is preferably in a range of 0.1% to 90% by mass. The lower limit is preferably 1% by mass or greater and more preferably 2% by mass or greater. The upper limit thereof is preferably 80% by mass or less and more preferably 70% by mass or less. The photopolymerizable composition may contain only one or two or more kinds of polymerizable compounds. In a case where the polymerizable composition contains two or more kinds of polymerizable compounds, it is preferable that the total amount thereof is in the above-described ranges.

Photopolymerizati on Initiator

The photopolymerizable composition according to the embodiment of the present invention contains a photopolymerization initiator. The photopolymerization initiator is a compound that is photosensitized by exposure light and initiates or promotes the polymerization of a polymerizable compound. Examples of the photopolymerization initiator include a photoradical polymerization initiator and a photocationic polymerization initiator. In a case where a radically polymerizable compound is used as the polymerizable compound, it is preferable that the photopolymerization initiator is a photoradical polymerization initiator. It is preferable that the photoradical polymerization initiator is a compound that is sensitive to actinic rays having a wavelength of 300 nm or greater to generate a radical. In a case where a cationically polymerizable compound is used as the polymerizable compound, it is preferable that the photopolymerization initiator is a photocationic polymerization initiator.

Photoradical Polymerization Initiator

Examples of the photoradical polymerization initiator include an oxime compound, a halogenated hydrocarbon derivative (for example, a compound having a triazine skeleton or a compound having an oxadiazole skeleton), an oxydiazole compound, a carbonyl compound, a ketal compound, a benzoin compound, an acridine compound, an organic peroxide, an azo compound, a coumarin compound, an azide compound, a metallocene compound, a hexaarylbiimidazole compound, an organic boric acid compound, a disulfonic acid compound, an onium salt compound, an acetophenone compound, an acylphosphine compound, and a benzophenone compound. Among these, from the viewpoint of forming a cured substance with more excellent light resistance and solvent resistance, an acetophenone compound, an acylphosphine compound, a benzophenone compound, or a hexaarylbiimidazole compound is preferable, an acetophenone compound, an acylphosphine compound, or a benzophenone compound is more preferable, and an acetophenone compound or an acylphosphine compound is still more preferable.

Examples of the acetophenone compound include an aminoacetophenone compound and a hydroxyacetophenone compound. Examples of the acetophenone compound include acetophenone compounds described in JP2009-191179A and JP1998-291969A (JP-H10-291969A). Examples of commercially available products of the aminoacetophenone compound include Omnirad 907, Omnirad 369, Omnirad 369E, and Omnirad 379EG (all manufactured by IGM Resins B. V.). Examples of commercially available products of the hydroxyacetophenone compound include Omnirad 184, Omnirad 1173, Omnirad 2959, and Omnirad 127 (all manufactured by IGM Resins B. V.).

Examples of the acylphosphine compound include the acylphosphine compound described in JP4225898B. Examples of commercially available products of the acylphosphine compound include Omnirad 819 and Omnirad TPO (both manufactured by IGM Resins B. V.).

Examples of the benzophenone compound include benzophenone, 2-methylbenzophenone, 3-methylbenzophenone, 4-methylbenzophenone, 4-methoxybenzophenone, 2-chlorobenzophenone, 4-chlorobenzophenone, 4-bromobenzophenone, 2-carboxybenzophenone, 2-ethoxycarbonylbenzophenone, benzophenone tetracarboxylic acid or tetramethyl ester thereof, 4,4'-bis(dialkylamino)benzophenones (for example, 4,4'-bis(dimethylamino)benzophenone, 4,4'-bis(dicyclohexylamino)benzophenone, 4,4'-bis(diethylamino)benzophenone, and 4,4'-bis(dihydroxyethylamino)benzophenone), 4-methoxy-4'-dimethylaminobenzophenone, 4,4'-dimethoxybenzophenone, 4-dimethylaminobenzophenone, and 4-dimethylaminoacetophenone. Among these, from the viewpoints of the sensitivity and the light resistance of a cured substance to be obtained, 4,4'-bis(diethylamino)benzophenone is preferable.

Examples of the oxime compound include the compounds described in JP2001-233842A, the compounds described in JP2000-080068A, the compounds described in JP2006-342166A, and the compounds described in paragraphs 0073 to 0075 of JP2016-006475A. Among the examples of the oxime compound, an oxime ester compound is preferable. Examples of commercially available products of the oxime compound include Irgacure OXE01, Irgacure OXE02 (manufactured by BASF SE), and Irgacure OXE03 (manufactured by BASF SE).

Examples of the halogenated hydrocarbon derivative include the compounds disclosed in Wakabayashi et al., "Bull Chem. Soc. Japan" 42, 2924 (1969), US3905815A, JP1971-004605B (JP-546-004605B), JP1973-036281A (JP-548-036281A), JP1980-32070A (JP-555-032070A), JP1985-239736A (JP-560-239736A), JP1986-169835A (JP-561-169835A), JP-1986-169837A (JP-561-169837A), JP1987-058241A (JP-562-058241A), JP1987-212401A (JP-562-212401A), JP1988-070243A (JP-563-070243A), JP1988-298339A (JP-563-298339A), and M. P. Hutt "Journal of Heterocyclic Chemistry" 1 (No. 3), (1970), and an oxazole compound or a triazine compound substituted with a trihalomethyl group is preferable.

Examples of the hexaarylbiimidazole compound include the compounds described in JP1994-029285B (JP-H06-029285B), U.S. Pat. Nos. 3,479,185A, 4,311,783A, and 4,622,286A. Specific examples thereof include 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl) biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluorophenyl)-4,4', 5,5'-tetraphenylbiimidazole.

Photocationic Polymerization Initiator

The photocationic polymerization initiator is not particularly limited as long as the photocationic polymerization initiator is a compound that generates a protonic acid or a Lewis acid by being irradiated with light. As the photoacid generator, a compound that is sensitive to actinic rays having a wavelength of 300 nm or greater and more preferably 300 to 450 nm and generates an acid is preferable. The photoacid generator is preferably a compound that generates an acid having a pKa of 4 or less, more preferably a compound that generates an acid having a pKa of 3 or less, and still more preferably a compound that generates an acid having a pKa of 2 or less in a case of being irradiated with light.

Examples of the photocationic polymerization initiator include an oxime sulfonate compound, a triazine compound, a sulfonium salt, an iodonium salt, a quaternary ammonium salt, a diazomethane compound, a sulfone compound, a sulfonic acid ester compound, an iminosulfonic acid ester compound, a carboxylic acid ester compound, and a sulfonimide compound.

Specific examples of the photocationic polymerization initiator include the compounds described in paragraphs 0061 to 0108 of JP2012-046577A and paragraphs 0029 and 0030 of JP2002-122994A, the compounds described in paragraphs 0037 to 0063 of JP2002-122994A, and the oxime sulfonate compounds described in paragraphs 0081 to 0108 of JP2013-210616A. Examples of a commercially available product of the photocationic polymerization initiator include CPI-210S (manufactured by San-Apro Ltd.).

The content of the photopolymerization initiator in the total solid content of the photopolymerizable composition is preferably in a range of 0.1% to 30% by mass. The lower limit thereof is preferably 0.3% by mass or greater and more preferably 0.4% by mass or greater. The upper limit is preferably 20% by mass or less and more preferably 15% by mass or less. The photopolymerizable composition may contain only one or two or more kinds of photopolymerization initiators. In a case where the photopolymerizable composition contains two or more kinds of photopolymerization initiators, it is preferable that the total amount thereof is in the above-described ranges.

Resin

It is preferable that the photopolymerizable composition according to the embodiment of the present invention contains a resin. The resin can be appropriately selected from resins that satisfy various physical properties, such as the transparency, the refractive index, and the workability, depending on the applications or the purpose of the photopolymerizable composition.

Examples of the resin include a (meth)acrylic resin, an ene-thiol resin, a polyester resin, a polycarbonate resin, a vinyl polymer [for example, a polydiene resin, a polyalkene resin, a polystyrene resin, a polyvinyl ether resin, a polyvinyl alcohol resin, a polyvinyl ketone resin, a polyfluoro vinyl resin, or a polyvinyl bromide resin], a polythioether resin, a polyphenylene resin, a polyurethane resin, a polysulfonate resin, a nitroso polymer resin, a polysiloxane resin, a polysulfide resin, a polythioester resin, a polysulfone resin, a polysulfonamide resin, a polyamide resin, a polyimine resin, a polyurea resin, a polyphosphazene resin, a polysilane resin, a polysilazane resin, a polyfuran resin, a polybenzoxazole resin, a polyoxadiazole resin, a polybenzothiadinophenothiazine resin, a polybenzothiazole resin, a polypyrazinoquinoxaline resin, polyquinoxaline resin, a polybenzimidazole resin, a polyoxoisoindoline resin, a polydioxoisoindoline resin, a polytriazine resin, a polypyridazine resin, a polypiperazine resin, a polypyridine resin, a polypiperidine resin, a polytriazole resin, a polypyrazole resin, a polypyrrolidine resin, a polycarborane resin, a polyoxabicyclononane resin, a polydibenzofuran resin, a polyphthalide resin, a polyacetal resin, a polyimide resin, a polyamide imide resin, an olefin resin, a cyclic olefin resin, an epoxy resin, and a cellulose acylate resin. Among these, from the viewpoint of satisfactory compatibility with the above-described specific compound and easily forming a cured substance with suppressed surface unevenness, at least one selected from a (meth)acrylic resin, a polystyrene resin, a polyester resin, a polyurethane resin, a polythiourethane resin, a polyimide resin, an epoxy resin, a polycarbonate resin, or a cellulose acylate resin is preferable, and at least one selected from a (meth)acrylic resin, a polystyrene resin, a polyester resin, a polyurethane resin, a polythiourethane resin, a polycarbonate resin, or a cellulose acylate resin is more preferable.

Examples of the (meth)acrylic resin include a polymer having a constitutional unit derived from (meth)acrylic acid and/or an ester thereof. Specific examples thereof include a polymer obtained by carrying out a polymerization reaction on at least one compound selected from the group consisting of (meth)acrylic acid, (meth)acrylic acid ester, (meth)acrylamide, and (meth)acrylonitrile.

Examples of the polyester resin include a polymer obtained by a reaction between a polyol (such as ethylene glycol, propylene glycol, glycerin, or trimethylolpropane) and a polybasic acid (for example, an aromatic dicarboxylic acid (such as terephthalic acid, isophthalic acid, naphthalenedicarboxylic acid, or a dicarboxylic acid in which a hydrogen atom of any of these aromatic rings is substituted with a methyl group, an ethyl group, a phenyl group, or the like), an aliphatic dicarboxylic acid having 2 to 20 carbon atoms (such as adipic acid, sebacic acid, or decanedicarboxylic acid) or an alicyclic dicarboxylic acid (such as cyclohexanedicarboxylic acid)), and a polymer (such as polycaprolactone) obtained by ring-opening polymerization of a cyclic ester compound such as a caprolactone monomer.

Examples of the epoxy resin include a bisphenol A type epoxy resin, a bisphenol F type epoxy resin, a phenol novolak type epoxy resin, a cresol novolak type epoxy resin, and an aliphatic epoxy resin. As the epoxy resin, a commercially available product on the market may be used, and examples of the commercially available product include the following products.

Examples of a commercially available product of the bisphenol A type epoxy resins include jER825, jER827, jER828, jER834, jER1001, jER1002, jER1003, jER1055, jER1007, jER1009, and jER1010 (all manufactured by Mitsubishi Chemical Corporation), and EPICLON860, EPICLON1050, EPICLON1051, and EPICLON1055 (all manufactured by DIC Corporation). Examples of a commercially available product of the bisphenol F type epoxy resins include jER806, jER807, jER4004, jER4005, jER4007, and jER4010 (all manufactured by Mitsubishi Chemical Corporation), EPICLON830 and EPICLON835 (both manufactured by DIC Corporation), and LCE-21 and RE-602S (both manufactured by Nippon Kayaku Co., Ltd.). Examples of a commercially available product of the phenol novolak type epoxy resins include jER152, jER154, jER157S70, and jER157S65 (all manufactured by Mitsubishi Chemical Corporation), and EPICLON N-740, EPICLON N-770, and EPICLON N-775 (all manufactured by DIC Corporation). Examples of a commercially available product of the cresol novolak type epoxy resins include EPICLON N-660, EPICLON N-665, EPICLON N-670, EPICLON N-673, EPICLON N-680, EPICLON N-690, and EPICLON N-695 (all manufactured by DIC Corporation), and EOCN-1020 (manufactured by Nippon Kayaku Co., Ltd.). Examples of a commercially available product of the aliphatic epoxy resin include ADEKA RESIN EP Series (such as EP-4080S, EP-4085S, and EP-4088S; manufactured by ADEKA Corporation), EHPE 3150, EPOLEAD PB 3600, and EPOLEAD PB 4700 (all manufactured by Daicel Corporation), DENACOL EX-212L, EX-214L, EX-216L, EX-321L, and EX-850L (all manufactured by Nagase ChemteX Corporation), ADEKA RESIN EP Series (such as EP-40005, EP-40035, EP-40105, and EP-40115; manufactured by ADEKA Corporation), NC-2000, NC-3000, NC-7300, XD-1000, EPPN-501, and EPPN-502 (all manufactured by ADEKA Corporation), and jER1031S (manufactured by Mitsubishi Chemical Corporation). Further, examples of a commercially available product of the epoxy resins include MARPROOF G-0150M, G-0105SA, G-0130SP, G-0250SP, G-10055, G-1005SA, G-1010S, G-2050M, G-01100, and G-01758 (all manufactured by NOF Corporation, epoxy group-containing polymer).

As the cellulose acylate resin, the cellulose acylate described in paragraphs 0016 to 0021 of JP2012-215689A is preferably used. As the polyester resin, a commercially available product such as the VYLON Series (for example, VYLON 500, manufactured by Toyobo Co., Ltd.) can also be used. As a commercially available product of the (meth) acrylic resin, SK Dyne Series (for example, SK Dyne-SF2147, manufactured by Soken Chemical & Engineering Co., Ltd.) can also be used.

As the polystyrene resin, a resin having 50% by mass or greater of a repeating unit derived from a styrene-based monomer is preferable, a resin having 70% by mass or greater of a repeating unit derived from a styrene-based monomer is more preferable, and a resin having 85% by mass or greater of a repeating unit derived from a styrene-based monomer is still more preferable.

Specific examples of the styrene-based monomer include styrene and a derivative thereof. Here, the styrene derivative is a compound in which another group is bonded to styrene, and examples thereof include alkylstyrene such as o-methylstyrene, m-methylstyrene, p-methyl styrene, 2,4-dimethylstyrene, o-ethylstyrene, or p-ethylstyrene, and substituted styrene in which a hydroxyl group, an alkoxy group, a carboxyl group, or halogen is introduced to a benzene nucleus of styrene such as hydroxystyrene, tert-butoxystyrene, vinyl benzoic acid, o-chlorostyrene, or p-chlorostyrene.

In addition, the polystyrene resin may have a repeating unit derived from a monomer other than the styrene-based monomer. Examples of other monomers include alkyl (meth)acrylate such as methyl (meth)acrylate, cyclohexyl (meth)acrylate, methylphenyl (meth)acrylate, or isopropyl (meth)acrylate; an unsaturated carboxylic acid monomer such as methacrylic acid, acrylic acid, itaconic acid, maleic acid, fumaric acid, or cinnamic acid; an unsaturated dicarboxylic acid anhydride monomer which is an anhydride of maleic acid, itaconic acid, ethylmaleic acid, methylitaconic acid, or chloromaleic acid; an unsaturated nitrile monomer such as acrylonitrile or methacrylonitrile; and a conjugated diene such as 1,3-butadiene, 2-methyl-1,3-butadiene (isoprene), 2,3-dimethyl-1,3-butadiene, 1,3-pentadiene, or 1,3-hexadiene.

Examples of a commercially available product of the polystyrene resin include AS-70 (acrylonitrile/styrene copolymer resin, manufactured by NIPPON STEEL Chemical & Material Co., Ltd.) and SMA2000P (styrene/maleic acid copolymer, manufactured by Kawahara Petrochemical Co., Ltd.).

Examples of the cyclic olefin resin include (1) a polymer having a structural unit derived from a norbornene compound, (2) a polymer having a structural unit derived from a monocyclic olefin compound other than a norbornene compound, (3) a polymer having a structural unit derived from a cyclic conjugated diene compound, (4) a polymer having a structural unit derived from a vinyl alicyclic hydrocarbon compound, and a hydride of a polymer having a structural unit derived from each of the compounds in the items (1) to (4). In the present specification, the polymer having a structural unit derived from a norbornene compound and the polymer having a structural unit derived from a monocyclic olefin compound contains ring-opening polymers of the respective compounds.

Addition (co)polymers of a norbornene compound are described in JP1998-007732A (JP-H10-007732A), JP2002-504184A, US2004/229157A1, WO2004/070463A, and the like. The polymer of a norbornene compound is obtained by an addition polymerization of norbornene compounds (for example, polycyclic unsaturated compounds of norbornene).

The hydride of a polymer of a norbornene compound can be synthesized by the addition polymerization or the metathesis ring-opening polymerization of a norbornene compound or the like and then the addition of hydrogen. The synthesis method is described, for example, in JP1989-240517A (JP-H01-240517A), JP1995-196736A (JP-H07-196736A), JP1985-026024A (JP-S60-026024A), JP1987-019801A (JP-S62-019801A), JP2003-159767A, and JP2004-309979A.

Examples of a commercially available product of the cyclic olefin resin include ARTON series (for example, ARTON G, ARTON F, and ARTON RX4500, manufactured by JSR Corporation), and ZEONOR ZF14, ZF16, ZEONEX 250, and ZEONEX 280 (manufactured by Zeon Corporation).

A weight-average molecular weight of the resin is preferably 3,000 to 2,000,000. The lower limit of the weight-average molecular weight of the resin is preferably 5,000 or greater. The upper limit of the weight-average molecular weight of the resin is preferably 1,000,000 or less, more preferably 500,000 or less, and still more preferably 200,000 or less. Further, in a case where an epoxy resin is used, the weight-average molecular weight of the epoxy resin is preferably 100 or greater and more preferably in a range of 200 to 2,000,000. The upper limit of the weight-average molecular weight of the epoxy resin is preferably 1,000,000 or less and more preferably 500,000 or less. The lower limit of the weight-average molecular weight of the epoxy resin is preferably 2,000 or greater.

The weight-average molecular weight of the resin is a value measured by gel permeation chromatography (GPC). The measurement according to GPC is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 µl, and a measurement temperature of 40° C. using an RI detector. Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

The resin may be an alkali-soluble resin. Examples of the alkali-soluble resin include resins having an acid group. Examples of the acid group include a carboxyl group, a phosphoric acid group, a sulfonic acid group, and a phenolic hydroxy group. The acid group may be used alone or in combination of two or more kinds thereof.

As the alkali-soluble resin, a linear organic high-molecular-weight polymer which is soluble in an organic solvent and can be developed with a weak alkaline aqueous solution is preferable. Examples of such a linear organic high-molecular-weight polymer include polymers containing a carboxyl group in a side chain, for example, acidic cellulose derivatives containing a carboxyl group in a side chain such as a methacrylic acid copolymer, an acrylic acid copolymer, an itaconic acid copolymer, a crotonic acid copolymer, a maleic acid copolymer, and a partially esterified maleic acid copolymer, as described in JP1984-044615A (JP-S59-044615A), JP1979-034327A (JP-S54-034327A), JP-1983-012577A (JP-S58-012577A), JP1979-025957A (JP-S54-025957A), JP1984-053836A (JP-S59-053836A), and JP1984-071048A (JP-S59-071048A).

Further, as the alkali-soluble resin, a resin obtained by adding an acid anhydride to a polymer containing a hydroxy group is also useful.

The alkali-soluble resin may be a resin obtained by copolymerizing a monomer having hydrophilicity. Examples of the monomer having hydrophilicity include alkoxyalkyl (meth)acrylate, hydroxyalkyl (meth)acrylate, glycerol (meth)acrylate, (meth)acrylamide, N-methylolacrylamide, secondary or tertiary alkylacrylamide, dialkylaminoalkyl (meth)acrylate, morpholine (meth)acrylate, N-vinylpyrrolidone, N-vinylcaprolactam, vinylimidazole, vinyl triazole, methyl (meth)acrylate, ethyl (meth)acrylate, branched or linear propyl (meth)acrylate, branched or linear butyl (meth)acrylate, and phenoxyhydroxypropyl (meth)acrylate. Further, as the monomer having hydrophilicity, monomers containing a tetrahydrofurfuryl group, a phosphoric acid group, a phosphoric acid ester group, a quaternary ammonium base, an ethyleneoxy chain, a propyleneoxy chain, a sulfonic acid group, and groups derived from salts thereof, and a morpholinoethyl group are also useful.

In order to improve crosslinking efficiency, the alkali-soluble resin may contain an ethylenically unsaturated bond-containing group such as a vinyl group, a styrene group, an allyl group, a methallyl group, or a (meth)acryloyl group. Examples of a commercially available product of the alkali-soluble resin containing an ethylenically unsaturated bond-containing group include DIANAL BR Series (polymethyl methacrylate (PMMA), for example, DIANAL BR-80, BR-83, and BR-87; manufactured by Mitsubishi Chemical Corporation), Photomer 6173 (carboxyl group-containing polyurethane acrylic oligomer, manufactured by Diamond Shamrock Co., Ltd.), VISCOAT R-264 and KS Resist 106 (both manufactured by Osaka Organic Chemical Industry Ltd.), CYCLOMER P Series (for example, ACA230AA) and PLACCEL CF200 Series (all manufactured by Daicel Corporation), Ebecryl 3800 (manufactured by Daicel UCB Co.), and ACRYCURE-RD-F8 (manufactured by Nippon Shokubai Co., Ltd.).

Among these various alkali-soluble resins, a polyhydroxystyrene resin, a (meth)acrylic resin, a polystyrene resin, and a polysiloxane resin are preferable from the viewpoint of the heat resistance, and a (meth)acrylic resin is more preferable from the viewpoint of controlling the developability.

The weight-average molecular weight of the alkali-soluble resin is preferably in a range of 3,000 to 200,000 and more preferably in a range of 5,000 to 50,000.

The acid value of the alkali-soluble resin is preferably in a range of 30 to 200 mgKOH/g. The lower limit of the acid value thereof is preferably 50 mgKOH/g or greater and more preferably 70 mgKOH/g or greater. Further, the upper limit of the acid value is preferably 150 mgKOH/g or less and more preferably 120 mgKOH/g or less. The acid value of the resin is a value calculated by performing measurement in conformity with JIS K 0070 (1992) and converting the measured value in terms of 1 mmol/g=56.1 mgKOH/g.

In regard to the alkali-soluble resin, the description in paragraphs 0558 to 0571 of JP2012-208494A (paragraphs. 0685 to 0700 of the corresponding US2012/0235099A) and the description in paragraphs 0076 to 0099 of JP2012-198408A can be referred to, and the contents of which are incorporated herein by reference.

In a case where the photopolymerizable composition according to the embodiment of the present invention is used for a lens (for example, a spectacle lens), suitable examples of the resin include a thermoplastic resin such as a carbonate resin or a (meth)acrylic resin (such as polymethyl methacrylate (PMMA)) and a thermosetting resin such as a urethane resin. Examples of commercially available products of the carbonate resins on the market include a polycarbonate resin composition (trade name: CALIBRE 200-13, manufactured by Sumitomo Dow Ltd.) and a diethylene glycol bisallyl carbonate resin (trade name: CR-39, manufactured by PPG Industries). As the urethane resin, a thiourethane resin is preferable. Examples of commercially available products of the thiourethane resin on the market include thiourethane resin monomers (trade names: MR-7, MR-8, MR-10, and MR-174: all trade names; manufactured by Mitsui Chemicals, Inc.).

In addition, a pressure sensitive adhesive or an adhesive can also be used for the resin. Examples of the pressure sensitive adhesive include an acrylic pressure sensitive adhesive, a rubber-based pressure sensitive adhesive, and a silicone-based pressure sensitive adhesive. The acrylic pressure sensitive adhesive denotes a pressure sensitive adhesive containing a polymer of a (meth)acrylic monomer ((meth) acrylic polymer). Examples of the adhesive include a urethane resin adhesive, a polyester adhesive, an acrylic resin adhesive, an ethylene vinyl acetate resin adhesive, a polyvinyl alcohol adhesive, a polyamide adhesive, and a silicone adhesive. Among these, from the viewpoint of excellent adhesive strength, a urethane resin adhesive or a silicone adhesive is preferable as the adhesive. As the adhesive, a commercially available product on the market may be used, and examples of the commercially available product thereof include a urethane resin adhesive (LIS-073-50U: trade name, manufactured by of Toyo Ink Co., Ltd.) and an acrylic pressure sensitive adhesive (SK Dyne-SF2147: trade name, manufactured by Soken Chemical & Engineering Co., Ltd.).

The total light transmittance of the resin is preferably 80% or greater, more preferably 85% or greater, and still more preferably 90% or greater. In the present specification, the total light transmittance of the resin is a value measured based on the contents described in "The Fourth Series of Experimental Chemistry 29 Polymer Material" (Maruzen, 1992), pp. 225 to 232, edited by the Chemical Society of Japan.

In a case where the photopolymerizable composition contains a resin, the content of the resin is preferably in a range of 1% to 99% by mass with respect to the total solid content of the photopolymerizable composition. The lower limit thereof is preferably 10% by mass or greater, more preferably 20% by mass or greater, and still more preferably 30% by mass or greater. The upper limit thereof is preferably 95% by mass or less, more preferably 90% by mass or less, and still more preferably 80% by mass or less. The photopolymerizable composition may contain only one or two or more kinds of resins. In a case where the polymerization composition contains two or more kinds of resins, it is preferable that the total amount thereof is in the above-described range.

Solvent

It is preferable that the photopolymerizable composition according to the embodiment of the present invention contains a solvent. The solvent can be used without particular limitation as long as the solubility of various components present together and the coating properties in a case of obtaining the photopolymerizable composition can be satisfied. It is preferable that the solvent is an organic solvent.

Examples of the organic solvent include an alcohol-based solvent, an ester-based solvent, an ether-based solvent, a ketone-based solvent, an amide-based solvent, a hydrocarbon-based solvent, and a halogen-based solvent.

Specific examples of the alcohol-based solvent include methanol, ethanol, 1-propanol, 2-propanol, 1-butanol, 2-butanol, 2-methyl-1-propanol, 1-methoxy-2-propanol, 2-ethoxyethanol, 2-butoxyethanol, ethylene glycol, propylene glycol, and glycerin.

Specific examples of the ester-based solvent include methyl acetate, ethyl acetate, n-butyl acetate, isobutyl acetate, amyl formate, isoamyl acetate, isobutyl acetate, butyl propionate, isopropyl butyrate, ethyl butyrate, butyl butyrate, methyl lactate, ethyl lactate, alkoxyacetic acid alkyl esters (such as methyl alkoxy acetate, ethyl alkoxy acetate, butyl alkoxy acetate (specific examples thereof include methyl methoxyacetate, ethyl methoxyacetate, butyl methoxyacetate, methyl ethoxyacetate, and ethyl ethoxyacetate)), 3-oxypropionic acid alkyl esters, 2-oxypropionic acid alkyl esters, methyl 2-oxy-2-methyl propionate, ethyl 2-oxy-2-methyl propionate, methyl pyruvate, ethyl pyruvate, propyl pyruvate, methyl acetoacetate, ethyl acetoacetate, methyl 2-oxobutanoate, ethyl 2-oxobutanoate, methyl cellosolve acetate, ethyl cellosolve acetate, propylene glycol monomethyl ether acetate, propylene glycol monoethyl ether acetate, propylene glycol monopropyl ether acetate, methyl 3-ethoxy propionate, ethyl 3-ethoxy propionate, and ethylene carbonate.

Specific examples of the ether-based solvent include diethylene glycol dimethyl ether, tetrahydrofuran, ethylene glycol monomethyl ether, ethylene glycol monoethyl ether, di ethylene glycol monomethyl ether, diethylene glycol monoethyl ether, diethylene glycol monobutyl ether, propylene glycol monomethyl ether, polyethylene glycol monoalkyl ether, polypropylene glycol monoalkyl ether, polyethylene glycol, polypropylene glycol, ethylene glycol dialkyl ether, propylene glycol dialkyl ether, polyethylene glycol dialkyl ether, polypropylene glycol dialkyl ether, and dioxane.

Specific examples of the amide-based solvent include N-methylpyrrolidone, dimethylformamide, and dim ethyl acetamide.

Examples of the ketone-based solvent include methyl ethyl ketone, cyclohexanone, cyclopentanone, 2-heptanone, and 3-heptanone.

Specific examples of the hydrocarbon-based solvent include toluene and xylene. Specific examples of the halogen-based solvent include chloroform and methylene chloride.

The above-described organic solvents may be used in combination of two or more kinds thereof.

It is preferable that the organic solvents include at least one selected from methyl 3-ethoxy propionate, ethyl 3-ethoxy propionate, ethyl cellosolve acetate, ethyl lactate, diethylene glycol dimethyl ether, butyl acetate, methyl 3-methoxy propionate, 2-heptanone, cyclohexanone, cyclopentanone, ethyl carbitol acetate, butyl carbitol acetate, propylene glycol monomethyl ether, and propylene glycol monomethyl ether acetate.

The content of the solvent in the photopolymerizable composition is preferably in a range of 10% to 90% by mass, more preferably in a range of 30% to 90% by mass, and still more preferably in a range of 50% to 90% by mass. The photopolymerizable composition may contain only one or two or more kinds of solvents. In a case where the photopolymerizable composition contains two or more kinds of solvents, it is preferable that the total amount thereof is in the above-described ranges.

Sensitizer

The photopolymerizable composition according to the embodiment of the present invention may contain a sensitizer. As a typical sensitizer, the compounds described in Crivello [J. V. Crivello, Adv. in Polymer Sci, 62, 1 (1984)]. Specific examples of the sensitizer include pyrene, perylene, acridine, thioxanthone, 2-chlorothioxanthone, benzoflavin, N-vinylcarbazole, 9,10-dibutoxyanthracene, anthraquinone, benzophenone, coumarin, ketocoumarin, phenanthrene, camphorquinone, and a phenothiazine derivative. In a case where the photopolymerizable composition contains a sensitizer, the content of the sensitizer is preferably in a range of 50 to 200 parts by mass with respect to 100 parts by mass of the photopolymerization initiator.

Other Ultraviolet Absorbing Agents

The photopolymerizable composition according to the embodiment of the present invention can contain other ultraviolet absorbing agents in addition to the above-described specific compound (hereinafter, also referred to as other ultraviolet absorbing agents).

The maximal absorption wavelengths of the other ultraviolet absorbing agents are present preferably in a wavelength range of 300 to 380 nm, more preferably in a wavelength range of 300 to 370 nm, still more preferably in a wavelength range of 310 to 360 nm, and particularly preferable in a wavelength range of 310 to 350 nm.

Examples of the other ultraviolet absorbing agents include an aminobutadiene-based ultraviolet absorbing agent, a dibenzoylmethane-based ultraviolet absorbing agent, a benzotriazole-based ultraviolet absorbing agent, a benzophenone-based ultraviolet absorbing agent, a salicylic acid-based ultraviolet absorbing agent, an acrylate-based ultraviolet absorbing agent, and a triazine-based ultraviolet absorbing agent. Among these, a benzotriazole-based ultraviolet absorbing agent, a benzophenone-based ultraviolet absorbing agent, and a triazine-based ultraviolet absorbing agent are preferable, and a benzotriazole-based ultraviolet absorbing agent and a triazine-based ultraviolet absorbing agents are more preferable. Specific examples of the other ultraviolet absorbing agents include compounds described in paragraphs 0065 to 0070 of JP2009-263616A and compounds described in paragraph 0065 of WO2017/122503A, and the contents thereof are incorporated in the present specification. Preferred examples of the other ultraviolet absorbing agents include 2-(2'-hydroxy-5'-t-butylphenyl) benzotriazole, 2-(2'-hydroxy-3'-t-butyl-5'-methylphenyl)-5-chlorobenzotriazole, 2-(4-butoxy-2-hydroxyphenyl)-4,6-di(4-butoxyphenyl)-1,3,5-triazine, 2-[2-hydroxy-4-(2-hydroxy-3-butyloxypropoxy)phenyl]-4,6-bis(2,4-dimethyl)-1,3,5-triazine, 2,2',4,4'-tetrahydroxybenzophenone, and 2,2'-dihydroxy-4,4'-dimethoxybenzophenone.

In a case where the photopolymerizable composition contains other ultraviolet absorbing agents, the content of the other ultraviolet absorbing agents is preferably in a range of 0.01% to 50% by mass with respect to the total solid content of the photopolymerizable composition. The lower limit thereof is preferably 0.05% by mass or greater and more preferably 0.1% by mass or greater. The upper limit thereof is preferably 40% by mass or less, more preferably 30% by mass or less, and more preferably 20% by mass or less.

Further, the total content of the specific compound and other ultraviolet absorbing agents is preferably in a range of 0.01% to 50% by mass with respect to the total solid content of the photopolymerizable composition. The lower limit thereof is preferably 0.05% by mass or greater and more preferably 0.1% by mass or greater. The upper limit thereof is preferably 40% by mass or less, more preferably 30% by mass or less, and more preferably 20% by mass or less.

The photopolymerizable composition may contain only one or two or more kinds of other ultraviolet absorbing agents. In a case where the resin composition contains two or more kinds of other ultraviolet absorbing agents, it is preferable that the total amount thereof is in the above-described range.

Compound Having Epoxy Group

The photopolymerizable composition according to the embodiment of the present invention can contain a compound having an epoxy group (hereinafter also referred to as an epoxy compound). Examples of the epoxy compound include a monofunctional or polyfunctional glycidyl ether compound and a polyfunctional aliphatic glycidyl ether compound. Further, as the epoxy compound, a compound containing an alicyclic epoxy group can also be used. Examples of the epoxy compound include a compound containing one or more epoxy groups in one molecule. It is preferable that the epoxy compound is a compound containing 1 to 100 epoxy groups in one molecule. The upper limit of the number of epoxy groups can be set to, for example, 10 or less or 5 or less. The lower limit of the epoxy group is preferably two or greater. Specific examples of the monofunctional epoxy compound include 2-ethylhexyl glycidyl ether. Specific examples of the polyfunctional epoxy compound include 1,4-cyclohexanedimethanol diglycidyl ether and 3',4'-epoxycyclhexylm ethyl 3,4-epoxycyclohexane carboxylate.

The epoxy compound may be a low molecular compound (for example, having a molecular weight of less than 1,000), or may be a high molecular compound (macromolecule) (for example, a compound having a molecular weight of 1,000 or greater, and in a case of a polymer, a compound having a weight-average molecular weight of 1,000 or greater). The weight-average molecular weight of the epoxy compound is preferably in a range of 2,000 to 100,000. The upper limit of the weight-average molecular weight is preferably 10,000 or less, more preferably 5,000 or less, and still more preferably 3,000 or less. Examples of commercially available products of the epoxy compound include polyfunctional epoxy compounds such as CELLOXIDE 2021P (manufactured by Daicel Corporation) (trade name: 3',4'-epoxycyclohexylmethyl 3,4-epoxycyclohexane carboxylate) and RIKARESIN DME-100 (trade name, containing 1,4-cyclohexanedimethanol diglycidyl ether as a main component, manufactured by New Japan Chemical Co., Ltd.)

In a case where the photopolymerizable composition contains a compound having an epoxy group, the content of the compound containing an epoxy group is preferably in a range of 0.1% to 50% by mass with respect to the total solid content of the photopolymerizable composition. The lower limit is preferably 1% by mass or greater and more preferably 2% by mass or greater. The upper limit is preferably 40% by mass or less and more preferably 30% by mass or less. The photopolymerizable composition may contain only one or two or more kinds of compounds containing an epoxy group. In a case where the photopolymerizable composition contains two or more kinds of compounds containing an epoxy group, it is preferable that the total amount thereof is in the above-described ranges.

Acid Generator

The photopolymerizable composition according to the embodiment of the present invention can contain an acid generator. The acid generator may be a photoacid generator or a thermal acid generator. In the present specification, an acid generator denotes a compound which generates an acid by applying energy such as heat or light. Further, the thermal acid generator denotes a compound that generates an acid by thermal decomposition. Further, the photoacid generator denotes a compound that generates an acid by light irradiation. Examples of the kind of acid generator, specific compounds, and preferred examples thereof include the compounds described in paragraphs 0066 to 0122 of JP2008-013646A, and these compounds can also be applied to the present invention.

As the thermal acid generator, a compound having a thermal decomposition temperature of 130° C. to 250° C. is preferable, and a compound having a thermal decomposition temperature of 150° C. to 220° C. is more preferable. Examples of the thermal acid generator include compounds that generate low nucleophilic acids such as a sulfonic acid, a carboxylic acid, and disulfonylimide by heating. As the acid generated by the thermal acid generator, an acid having a pKa of 4 or less is preferable, an acid having a pKa of 3 or less is more preferable, and an acid having a pKa of 2 or less is still more preferable. For example, sulfonic acid, alkylcarboxylic acid substituted with an electron withdrawing group, arylcarboxylic acid, or disulfonylimide is preferable. Examples of the electron withdrawing group include a halogen atom such as a fluorine atom, a haloalkyl group such as a trifluoromethyl group, a nitro group, and a cyano group.

Examples of the photoacid generator include an onium salt compound such as a diazonium salt, a phosphonium salt, a sulfonium salt, or an iodonium salt, which are decomposed by light irradiation to generate an acid, and a sulfonate compound such as imide sulfonate, oxime sulfonate, diazodisulfone, disulfone, or ortho-nitrobenzyl sulfonate. Examples of commercially available products of the photoacid generator include WPAG-469 (manufactured by FUJIFILM Wako Pure Chemical Corporation), CPI-10OP (manufactured by San-Apro Ltd.), and Irgacure 290 (manufactured by BASF SE). Further, 2-isopropylthioxanthone or the like can also be used as the photoacid generator.

In a case where the photopolymerizable composition contains an acid generator, the content of the acid generator is preferably in a range of 0.1 to 100 parts by mass, more preferably in a range of 0.1 to 50 parts by mass, and still more preferably in a range of 0.1 to 20 parts by mass with respect to 100 parts by mass of the polymerizable compound. The photopolymerizable composition may contain only one or two or more kinds of acid generators. In a case where the resin composition contains two or more kinds of acid generators, it is preferable that the total amount thereof is in the above-described range.

Catalyst

The photopolymerizable composition according to the embodiment of the present invention can contain a catalyst. Examples of the catalyst include an acid catalyst such as hydrochloric acid, sulfuric acid, acetic acid, or propionic acid and a base catalyst such as sodium hydroxide, potassium hydroxide, or triethylamine. In a case where the photopolymerizable composition contains a catalyst, the content of the catalyst is preferably in a range of 0.1 to 100 parts by mass, more preferably in a range of 0.1 to 50 parts by mass, and still more preferably in a range of 0.1 to 20 parts by mass with respect to 100 parts by mass of the polymerizable compound. The photopolymerizable composition may contain only one or two or more kinds of catalysts. In a case where the resin composition contains two or more kinds of catalysts, it is preferable that the total amount thereof is in the above-described range.

Silane Coupling Agent

The photopolymerizable composition according to the embodiment of the present invention can contain a silane coupling agent. According to this aspect, the adhesiveness of the cured substance to be obtained to the support can be further improved. In the present specification, the silane coupling agent denotes a silane compound having a hydrolyzable group and other functional groups. Further, the hydrolyzable group denotes a substituent that is directly bonded to a silicon atom and can form a siloxane bond by at least one of a hydrolysis reaction or a condensation reaction. Examples of the hydrolyzable group include a halogen atom, an alkoxy group, and an acyloxy group. Among these, an alkoxy group is preferable. That is, it is preferable that the silane coupling agent is a compound containing an alkoxysilyl group. Examples of the functional group other than the hydrolyzable group include a vinyl group, a (meth)allyl group, a (meth)acryloyl group, a mercapto group, an epoxy group, an oxetanyl group, an amino group, a ureido group, a sulfide group, and an isocyanate group, and a phenyl group. Among these, an amino group, a (meth)acryloyl group, and an epoxy group are preferable. Specific examples of the silane coupling agent include the compounds described in paragraphs 0018 to 0036 of JP2009-288703A and the compounds described in paragraphs 0056 to 0066 of JP2009-242604A, and the contents thereof are incorporated in the present specification.

Examples of commercially available products of the silane coupling agent include A-50 (organosilane) (manufactured by Soken Chemical & Engineering Co., Ltd.). The content of the silane coupling agent is preferably in a range of 0.1% to 5% by mass with respect to the total solid content of the photopolymerizable composition. The upper limit thereof is preferably 3% by mass or less and more preferably 2% by mass or less. The lower limit thereof is preferably 0.5% by mass or greater and more preferably 1% by mass or greater. The silane coupling agent may be used alone or in combination of two or more kinds thereof. In a case where two or more kinds of silane coupling agents are used, it is preferable that the total amount is in the above-described range.

Surfactant

The photopolymerizable composition according to the embodiment of the present invention can contain a surfactant. Examples of the surfactant include the surfactants described in paragraph 0017 of JP4502784B and paragraphs 0060 to 0071 of JP2009-237362A.

As the surfactant, a nonionic surfactant, a fluorine-based surfactant, or a silicone-based surfactant is preferable.

Examples of commercially available products of the fluorine-based surfactant include MEGAFACE F-171, F-172, F-173, F-176, F-177, F-141, F-142, F-143, F-144, F-437, F-475, F-477, F-479, F-482, F-551-A, F-552, F-554, F-555-A, F-556, F-557, F-558, F-559, F-560, F-561, F-565, F-563, F-568, F-575, F-780, EXP, MFS-330, R-41, R-41-LM, R-01, R-40, R-40-LM, RS-43, TF-1956, RS-90, R-94, RS-72-K, and DS-21 (all manufactured by DIC Corporation), FLUORARD FC430, FC431, and FC171 (all manufactured by Sumitomo 3M Ltd.), SURFLON S-382, SC-101, SC-103, SC-104, SC-105, SC-1068, SC-381, SC-383, S-393, and KH-40 (all manufactured by AGC Inc.), PolyFox PF636, PF656, PF6320, PF6520, and PF7002 (all manufactured by OMNOVA Solutions Inc.), and FTERGENT 710FM, 610FM, 601AD, 601ADH2, 602A, 215M, 245F, 251, 212M, 250, 209F, 222F, 208G, 710LA, 710FS, 730LM, 650AC, and 681 (all manufactured by NEOS Company Limited).

The fluorine-based surfactant has a molecular structure containing a functional group having a fluorine atom, and an acrylic compound in which a portion of the functional group having a fluorine atom is cleaved in a case where heat is applied thereto so that the fluorine atom volatilizes can also be suitably used. Examples of the fluorine-based surfactant include MEGAFACE DS Series (manufactured by DIC Corporation (The Chemical Daily (Feb. 22, 2016) and Nikkei Sangyo Daily (Feb. 23, 2016)) such as MEGAFACE DS-21.

A polymer of a fluorine atom-containing vinyl ether compound containing a fluorinated alkyl group or a fluorinated alkylene ether group and a hydrophilic vinyl ether compound is also preferably used as the fluorine-based surfactant.

A block polymer can also be used as the fluorine-based surfactant.

A fluorine-containing polymer compound having a repeating unit derived from a (meth)acrylate compound having a fluorine atom and a repeating unit derived from a (meth)acrylate compound containing 2 or more (preferably 5 or more) alkyleneoxy groups (preferably ethyleneoxy groups or propyleneoxy groups) can also be used as the fluorine-based surfactant.

A fluorine-containing polymer containing an ethylenically unsaturated bond-containing group in a side chain can also be used as the fluorine-based surfactant. Examples of commercially available products thereof include MEGAFACE RS-101, RS-102, RS-718K, and RS-72-K (all manufactured by DIC Corporation).

Due to concerns of the environmental suitability in a case of a compound containing a linear perfluoroalkyl group having 7 or more carbon atoms, an alternative material for perfluorooctanoic acid (PFOA) or perfluorooctanesulfonic acid (PFOS) is preferably used as the fluorine-based surfactant.

Examples of the silicone-based surfactant include a linear polymer consisting of a siloxane bond and a modified siloxane polymer in which an organic group is introduced into a side chain or a terminal. Examples of commercially available products of the silicone-based surfactant include DOWSIL 8032 ADDITIVE, Toray Silicone DC3PA, Toray Silicone SH7PA, Toray Silicone DC11PA, Toray Silicone SH21PA, Toray Silicone SH28PA, Toray Silicone SH29PA, Toray Silicone SH30PA, and Toray Silicone SH8400 (all manufactured by Dow Toray Co., Ltd.), X-22-4952, X-22-4272, X-22-6266, KF-351A, K354L, KF-355A, KF-945, KF-640, KF-642, KF-643, X-22-6191, X-22-4515, KF-6004, KP-341, KF-6001, and KF-6002 (all manufactured by Shin-Etsu Chemical Co., Ltd.), F-4440, TSF-4300, TSF-4445, TSF-4460, and TSF-4452 (all manufactured by Momentive Performance Materials Inc.), and BYK-307, BYK-323, and BYK-330 (all manufactured by BYK-Chemie GmbH).

Examples of the nonionic surfactant include glycerol, trimethylolpropane, trimethylolethane, ethoxylate and propoxylate thereof (such as glycerol propoxylate or glycerol ethoxylate), polyoxyethylene lauryl ether, polyoxyethylene stearyl ether, polyoxyethylene oleyl ether, polyoxyethylene octyl phenyl ether, polyoxyethylene nonyl phenyl ether, polyethylene glycol dilaurate, polyethylene glycol distearate, and sorbitan fatty acid ester. Examples of commercially available products of the nonionic surfactant include PLURONIC L10, L31, L61, L62, 10R5, 17R2, and 25R2 (all manufactured by BASF SE), TETRONIC 304, 701, 704, 901, 904, and 150R1 (all manufactured by BASF SE), SOLSPERSE 20000 (manufactured by The Lubrizol Corporation), NCW-101, NCW-1001, and NCW-1002 (all manufactured by FUJIFILM Wako Pure Chemical Corporation), PIONIN D-6112, D-6112-W, and D-6315 (all manufactured by Takemoto Oil & Fat Co., Ltd.), and OLFINE E1010, SURFINOL 104, 400, and 440 (all manufactured by Nisshin Chemical Co., Ltd.).

The content of the surfactant is preferably in a range of 0.01% to 3.0% by mass, more preferably in a range of 0.05% to 1.0% by mass, and still more preferably in a range of 0.10% to 0.80% by mass with respect to the total solid content of the photopolymerizable composition. The surfactant may be used alone or two or more kinds thereof. In a case where two or more kinds of silane coupling agents are used, it is preferable that the total amount is in the above-described range.

Other Additives

The photopolymerizable composition according to the embodiment of the present invention may appropriately contain optional additives such as an antioxidant, a light stabilizer, a processing stabilizer, an anti-aging agent, a compatibilizer, and a polymerization inhibitor as necessary. By allowing the resin composition to appropriately contain these components, various characteristics of the cured substance to be obtained can be appropriately adjusted.

Method of Preparing Photopolymerizable Composition

A method of preparing the photopolymerizable composition according to the embodiment of the present invention is not particularly limited, and the photopolymerizable composition can be prepared, for example, by mixing a compound represented by Formula (1) or (2), a polymerizable compound, a photopolymerization initiator, and as necessary, the above-described components.

In a case of preparation of the photopolymerizable composition, the respective components contained in the photopolymerizable composition may be blended at once, or may be dissolved or dispersed in a solvent and then sequentially blended. In addition, during blending, the order of addition or working conditions are not particularly limited. For example, all the components may be dissolved or dispersed in a solvent at the same time to prepare the photopolymerizable composition, or each component may be appropriately dissolved or dispersed in two or more solutions or dispersion liquids and the solutions or the dispersion liquids may be mixed in a case of being used (application) to prepare the photopolymerizable composition.

In the preparation of the photopolymerizable composition, it is preferable that the respective components are mixed and filtered through a filter for the purpose of removing foreign matter, reducing defects, or the like. As the filter, any filters that have been used in the related art for filtration use and the like may be used without particular limitation. Examples of a material of the filter include a fluororesin such as polytetrafluoroethylene (PTFE) and polyvinylidene fluoride (PVDF); a polyamide-based resin such as nylon (for example, nylon-6 or nylon-6,6); and a polyolefin resin (including a polyolefin resin having a high density and an ultrahigh molecular weight) such as polyethylene or polypropylene (PP). Among these materials, polypropylene (including high-density polypropylene) or nylon is preferable.

The pore diameter of the filter is preferably in a range of 0.01 to 7.0 μm, more preferably in a range of 0.01 to 2.5 μm, and still more preferably in a range of 0.01 to 2.0 μm. In a case where the pore diameter of the filter is in the above-described ranges, fine foreign matter can be more reliably removed. In regard to the pore diameter value of the filter, nominal values of filter manufacturers can be referred to. As the filter, various filters provided by Nihon Pall Corporation (DFA4201NXEY, DFA4201NAEY, DFA4201J006P, and the like), Toyo Roshi Kaisha., Ltd., Nihon Entegris K.K. (formerly Nippon Microlith Co., Ltd.), Kitz Micro Filter Corporation, and the like can be used.

In addition, it is preferable that a fibrous filter material is used as the filter. Examples of the fibrous filter material include a polypropylene fiber, a nylon fiber, and a glass fiber. Examples of a commercially available product include SBP type series (SBP008 and the like), TPR type series (TPR002, TPR005, and the like), or SHPX type series (SHPX003 and the like), all manufactured by Roki Techno Co., Ltd.

In a case where a filter is used, a combination of different filters (for example, a first filter and a second filter) may be used. In this case, the filtration with each of the filters may be performed once or may be performed twice or more times. In addition, filters having different pore diameters in the above-described ranges may be used in combination.

Applications

The photopolymerizable composition according to the embodiment of the present invention can also be suitably used for applications in a case where the photopolymerizable composition may be exposed to light including sunlight and ultraviolet rays. Specific examples include coating materials or films for window glass of houses, facilities, and transportation equipment; interior/exterior materials and interior/exterior paints of houses, facilities, and transportation equipment; members for light sources that emit ultraviolet rays, such as a fluorescent lamp and a mercury lamp; solar cells, precision machineries, electronic and electrical equipment, and members for a display device; containers or packaging materials for food, chemicals, and drugs; agricultural and industrial sheets; clothing textile products and fibers such as sportswear, stockings, and hats; lenses such as plastics lenses, contact lenses, glasses, and artificial eyes, or coating materials thereof; optical supplies such as optical filters, prisms, mirrors, and photographic materials; stationery such as tapes and inks; and marking boards, marking devices, and the surface coating materials thereof. For the details thereof, the description in paragraphs 0158 to 0218 of JP2009-263617A can be referred to, and the contents thereof are incorporated in the present specification.

The photopolymerizable composition according to the embodiment of the present invention can be preferably used for an optical member or the like. For example, the photopolymerizable composition is preferably used as a photopolymerizable composition for an ultraviolet cut filter, a lens, or a protective material. The form of the protective material is not particularly limited, and examples thereof include a coating film, a film, and a sheet. Further, the photopolymerizable composition according to the embodiment of the present invention can also be used as a pressure sensitive adhesive or an adhesive.

Further, the photopolymerizable composition according to the embodiment of the present invention can also be used for various members of a display device. For example, in a case of a liquid crystal display device, the resin composition can be used for each member constituting the liquid crystal display device such as an antireflection film, a polarizing plate protective film, an optical film, a retardation film, a pressure sensitive adhesive, and an adhesive. Further, in a case of an organic electroluminescence display device, the polymerizable composition can be used for each member constituting the organic electroluminescence display device such as an optical film, a polarizing plate protective film in a circularly polarizing plate, a retardation film such as a quarter wave plate, and an adhesive or a pressure sensitive adhesive.

Cured Substance and Applications

A cured substance according to the embodiment of the present invention is obtained by curing the above-described photopolymerizable composition according to the embodiment of the present invention.

The cured substance according to the embodiment of the present invention may be obtained as a molded product formed by molding the photopolymerizable composition into a desired shape. The shape of the molded product can be appropriately selected according to the intended use and the purpose. Examples of the shape thereof include a coating film, a film, a sheet, a plate, a lens, a tube, and a fiber.

The cured substance according to the embodiment of the present invention is preferably used as an optical member. Examples of the optical member include an ultraviolet cut filter, a lens, and a protective material. Further, the optical member can also be used as a polarizing plate or the like.

The ultraviolet cut filter can be used for an article such as an optical filter, a display device, a solar cell, or window glass. The kind of display device is not particularly limited, and examples thereof include a liquid crystal display device and an organic electroluminescence display device.

In a case where the cured substance according to the embodiment of the present invention is used for a lens, the cured substance according to the embodiment of the present invention may be formed into a lens shape and used. Further, the cured substance according to the embodiment of the present invention may be used for a coating film on a surface of a lens, an interlayer (adhesive layer) of a cemented lens, or the like. Examples of the cemented lens include those described in paragraphs 0094 to 0102 of WO2019/131572A, and the contents of which are incorporated in the present specification.

The kind of the protective material is not particularly limited, and examples thereof include a protective material for a display device, a protective material for a solar cell, a protective material for window glass, and an organic electroluminescence display device. The shape of the protective material is not particularly limited, and examples thereof include a coating film, a film, and a sheet.

Optical Member

An optical member according to the embodiment of the present invention contains the above-described cured substance according to the embodiment of the present invention. The cured substance according to the embodiment of the present invention may be obtained as a molded product formed by molding the above-described photopolymerizable composition according to the embodiment of the present invention into a desired shape. The shape of the molded product can be appropriately selected according to the intended use and the purpose. Examples of the shape thereof include a coating film, a film, a sheet, a plate, a lens, a tube, and a fiber.

The optical member according to the embodiment of the present invention may be a member obtained by bonding a polarizing plate and a polarizing plate protective film to each other with the photopolymerizable composition according to the embodiment of the present invention.

Examples of the optical member include an ultraviolet cut filter, a lens, and a protective material.

The ultraviolet cut filter can be used for an article such as an optical filter, a display device, a solar cell, or window glass. The kind of display device is not particularly limited, and examples thereof include a liquid crystal display device and an organic electroluminescence display device.

Examples of the lens include those obtained by forming the cured substance according to the embodiment of the present invention into a lens shape and those obtained by forming a coating film on a surface of a lens, an interlayer (an adhesive layer or a pressure sensitive adhesive layer) of a cemented lens, or the like with the photopolymerizable composition according to the embodiment of the present invention.

The kind of the protective material is not particularly limited, and examples thereof include a protective material for a display device, a protective material for a solar cell, and a protective material for window glass. The shape of the protective material is not particularly limited, and examples thereof include a coating film, a film, and a sheet.

Further, a resin film is exemplified as one form of the optical member. Examples of the resin used in the photopolymerizable composition for forming a resin film include the above-described resins. Among these, a (meth)acrylic resin, a polyester fiber, a cyclic olefin resin, and a cellulose acylate resin are preferable, and a cellulose acylate resin is more preferable. The photopolymerizable composition containing the cellulose acylate resin can contain the additives described in paragraphs 0022 to 0067 of JP2012-215689A. Examples of such additives include sugar esters. By adding a sugar ester compound to the photopolymerizable composition containing a cellulose acylate resin, the total haze and the internal haze can be decreased without impairing the expression of optical properties even in a case where a heat treatment is not performed before a stretching step. Further, the resin film (cellulose acylate film) formed of the photopolymerizable composition containing the cellulose acylate resin can be produced by the method described in paragraphs 0068 to 0096 of JP2012-215689A. Further, the hard coat layer described in paragraphs 0097 to 0113 of JP2012-215689A may be further laminated on the resin film.

Further, examples of other forms of the optical member include an optical member having a laminate of a support and a resin layer.

The thickness of the resin layer in the laminate is preferably in a range of 1 µm to 2500 µm and more preferably in a range of 10 µm to 500 µm.

A material having transparency within a range where the optical performance is not impaired is preferable as the support in the laminate. The support having transparency denotes that the support is optically transparent and specifically denotes that the total light transmittance of the support is 85% or greater. The total light transmittance of the support is preferably 90% or greater and more preferably 95% or greater.

Suitable examples of the support include a resin film. Examples of the resin constituting a resin film include an ester resin (such as polyethylene terephthalate (PET), polyethylene naphthalate (PEN), polybutylene terephthalate (PBT), or polycyclohexane dimethylene terephthalate (PCT)), an olefin resin (such as polypropylene (PP) or polyethylene (PE)), polyvinyl chloride (PVA), and tricellulose acetate (TAC). Among these, PET is preferable in terms of general purpose properties.

The thickness of the support can be appropriately selected according to the applications, the purpose, and the like. In general, the thickness thereof is preferably in a range of 5 µm to 2500 µm and more preferably in a range of 20 µm to 500 µm.

In addition, a peelable support can also be used as the support. Such a laminate is preferably used as a polarizing plate or the like. Here, the peelable support denotes a support capable of being peeled off from the ultraviolet shielding material. The stress in a case of peeling the support from the ultraviolet shielding material is preferably in a range of 0.05 N/25 mm or greater and 2.00 N/25 mm or less, more preferably 0.08 N/25 mm or greater and 0.50 N/25 mm or less, and still more preferably 0.11 N/25 mm or greater and 0.20 N/25 mm or less. The stress in a case of peeling the support from the ultraviolet shielding material is evaluated by bonding and fixing the surface of the laminate cut to have a size of a width of 25 mm and a length of 80 mm to a glass base material via an acrylic pressure sensitive adhesive sheet, grasping one end (one side with a width of 25 mm) of a test piece in the length direction using a tension tester (RTF-1210, manufactured by A & D Co., Ltd.), and performing a 90° peeling test (in conformity with Japanese Industrial Standards (JIS) K 6854-1:1999 "Adhesive-Determination of peel strength of bonded assemblies-Part 1:90° peel") in an atmosphere of a temperature of 23° C. and a relative humidity of 60% at a crosshead speed (grasping movement speed) of 200 mm/min.

A support containing polyethylene terephthalate (PET) as a main component (the component having the highest content in terms of mass among the components constituting the support) is preferable as the peelable support. From the viewpoint of mechanical strength, the weight-average molecular weight of PET is preferably 20,000 or greater, more preferably 30,000 or greater, and still more preferably 40,000 or greater. The weight-average molecular weight of PET can be determined by dissolving the support in hexafluoroisopropanol (HFIP) using the above-described GPC method. The thickness of the support is not particularly limited, but is preferably in a range of 0.1 to 100 µm, more preferably in a range of 0.1 to 75 µm, still more preferably in a range of 0.1 to 55 µm, and particularly preferably in a range of 0.1 to 10 µm. Further, the support may be subjected to a corona treatment, a glow discharge treatment, undercoating, or the like as a known surface treatment.

Further, examples of other forms of the optical member include a laminate obtained by laminating a hard coat layer, a transparent support, and a pressure sensitive adhesive layer or an adhesive layer in this order. Such a laminate is preferably used as an ultraviolet cut filter or a protective material (a protective film or a protective sheet). The optical member in this form is not limited as long as any of the support, the hard coat layer, or the pressure sensitive adhesive layer or the adhesive layer contains the above-described cured substance according to the embodiment of the present invention.

As the hard coat layer, any of the hard coat layers described in JP2013-045045A, JP2013-043352A, JP2012-232459A, JP2012-128157A, JP2011-131409A, JP2011-131404A, JP2011-126162A, JP2011-075705A, JP2009-286981A, JP2009-263567A, JP2009-075248A, JP2007-164206A, JP2006-096811A, JP2004-075970A, JP2002-156505A, JP2001-272503A, WO2012/018087A, WO2012/098967A, WO2012/086659A, and WO2011/105594A can be applied. The thickness of the hard coat layer is preferably in a range of 5 µm to 100 µm from the viewpoint of further improving the scratch resistance.

The optical member in this form has a pressure sensitive adhesive layer or an adhesive layer on a side of the support opposite to a side where the hard coat layer is provided. The kind of the pressure sensitive adhesive or the adhesive used for the pressure sensitive adhesive layer or the adhesive layer is not particularly limited, and a known pressure sensitive adhesive or adhesive can be used. As the pressure sensitive adhesive or the adhesive, those containing the acrylic resin described in paragraphs 0056 to 0076 of JP2017-142412A and the crosslinking agent described in paragraphs 0077 to 0082 of JP2017-142412A are also preferably used. Further, the pressure sensitive adhesive or the adhesive may contain the adhesiveness improver (silane compound) described in paragraphs 0088 to 0097 of JP2017-142412A and the additives described in paragraph 0098 of JP2017-142412A. Further, the pressure sensitive adhesive layer or the adhesive layer can be formed by the method described in paragraphs 0099 and 0100 of JP2017-142412A. The thickness of the pressure sensitive adhesive layer or the adhesive layer is preferably in a range of 5 µm to 100 µm from the viewpoint of achieving both adhesive strength and handleability.

The optical member according to the embodiment of the present invention can be preferably used as a constituent member of a display such as a liquid crystal display device (LCD) or an organic electroluminescence display device (OLED).

Examples of the liquid crystal display device include a liquid crystal display device in which a member such as an antireflection film, a polarizing plate protective film, an optical film, a retardation film, a pressure sensitive adhesive, or an adhesive contains the cured substance according to the embodiment of the present invention. The optical member according to the embodiment of the present invention may be disposed on any of a viewer side (front side) or a backlight side with respect to the liquid crystal cell and any of a side far from the liquid crystal cell (outer) or a side close to the liquid crystal cell (inner) with respect to the polarizer.

Examples of the organic electroluminescence display device include an organic electroluminescence display device in which a member such as an optical film, a polarizing plate protective film in a circularly polarizing plate, a retardation film such as a quarter wave plate, an adhesive, or a pressure sensitive adhesive contains the cured substance according to the embodiment of the present invention. In a case where such members contain the cured substance according to the embodiment of the present invention with the above-described configuration, deterioration of the organic electroluminescence display device due to external light can be suppressed.

EXAMPLES

Hereinafter, the present invention will be described in more detail based on the following examples. The materials, the used amounts, the ratios, the treatment contents, the treatment procedures, and the like described in the following examples can be appropriately changed without departing from the gist of the present invention. Therefore, the scope of the present invention is not limited to the following specific examples. In the structural formulae shown below, Me represents a methyl group, Et represents an ethyl group, Bu represents a butyl group, tBu represents a tert-butyl group, Pr represents a propyl group, Ph represents a phenyl group, and Ac represents an acetyl group.

Synthesis Examples

Synthesis Example 1

Synthesis of Compound (1)-52

An intermediate 1-1 was synthesized according to the following scheme. In the following scheme, the synthesis from p-toluquinone to the intermediate 1-1 was performed using p-toluquinone in place of 2-tert-butyl-1,4-benzoquinone with reference to the method described in paragraph 0176 of JP2016-081035A.

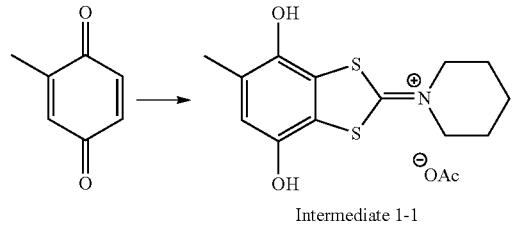

Intermediate 1-1

Next, an intermediate 1-3 was synthesized according to the following synthesis scheme. 90 g of the intermediate 1-1, 73.7 g of an intermediate 1-2, and 300 ml of N-methylpyrrolidone were added thereto, mixed, and stirred at 60° C. for 1 hour. After the mixture was cooled to room temperature, 2,700 ml of water was added thereto, and the mixture was stirred for 30 minutes. The precipitated solid was collected by filtration, 300 ml of acetonitrile was added thereto, and the mixture was heated under reflux in a nitrogen atmosphere for 1 hour. The mixture was cooled to room temperature and stirred at room temperature for 1 hour, and the solid was collected by filtration and washed with 150 ml of acetonitrile, thereby obtaining 106 g of an intermediate 1-3 (yield of 85%).

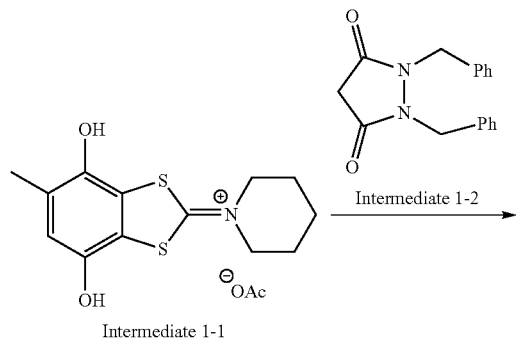

Intermediate 1-1

Intermediate 1-2

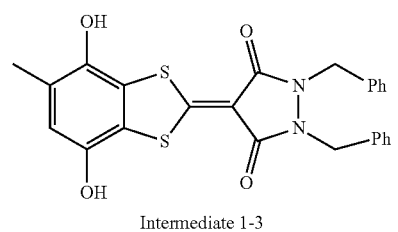

Intermediate 1-3

4.0 g of the intermediate 1-3, 2.55 g of triethylamine, and 40 ml of N,N-dimethylacetamide were added to a flask, mixed, and stirred in a nitrogen atmosphere under ice-cooling for 10 minutes. 3.82 g of 2-ethylhexanoyl chloride was added to the mixed solution in the flask, and the solution was stirred at room temperature for 3 hours. After the completion of the reaction, the mixture was cooled to room temperature, 20 ml of water was added thereto, and the mixture was stirred for 30 minutes. The precipitated solid was collected by filtration, 50 ml of methanol was added thereto, and the mixture was heated under reflux in a nitrogen atmosphere for 1 hour. The mixture was cooled to room temperature and stirred at room temperature for 1 hour, and the solid was collected by filtration and washed with 25 ml of methanol, thereby obtaining 5.2 g of a compound (1)-52 (yield of 85%).

$^1$H-NMR (CDCl$_3$): δ 7.26 (m, 6H), 7.18 (s, 1H), 7.10 (m, 4H), 4.75 (2, 4H), 2.62 (m, 2H), 2.27 (s, 3H), 1.8~1.6 (m, 8H), 1.5~1.3 (m, 8H), 1.10 (m, 6H), 0.94 (m, 6H)

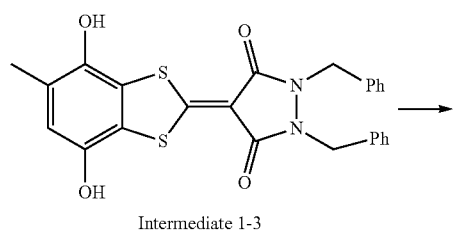

Intermediate 1-3

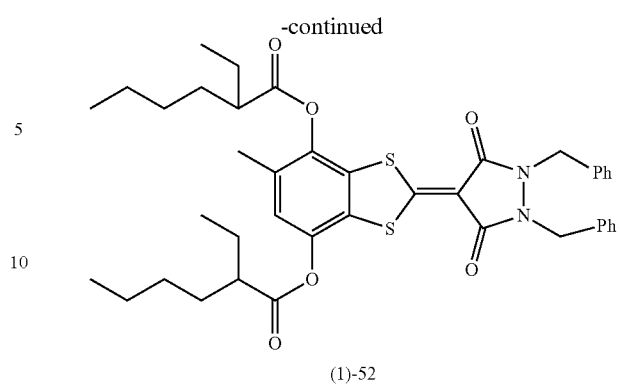

(1)-52

Synthesis Example 2

Synthesis of Compound (1)-64

An intermediate 2 was synthesized according to the following scheme by the same method as in Synthesis Example 1.

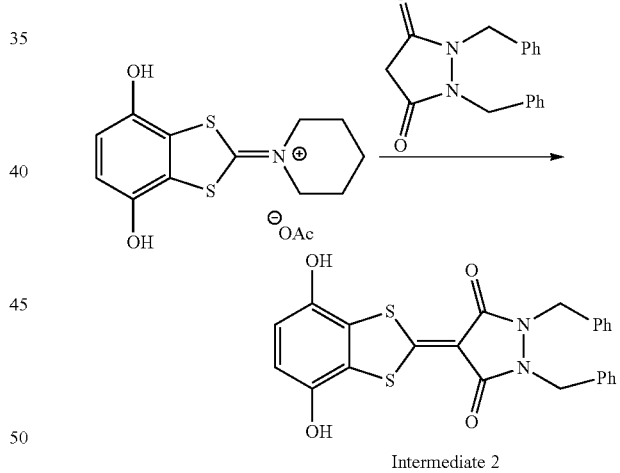

Intermediate 2

3.0 g of the intermediate 2, 1.97 g of triethylamine, and 30 ml of N,N-dimethylacetamide were added to a flask, mixed, and stirred in a nitrogen atmosphere under ice-cooling for 10 minutes. 2.95 g of 2-ethylhexanoyl chloride was added to the mixed solution in the flask, and the solution was stirred at room temperature for 3 hours. After the completion of the reaction, the mixture was cooled to room temperature, 15 ml of water was added thereto, and the mixture was stirred for 30 minutes. The precipitated solid was collected by filtration, 40 ml of methanol was added thereto, and the mixture was heated under reflux in a nitrogen atmosphere for 1 hour. The mixture was cooled to room temperature and stirred at room temperature for 1 hour, and the solid was collected by filtration and washed with 20 ml of methanol, thereby obtaining 4.1 g of a compound (1)-64 (yield of 88%).

¹H-NMR (CDCl₃): δ 7.30 (s, 2H) 7.26 (m, 6H), 7.10 (m, 4H), 4.76 (2, 4H), 2.62 (m, 2H), 1.9~1.6 (m, 8H), 1.5~1.3 (m, 8H), 1.07 (t, 6H), 0.94 (t, 6H)

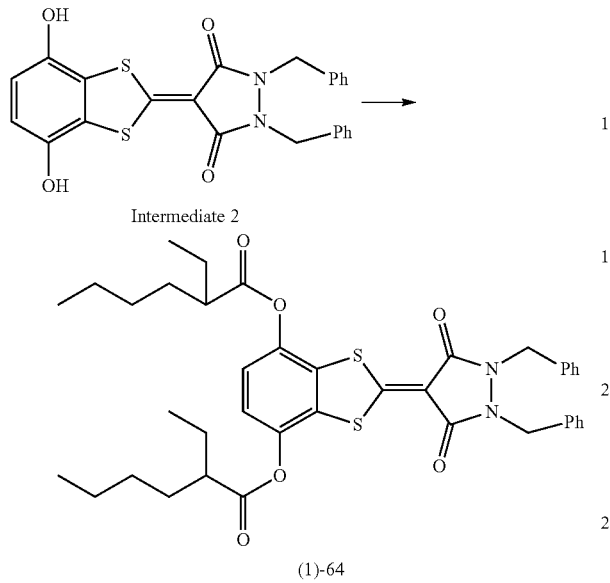

Synthesis Example 3

Synthesis of Compound (1)-46

A compound (1)-46 was synthesized by the same method as in Synthesis Example 1 except that 2-ethylhexyl bromide was used in place of 2-ethylhexanoyl chloride in Synthesis Example 1.

¹H-NMR (CDCl₃): δ 7.26 (m, 6H) 7.11 (m, 4H), 6.70 (s, 1H), 4.77 (s, 2H), 4.75 (s, 2H), 3.97 (dd, 2H), 3.83 (d, 2H), 2.37 (s, 3H), 1.8~1.6 (m, 18H), 1.0~0.9 (m, 12H)

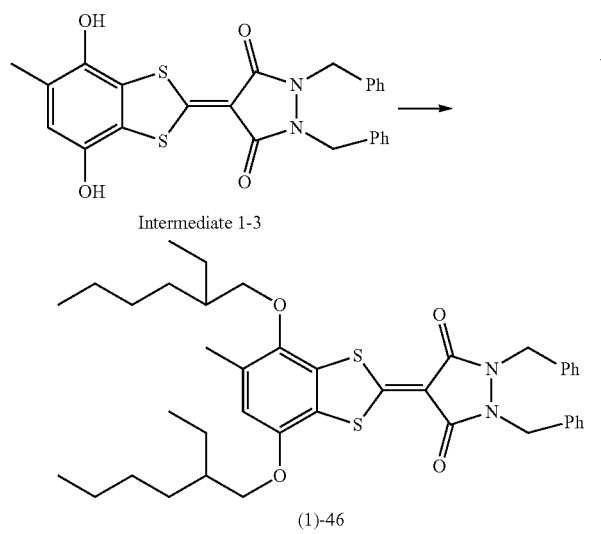

Measurement of Maximal Absorption Wavelength (λmax)

A sample solution was prepared by dissolving 2 mg of the compounds listed in the following table in 100 mL of ethyl acetate and diluting the solution with ethyl acetate so that the absorbance of the solution was in a range of 0.6 to 1.2. The absorbance of each sample solution was measured in a 1 cm quartz cell using a spectrophotometer UV-1800PC (manufactured by Shimadzu Corporation). The maximal absorption wavelength (λmax) was measured from the absorption spectrum of each sample solution.

TABLE 1

| Type of compound | λmax (nm) |
|---|---|
| (1)-5 | 383 |
| (1)-8 | 383 |
| (1)-11 | 383 |
| (1)-46 | 387 |
| (1)-49 | 387 |
| (1)-52 | 380 |
| (1)-53 | 382 |
| (1)-60 | 375 |
| (1)-64 | 376 |
| (1)-65 | 378 |
| (1)-69 | 383 |
| A-1 | 375 |
| A-35 | 372 |
| A-71 | 372 |
| (2)-1 | 383 |
| (2)-6 | 383 |
| (2)-8 | 408 |
| (2)-9 | 410 |
| (2)-11 | 411 |
| (2)-12 | 413 |
| C-1 | 388 |
| C-3 | 357 |

(1)-5, (1)-8, (1)-11, (1)-46, (1)-49, (1)-52, (1)-53, (1)-60, (1)-64, (1)-65, (1)-69, A-1, A-35, A-71, (2)-1, (2)-6, (2)-8, (2)-9, (2)-11, (2)-12: compounds having structures shown in specific examples of specific compound described above C-1, C-3: Compounds Having Structures Shown Below (Comparative Compounds)

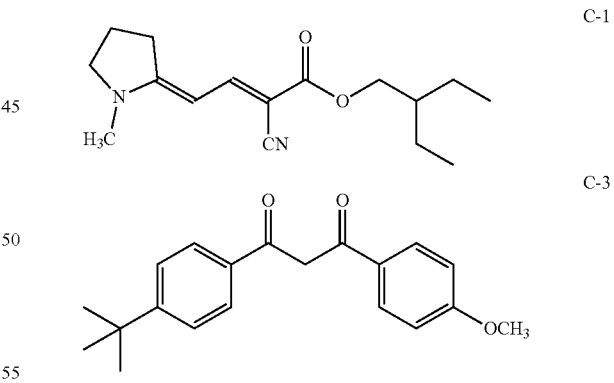

Preparation of Photopolymerizable Composition

Examples 1 to 50 and Comparative Examples 1 and 2

The following components were mixed to prepare photopolymerizable compositions of Examples 1 to 50 and Comparative Examples 1 and 2.

Ultraviolet absorbing agent: 2.0 parts by mass
Polymerizable compound: 2.6 parts by mass Resin: 12.9 parts by mass Photopolymerization initiator: 2.5 parts by mass Solvent (propylene glycol monomethyl ether acetate): 40.0 parts by mass Solvent (cyclopentanone): 40.0 parts by mass Surfactant (KF-6001, manufactured by Shin-Etsu Chemical Co., Ltd., both-terminal carbinol-modified polydimethylsiloxane, hydroxyl value: 62 mgKOH/g): 0.02 parts by mass

TABLE 2

|  | Ultraviolet absorbing agent | Polymerizable compound | Resin | Photopolymerization initiator |
|---|---|---|---|---|
| Example 1 | (1)-46 | T-1 | U-2 | V-1 |
| Example 2 | (1)-5 | T-1 | U-2 | V-1 |
| Example 3 | (1)-8 | T-1 | U-2 | V-1 |
| Example 4 | (1)-11 | T-1 | U-2 | V-1 |
| Example 5 | (1)-49 | T-1 | U-2 | V-1 |
| Example 6 | (1)-52 | T-1 | U-2 | V-1 |
| Example 7 | (1)-53 | T-1 | U-2 | V-1 |
| Example 8 | (1)-59 | T-1 | U-2 | V-1 |
| Example 9 | (1)-60 | T-1 | U-2 | V-1 |
| Example 10 | (1)-61 | T-1 | U-2 | V-1 |
| Example 11 | (1)-64 | T-1 | U-2 | V-1 |
| Example 12 | (1)-65 | T-1 | U-2 | V-1 |
| Example 13 | (1)-69 | T-1 | U-2 | V-1 |
| Example 14 | A-1 | T-1 | U-2 | V-1 |
| Example 15 | A-3 | T-1 | U-2 | V-1 |
| Example 16 | A-26 | T-1 | U-2 | V-1 |
| Example 17 | A-35 | T-1 | U-2 | V-1 |
| Example 18 | A-71 | T-1 | U-2 | V-1 |
| Example 19 | (2)-1 | T-1 | U-2 | V-1 |
| Example 20 | (2)-6 | T-1 | U-2 | V-1 |
| Example 21 | (2)-8 | T-1 | U-2 | V-1 |
| Example 22 | (2)-9 | T-1 | U-2 | V-1 |
| Example 23 | (2)-11 | T-1 | U-2 | V-1 |
| Example 24 | (2)-12 | T-1 | U-2 | V-1 |
| Example 25 | (1)-46 | T-2 | U-2 | V-1 |
| Example 26 | (1)-46 | T-3 | U-2 | V-1 |
| Example 27 | (1)-46 | T-4 | U-2 | V-1 |
| Example 28 | (1)-46 | T-1 | U-1 | V-1 |
| Example 29 | (1)-46 | T-1 | U-2 | V-2 |
| Example 30 | (1)-46 | T-1 | U-2 | V-3 |
| Example 31 | (1)-46 | T-1 | U-2 | V-4 |
| Example 32 | (1)-46 | T-1 | U-2 | V-5 |
| Example 33 | (1)-46 | T-1 | U-2 | V-6 |
| Example 34 | (1)-46 | T-1 | U-2 | V-7 |
| Example 35 | (1)-46 | T-1 | U-2 | V-8 |
| Example 36 | (2)-8 | T-1 | U-2 | V-2 |
| Example 37 | (1)-5 | T-1 | U-2 | V-2 |
| Example 38 | (1)-5 | T-1 | U-2 | V-5 |
| Example 39 | (1)-52 | T-1 | U-2 | V-2 |
| Example 40 | (1)-52 | T-1 | U-2 | V-5 |

TABLE 3

|  | Ultraviolet absorbing agent | Polymerizable compound | Resin | Photopolymerization initiator |
|---|---|---|---|---|
| Example 41 | (1)-60 | T-1 | U-2 | V-2 |
| Example 42 | (1)-64 | T-1 | U-2 | V-2 |
| Example 43 | A-71 | T-1 | U-2 | V-2 |
| Example 44 | (1)-5 | T-5 | U-1 | V-8 |
| Example 45 | (1)-46 | T-5 | U-2 | V-8 |
| Example 46 | (1)-46 | T-6 | U-2 | V-2 |
| Example 47 | (1)-5 1.5 parts by mass A-71 0.5 parts by mass | T-1 | U-2 | V-1 |
| Example 48 | (1)-46 1 part by mass (2)-8 1 part by mass | T-5 | U-2 | V-8 |

TABLE 3-continued

|  | Ultraviolet absorbing agent | Polymerizable compound | Resin | Photopolymerization initiator |
|---|---|---|---|---|
| Example 49 | (1)-52 1 part by mass (1)-64 1 part by mass | T-5 | U-2 | V-8 |
| Example 50 | (1)-46 1.5 parts by mass UV-1 0.5 parts by mass | T-1 | U-2 | V-1 |
| Comparative Example 1 | C-1 | T-1 | U-2 | V-1 |
| Comparative Example 2 | C-3 | T-1 | U-2 | V-1 |

Example 51

The following components were mixed to prepare a photopolymerizable composition of Example 51.

Ultraviolet absorbing agent (1)-46: 2.0 parts by mass

Polymerizable compound T-2: 0.5 parts by mass

Polymerizable compound T-4: 1.5 parts by mass

Resin U-3: 13.5 parts by mass

Photopolymerization initiator V-8: 2.5 parts by mass

Solvent (toluene): 80.0 parts by mass

Surfactant (KF-6001, manufactured by Shin-Etsu Chemical Co., Ltd., both-terminal carbinol-modified polydimethylsiloxane, hydroxyl value: 62 mgKOH/g): 0.02 parts by mass Example 52

The following components were mixed to prepare a photopolymerizable composition of Example 52.

Ultraviolet absorbing agent (1)-46: 2.0 parts by mass

Polymerizable compound T-6: 10.5 parts by mass

Polymerizable compound T-1: 5.0 parts by mass

Photopolymerization initiator V-1: 2.2 parts by mass

Photopolymerization initiator V-5: 0.3 parts by mass

Solvent (ethyl acetate): 40.0 parts by mass

Solvent (cyclopentanone): 40.0 parts by mass

Surfactant (KF-6001, manufactured by Shin-Etsu Chemical Co., Ltd., both-terminal carbinol-modified polydimethylsiloxane, hydroxyl value: 62 mgKOH/g): 0.02 parts by mass Example 53

The following components were mixed to prepare a photopolymerizable composition of Example 53.

Ultraviolet absorbing agent (1)-46: 2.0 parts by mass

Polymerizable compound T-5: 5.0 parts by mass

Polymerizable compound T-4: 4.0 parts by mass

Resin U-1: 6.5 parts by mass

Photopolymerization initiator V-1: 2.0 parts by mass

Photopolymerization initiator V-6: 0.5 parts by mass

Solvent (ethyl acetate): 40.0 parts by mass

Solvent (cyclopentanone): 40.0 parts by mass

Surfactant (KF-6001, manufactured by Shin-Etsu Chemical Co., Ltd., both-terminal carbinol-modified polydimethylsiloxane, hydroxyl value: 62 mgKOH/g): 0.02 parts by mass

Example 54

The following components were mixed to prepare a photopolymerizable composition of Example 54.
Ultraviolet absorbing agent (1)-46: 2.0 parts by mass
Polymerizable compound T-7: 60 parts by mass
Polymerizable compound T-8: 25 parts by mass
Polymerizable compound T-9: 15 parts by mass
Photopolymerization initiator V-9: 8.0 parts by mass

Examples 55 to 59

Photopolymerizable compositions of Examples 55 to 59 were prepared in the same manner as in Example 54 except that the ultraviolet absorbing agent (1)-46 was changed to the same amount of the ultraviolet absorbing agent (1)-5, the ultraviolet absorbing agent (1)-52, the ultraviolet absorbing agent (1)-64, the ultraviolet absorbing agent A-71, or the ultraviolet absorbing agent (2)-8 in Example 54.

The details of the raw materials described with the abbreviations above are as follows.

Ultraviolet Absorbing Agent (1)-5, (1)-8, (1)-11, (1)-46, (1)-49, (1)-52, (1)-53, (1)-60, (1)-64, (1)-65, (1)-69, A-1, A-35, A-71, (2)-1, (2)-6, (2)-8, (2)-9, (2)-11, (2)-12: compounds having structures shown in specific examples of specific compound described above C-1, C-3: compounds having structures (comparative compounds) described above UV-1: Tinuvin 326 (manufactured by BASF SE)

Polymerizable Compound

T-1: KAYARAD DPHA (manufactured by Nippon Kayaku Co., Ltd., compound containing two or more ethylenically unsaturated bond-containing groups)

T-2: NK ESTER A-DPH-12E (manufactured by Shin-Nakamura Chemical Co., Ltd., compound containing two or more ethylenically unsaturated bond-containing groups)

T-3: Light Acrylate DCP-A (manufactured by Kyoeisha Chemical Co., Ltd., compound containing two or more ethylenically unsaturated bond-containing groups)

T-4: Benzyl methacrylate

T-5: BEAMSET 577 (trifunctional to hexafunctional urethane acrylate, manufactured by Arakawa Chemical Industries, Ltd.)

T-6: FA-512M (dicyclopentenyloxyethyl methacrylate, manufactured by Showa Denko Materials Co., Ltd.)

T-7: CYCLOMER M100 (3,4-epoxycyclohexyl methyl methacrylate (manufactured by Daicel Corporation)

T-8: OXT-221: (3-ethyl-3-{[(3-ethyloxetane-3-yl)methoxy]methyl}oxetane, bifunctional oxetane, manufactured by Toagosei Company, Limited)

T-9: CELLOXIDE 2021P (3',4'-epoxycyclohexylmethyl 3,4-epoxycyclohexane carboxylate, bifunctional epoxy, manufactured by Daicel Corporation)

Resin

U-1: 40 mass % propylene glycol monomethyl ether acetate solution of copolymer of benzyl methacrylate/methacrylic acid (75/25 [mass ratio]) (weight-average molecular weight 12000)

U-2: DIANAL BR-80 (manufactured by Mitsubishi Chemical Corporation)

U-3: ARTON RX4500 (manufactured by JSR Corporation, Tg: 140° C., cyclic polyolefin resin)

Photopolymerization Initiator

V-1: Omnirad TPO (manufactured by IGM Resins B. V., photoradical polymerization initiator; acylphosphine compound)

V-2: Omnirad 2959 (manufactured by IGM Resins B.V., photoradical polymerization initiator, hydroxyacetophenone compound)

V-3: 4,4'-bis(diethylamino)benzophenone (photoradical polymerization initiator, benzophenone compound)

V-4: 2,2'-bis(2-chlorophenyl)-4,4',5,5'-tetraphenyl-1,2'-biimidazole (o-Cl-HABI) (photoradical polymerization initiator, a hexaarylbiimidazole compound).

V-5: IRGACURE-OXE01 (manufactured by BASF SE, photoradical polymerization initiator, oxime compound)

V-6: Omnirad 907 (manufactured by IGM Resins B. V., photoradical polymerization initiator, aminoacetophenone compound)

V-7: Omnirad 369 (manufactured by IGM Resins B. V., photoradical polymerization initiator, aminoacetophenone compound)

V-8: Omnirad 819 (manufactured by IGM Resins B. V., photoradical polymerization initiator, acylphosphine compound)

V-9: CPI-210S (manufactured by San-Apro Ltd., photocationic polymerization initiator, sulfonium salt)

Production of Ultraviolet Cut Filter

Production Example 1

A glass substrate with a size of 50 mm×50 mm (1737, manufactured by Corning Inc.) was spin-coated with each of the photopolymerizable compositions of Examples 1 to 59 such that the film thickness after film formation reached 1.5 μm, and the film was dried at 100° C. for 2 minutes, thereby forming a photopolymerizable composition layer. Thereafter, the ensure surface of the photopolymerizable composition layer was exposed by using an i-ray stepper exposure device (UX-1000SM-EH04, manufactured by Ushio Inc.) with an exposure amount of 1,000 mJ/cm$^2$. Next, the layer was heated (post-baked) at 200° C. for 8 minutes using a hot plate, thereby producing an ultraviolet cut filter (cured substance).

In the photopolymerizable compositions of Examples 1 to 59, both the degree of change in the transmittance (degree 1 of change in transmittance) of the photopolymerizable composition layer at the maximal absorption wavelength (λmax) before and after the exposure and the degree of change in the transmittance (degree 2 of change in transmittance) of the photopolymerizable composition layer at the maximal absorption wavelength (λmax) before and after the post-bake were 1% or less.

Degree 1 of change in transmittance=|transmittance of photopolymerizable composition layer at λmax before exposure−transmittance of photopolymerizable composition layer at λmax after exposure|

Degree 2 of change in transmittance=|transmittance of photopolymerizable composition layer at λmax before post-bake−transmittance of photopolymerizable composition layer at λmax after post-bake|

Production Example 2

An ultraviolet cut filter (cured substance) was produced by the same method as in Production Example 1 except that the photopolymerizable composition of Comparative Examples 1 and 2 was used as the photopolymerizable composition and the film thickness of the photopolymerizable composition layer was adjusted such that the transmittance of the photopolymerizable composition layer at the maximal absorption wavelength (λmax) before the exposure was in a range of 5% to 20%.

Evaluation
Evaluation of Light Resistance

The ultraviolet cut filters obtained above were subjected to a light resistance test under the following condition 1, and the degree of decrease in the transmittance at the maximal absorption wavelength ($\lambda$max) was calculated. Specifically, the transmittance of the ultraviolet cut filter at the maximal absorption wavelength ($\lambda$max) was measured, and the ultraviolet cut filter was subjected to the light resistance test under the conditions 1. The transmittance of the ultraviolet cut filter at the maximal absorption wavelength ($\lambda$max) after the light resistance test was measured, and the degree of decrease in the transmittance was calculated according to the following equation.

Degree of decrease in transmittance (%)=(transmittance of ultraviolet cut filter at $\lambda$max after light resistance test)−(transmittance of ultraviolet cut filter at $\lambda$max before light resistance test)

Condition 1

Device: Xenon Weather Meter (XL75, manufactured by Suga Test Instruments Co., Ltd.)
Illuminance: 90 klx
Test period: 50 hours
Environment: 23° C. at relative humidity of 50%

Further, the degree of change in coloration of the ultraviolet cut filter after the light resistance test was visually confirmed, and the presence or absence of coloration was evaluated according to the following standards.

A: Coloration was not found
B: The ultraviolet cut filter was slightly colored, but was in a practical level.

Evaluation of Solvent Resistance

The ultraviolet cut filters obtained above were immersed in propylene glycol monomethyl ether acetate (PGMEA) for 10 minutes, the retention rate of the absorbance was calculated, and the solvent resistance was evaluated according to the following standards.

Retention rate (%) of absorbance=(absorbance of ultraviolet cut filter at $\lambda$max after immersion in PGMEA/absorbance of ultraviolet cut filter at $\lambda$max before immersion in PGMEA)×100

A: The retention rate of the absorbance was 85% or greater.
B: The retention rate of the absorbance was 70% or greater and less than 85%.
C: The retention rate of the absorbance was less than 70%.

TABLE 4

| | Light resistance | | |
|---|---|---|---|
| | Degree of decrease in transmittance (%) | Presence or absence of coloring | Solvent resistance |
| Example 1 | 3 | A | A |
| Example 2 | 2 | A | A |
| Example 3 | 2 | A | A |
| Example 4 | 2 | A | A |
| Example 5 | 3 | A | A |
| Example 6 | 2 | A | A |
| Example 7 | 2 | A | A |
| Example 8 | 1 | A | A |
| Example 9 | 1 | A | A |
| Example 10 | 2 | A | A |
| Example 11 | 1 | A | A |
| Example 12 | 2 | A | A |
| Example 13 | 2 | A | A |
| Example 14 | 20 | A | A |
| Example 15 | 22 | A | A |
| Example 16 | 12 | A | A |

TABLE 4-continued

| | Light resistance | | |
|---|---|---|---|
| | Degree of decrease in transmittance (%) | Presence or absence of coloring | Solvent resistance |
| Example 17 | 15 | A | A |
| Example 18 | 15 | A | A |
| Example 19 | 21 | A | A |
| Example 20 | 20 | A | A |
| Example 21 | 1 | A | A |
| Example 22 | 1 | A | A |
| Example 23 | 1 | A | A |
| Example 24 | 1 | A | A |
| Example 25 | 2 | A | A |
| Example 26 | 3 | A | A |
| Example 27 | 3 | A | B |
| Example 28 | 3 | A | A |
| Example 29 | 2 | A | A |
| Example 30 | 6 | A | A |
| Example 31 | 5 | A | A |
| Example 32 | 39 | B | A |
| Example 33 | 3 | A | A |
| Example 34 | 2 | A | A |
| Example 35 | 3 | A | A |
| Example 36 | 1 | A | A |
| Example 37 | 2 | A | A |
| Example 38 | 30 | B | A |
| Example 39 | 2 | A | A |
| Example 40 | 25 | B | A |

TABLE 5

| | Light resistance | | |
|---|---|---|---|
| | Degree of decrease in transmittance (%) | Presence or absence of coloring | Solvent resistance |
| Example 41 | 1 | A | A |
| Example 42 | 2 | A | A |
| Example 43 | 16 | A | A |
| Example 44 | 2 | A | A |
| Example 45 | 2 | A | A |
| Example 46 | 1 | A | B |
| Example 47 | 2 | A | A |
| Example 48 | 2 | A | A |
| Example 49 | 1 | A | A |
| Example 50 | 2 | A | A |
| Example 51 | 2 | A | A |
| Example 52 | 8 | A | A |
| Example 53 | 1 | A | A |
| Example 54 | 2 | A | A |
| Example 55 | 1 | A | A |
| Example 56 | 2 | A | A |
| Example 57 | 1 | A | A |
| Example 58 | 2 | A | A |
| Example 59 | 1 | A | A |
| Comparative Example 1 | >70 | A | A |
| Comparative Example 2 | >70 | A | C |

As listed in the tables above, in Examples 1 to 59, both the light resistance and the solvent resistance were achieved at high levels.

The photopolymerizable compositions of the examples can be suitably used for each member constituting a liquid crystal display device or an organic electroluminescence display device.

What is claimed is:

1. A photopolymerizable composition comprising:
   at least one compound selected from a compound represented by Formula (1) or a compound represented by Formula (2);
   a polymerizable compound; and
   a photopolymerization initiator,

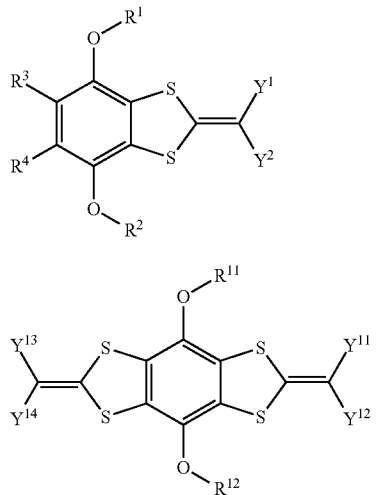

(1)

(2)

in Formulae (1) and (2), $R^1$, $R^2$, $R^{11}$, and $R^{12}$ each independently represented by Formula (R100), $$*X^{R1}-Y^{R1}-Z^{R1} \quad (R100)$$

in Formula (R100), $X^{R1}$ represents a single bond, —C(=O)-*1, —C(=O)O-*1, or —C(=O)NRx$^{1-*1}$, where $Rx^1$ represents a hydrogen atom, an alkyl group, or an aryl group and *1 represents a bonding site with respect to $Y^{R1}$, $Y^{R1}$ represents a single bond or a divalent linking group, and $Z^{R1}$ represents a (meth) acryloyloxy group, $R^3$ and $R^4$ each independently represent a hydrogen atom, a halogen atom, an alkyl group, an aryl group, an alkoxy group, an aryloxy group, an acyloxy group, an alkylamino group, an anilino group, an acylamino group, an alkylsulfonylamino group, an arylsulfonylamino group, an alkylthio group, an arylthio group, or an ethylenically unsaturated bond-containing group, $Y^1$, $Y^2$, $Y^{11}$, $Y^{12}$, $Y^{13}$, and $Y^{14}$ each independently represent an electron withdrawing group, $Y^1$ and $Y^2$ may be bonded to each other to form a ring, $Y^{11}$ and $Y^{12}$ may be bonded to each other to form a ring, $Y^{13}$ and $Y^{14}$ may be bonded to each other to form a ring, $R^1$ and $R^3$ may be bonded to each other to form a ring, $R^3$ and $R^4$ may be bonded to each other to form a ring, and $R^2$ and $R^4$ may be bonded to each other to form a ring.

2. The photopolymerizable composition according to claim 1,
   wherein the compound represented by Formula (1) is a compound represented by Formula (3), and
   the compound represented by Formula (2) is a compound represented by Formula (4),

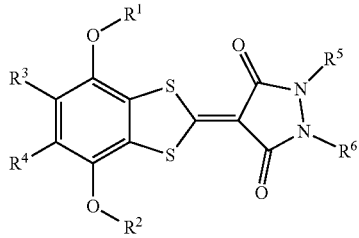

(3)

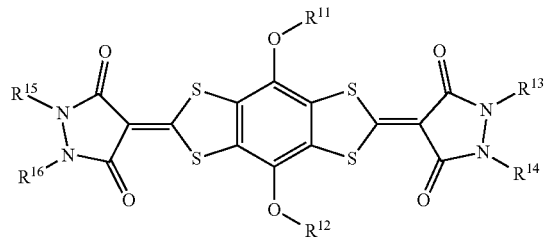

(4)

in Formulae (3) and (4), $R^1$, $R^2$, $R^{11}$, and $R^{12}$ each independently represent by Formula (R100), $$*X^{R1}-Y^{R1}-Z^{R1} \quad (R100)$$

in Formula (R100), $X^{R1}$ represents a single bond, —C(=O)-*1, —C(=O)O-*1, or —C(=O)NRx$^{1-*1}$, where $Rx^1$ represents a hydrogen atom, an alkyl group, or an aryl group and *1 represents a bonding site with respect to $Y^{R1}$, $Y^{R1}$ represents a single bond or a divalent linking group, and $Z^{R1}$ represents a (meth) acryloyloxy group, $R^3$ and $R^4$ each independently represent a hydrogen atom, a halogen atom, an alkyl group, an aryl group, an alkoxy group, an aryloxy group, an acyloxy group, an alkylamino group, an anilino group, an acylamino group, an alkylsulfonylamino group, an arylsulfonylamino group, an alkylthio group, an arylthio group, or an ethylenically unsaturated bond-containing group, $R^5$, $R^6$, $R^{13}$, $R^{14}$, $R^{15}$, and $R^{16}$ each independently represent a hydrogen atom or a substituent, $R^1$ and $R^3$ may be bonded to each other to form a ring, $R^3$ and $R^4$ may be bonded to each other to form a ring, $R^2$ and $R^4$ may be bonded to each other to form a ring, $R^5$ and $R^6$ may be bonded to each other to form a ring, $R^{13}$ and $R^{14}$ may be bonded to each other to form a ring, and $R^{15}$ and $R^{16}$ may be bonded to each other to form a ring.

3. The photopolymerizable composition according to claim 2,
   wherein one of $R^3$ and $R^4$ in Formula (3) represents a hydrogen atom, and the other represents a halogen atom, an alkyl group, an aryl group, an alkoxy group, an aryloxy group, an acyloxy group, an alkylamino group, an anilino group, an acylamino group, an alkylsulfonylamino group, an arylsulfonylamino group, an alkylthio group, an arylthio group, or an ethylenically unsaturated bond-containing group.

4. The photopolymerizable composition according to claim 1,
   wherein the polymerizable compound is a compound containing two or more ethylenically unsaturated bond-containing groups.

5. The photopolymerizable composition according to claim 1, wherein the photopolymerization initiator is at least one selected from an acetophenone compound, an acylphosphine compound, or a benzophenone compound.

6. The photopolymerizable composition according to claim 1, further comprising:
a resin.

7. The photopolymerizable composition according to claim 6,
wherein the resin contains an alkali-soluble resin.

8. The photopolymerizable composition according to claim 6,
wherein the resin is at least one selected from a (meth) acrylic resin, a polystyrene resin, a polyester resin, a polyurethane resin, a polythiourethane resin, a polyimide resin, an epoxy resin, a polycarbonate resin, a cyclic olefin resin, or a cellulose acylate resin.

9. The photopolymerizable composition according to claim 1,
wherein the photopolymerizable composition is a pressure sensitive adhesive or an adhesive.

10. A cured substance which is obtained by curing the photopolymerizable composition according to claim 1.

11. An optical member comprising:
the cured substance according to claim 10.

* * * * *